United States Patent
Shahar

(10) Patent No.: US 10,591,619 B2
(45) Date of Patent: Mar. 17, 2020

(54) ANODES FOR IMPROVED DETECTION OF NON-COLLECTED ADJACENT SIGNALS

(71) Applicant: GE Precision Healthcare LLC, Wauwatosa, WI (US)

(72) Inventor: Arie Shahar, Moshav Magshimim (IL)

(73) Assignee: GE Precision Healthcare LLC, Wauwatosa, WI (US)

(*) Notice: Subject to any disclaimer, the term of this patent is extended or adjusted under 35 U.S.C. 154(b) by 0 days.

(21) Appl. No.: 16/371,906

(22) Filed: Apr. 1, 2019

(65) Prior Publication Data
US 2020/0057167 A1 Feb. 20, 2020

Related U.S. Application Data

(63) Continuation-in-part of application No. 15/998,449, filed on Aug. 15, 2018, now Pat. No. 10,247,834.

(51) Int. Cl.
*H01L 27/146* (2006.01)
*G01T 1/24* (2006.01)

(52) U.S. Cl.
CPC .............. *G01T 1/241* (2013.01); *G01T 1/24* (2013.01); *G01T 1/247* (2013.01)

(58) Field of Classification Search
CPC ......... G01T 1/295; G01T 1/241; G01T 1/247; G01T 1/24
See application file for complete search history.

(56) References Cited

U.S. PATENT DOCUMENTS

| | | |
|---|---|---|
| 4,421,986 A | 12/1983 | Friauf et al. |
| 4,852,135 A | 7/1989 | Anisovich et al. |
| 5,148,809 A | 9/1992 | Biegeleisen-Knight et al. |

(Continued)

FOREIGN PATENT DOCUMENTS

WO 2014173812 A1 10/2014

OTHER PUBLICATIONS

Perillo et al., "An overview on performance and possible applications of X- and gamma-ray semiconductor detectors irradiated at various impinging angles," 2003, 2003 IEEE Nuclear Science Symposium Conference Record, vol. 5, pp. 3593-3600. (Year: 2003).*

(Continued)

*Primary Examiner* — Kiho Kim
(74) *Attorney, Agent, or Firm* — Dean D. Small; The Small Patent Law Group, LLC

(57) ABSTRACT

A radiation detector assembly is provided that includes a semiconductor detector, a collimator, plural pixelated anodes, and at least one processor. The collimator has openings defining pixels. Each pixelated anode is configured to generate a primary signal responsive to reception of a photon and to generate at least one secondary signal responsive to reception of a photon by at least one surrounding anode. Each pixelated anode includes a first portion and a second portion located in different openings of the collimator. The first portion is configured as a collecting portion having a collecting area, and the second portion is configured as a non-collecting portion having a non-collecting area that has a different size from the collecting area. The at least one processor is configured to determine a location for the reception of a photon using a primary signal and at least one secondary signal.

20 Claims, 33 Drawing Sheets

(56) References Cited

U.S. PATENT DOCUMENTS

| | | |
|---|---|---|
| 5,245,191 A | 9/1993 | Barber et al. |
| 5,273,910 A | 12/1993 | Tran et al. |
| 5,376,796 A | 12/1994 | Chan et al. |
| 5,504,334 A | 4/1996 | Jansen et al. |
| 5,562,095 A | 10/1996 | Downey et al. |
| 5,754,690 A | 5/1998 | Jackson et al. |
| 5,771,308 A | 6/1998 | Florent |
| 5,825,033 A | 10/1998 | Barrett et al. |
| 5,847,398 A | 12/1998 | Shahar et al. |
| 6,002,741 A | 12/1999 | Eisen et al. |
| 6,037,595 A | 3/2000 | Lingren |
| 6,169,287 B1 | 1/2001 | Warburton |
| 6,618,185 B2 | 9/2003 | Sandstrom |
| 7,187,790 B2 | 3/2007 | Sabol et al. |
| 7,490,085 B2 | 2/2009 | Walker et al. |
| 7,495,228 B1 | 2/2009 | Albagli et al. |
| 7,508,509 B2 | 3/2009 | Lehtikoski et al. |
| 7,668,288 B2 | 2/2010 | Conwell et al. |
| 7,692,156 B1 | 4/2010 | Nagarkar |
| 8,405,038 B2 | 3/2013 | Bouhnik et al. |
| 8,466,420 B2 | 6/2013 | Wangerin |
| 9,002,084 B2 | 4/2015 | Shafiar et al. |
| 9,482,764 B1 | 11/2016 | Shahar et al. |
| 9,632,186 B2 | 4/2017 | Shahar et al. |
| 9,696,440 B2 | 7/2017 | Shahar et al. |
| 9,927,539 B2 | 3/2018 | Shahar et al. |
| 2002/0036269 A1 | 3/2002 | Shahar et al. |
| 2003/0099026 A1 | 5/2003 | Sandstrom |
| 2003/0128324 A1 | 7/2003 | Woods et al. |
| 2003/0153830 A1 | 8/2003 | Weinberg et al. |
| 2004/0021082 A1 | 2/2004 | Wong et al. |
| 2004/0174949 A1 | 9/2004 | Yamashita et al. |
| 2004/0195512 A1 | 10/2004 | Crosetto |
| 2005/0139777 A1 | 6/2005 | Rostaing et al. |
| 2005/0251010 A1 | 11/2005 | Mistretta et al. |
| 2006/0086913 A1 | 4/2006 | Spahn |
| 2006/0113482 A1 | 6/2006 | Pelizzari et al. |
| 2006/0249682 A1 | 11/2006 | Hogg et al. |
| 2006/0261281 A1 | 11/2006 | Tsuchiya et al. |
| 2006/0285751 A1 | 12/2006 | Wu et al. |
| 2007/0023669 A1 | 2/2007 | Hefetz et al. |
| 2007/0025522 A1 | 2/2007 | Fenster et al. |
| 2007/0173719 A1 | 7/2007 | Haider |
| 2008/0001090 A1 | 1/2008 | Ben-Haim et al. |
| 2008/0029704 A1 | 2/2008 | Hefetz et al. |
| 2008/0033291 A1 | 2/2008 | Rousso et al. |
| 2008/0039721 A1 | 2/2008 | Shai et al. |
| 2008/0149842 A1 | 6/2008 | El-Haney et al. |
| 2009/0110144 A1 | 4/2009 | Takahashi et al. |
| 2010/0261997 A1 | 10/2010 | Ren et al. |
| 2010/0308817 A1 | 12/2010 | Vija et al. |
| 2011/0026685 A1 | 2/2011 | Zilberstein et al. |
| 2011/0082659 A1 | 4/2011 | Montemont et al. |
| 2011/0103544 A1 | 5/2011 | Hermony et al. |
| 2011/0147594 A1 | 6/2011 | Scoullar et al. |
| 2011/0155918 A1 | 6/2011 | Bouhnik |
| 2011/0240865 A1 | 10/2011 | Frach et al. |
| 2011/0286576 A1 | 11/2011 | Cui et al. |
| 2013/0193337 A1 | 8/2013 | Bouhnik et al. |
| 2014/0048714 A1 | 2/2014 | Shahar et al. |
| 2014/0084171 A1 | 3/2014 | Shahar et al. |
| 2014/0158890 A1 | 6/2014 | Pistorius et al. |
| 2014/0163368 A1 | 6/2014 | Rousso et al. |
| 2014/0343400 A1 | 11/2014 | Takayama et al. |
| 2015/0063671 A1 | 3/2015 | Shahar et al. |
| 2016/0126402 A1 | 5/2016 | Shahar et al. |
| 2016/0296184 A1 | 10/2016 | Rodrigues et al. |
| 2017/0016998 A1 | 1/2017 | Shahar et al. |
| 2017/0269240 A1 | 9/2017 | Shahar et al. |
| 2018/0329078 A1 | 11/2018 | Shahar |

OTHER PUBLICATIONS

Skelton et al., "Mapping CZT charge transport parameters with collimated X-ray and gamma-ray beams," 2008, 2008 IEEE Nuclear Science Symposium Conference Record, pp. 63-66. (Year: 2008).*

Pretorius et al., "Monte Carlo simulations of the GE Discovery Alcyone CZT SPECT systems," 2015, IEEE Transactions on Nuclear Science, vol. 62, pp. 832-839. (Year: 2015).*

Iwanczyk et al., "Photon Counting Energy Dispersive Detector Arrays for X-ray Imaging" IEEE Trans Nucl Sci. 2009 ; 56(3): 535-542. doi:10.1109/TNS.2009.2013709. (27 pages).

Zhu, "Digital Signal Processing Methods for Pixelated 3-D Position Sensitive Room-Temperature Semiconductor Detectors" (2012) p. 1-184, available at: https://deepblue.lib.umich.edu/handle/2027.42/91490.

Warburton, "An approach to sub-pixel spatial resolution in room temperature X-Ray detector arrays with good energy Resolution", Mat. Res. Symp Proc. 487, 531-535, 1988.

International Search Report and Written Opinion dated Jul. 15, 2016 for corresponding PCT Application No. PCT/US2016/029465 filed Apr. 27, 2016 (11 pages).

Barrett, "Charge Transport in Arrays of Semiconductor Gamma-Ray Detectors," H.H. Barrett, Physical Review Letters, vol. 75, No. 1. Jul. 1995.

Eskin, "Signals Induced in Semiconductor Gamma-Ray Imaging Detectors," J.D. Eskin, Journal of Applied Physics, vol. 85, No. 2, Jan. 1999.

Niemela, "High-Resolution p-i-n CdTe and CdZnTe X-Ray Detectors with Cooling and Rise-Time Discrimination," IEEE Transactions on Nuclear Science, vol. 43, No. 3. Jun. 1996.

* cited by examiner

ANODES FOR IMPROVED DETECTION OF NON-COLLECTED ADJACENT SIGNALS

RELATED APPLICATIONS

This application is a continuation-in-part of and claims priority to U.S. patent application Ser. No. 15/998,449, entitled "Anodes for Improved Detection of Non-Collected Adjacent Signals," and filed Aug. 15, 2018, the entire subject matter of which is hereby incorporated by reference in its entirety.

BACKGROUND OF THE INVENTION

The subject matter disclosed herein relates generally to apparatus and methods for diagnostic medical imaging, such as Nuclear Medicine (NM) imaging.

In NM imaging, for example, systems with multiple detectors or detector heads may be used to image a subject, such as to scan a region of interest. For example, the detectors may be positioned adjacent the subject to acquire NM data, which is used to generate a three-dimensional (3D) image of the subject.

Imaging detectors may be used to detect reception of photons from an object (e.g., human patient or animal body that has been administered a radiotracer) by the imaging detector. Reception of photons may result in collected signals in primary pixels under which a given photon is absorbed, and non-collected signals resulting from induced charges in one or more pixels adjacent to the primary pixel. The non-collected signals from adjacent pixels may be used, for example, to determine position of a primary event in a primary pixel at a sub-pixel level. Non-collected signals, however, tend to be relatively weak and may suffer from poor signal-to-noise ratio (SNR), reducing the effectiveness or accuracy of the use of the non-collected signals.

BRIEF DESCRIPTION OF THE INVENTION

In one embodiment, a radiation detector assembly is provided that includes a semiconductor detector, a collimator, plural pixelated anodes, and at least one processor. The semiconductor has a surface. The collimator is disposed above the surface, and has openings defining pixels. The plural pixelated anodes are disposed on the surface. Each pixelated anode is configured to generate a primary signal responsive to reception of a photon by the pixelated anode and to generate at least one secondary signal responsive to an induced charge caused by reception of a photon by at least one surrounding anode. Each pixelated anode includes a first portion and a second portion located in different openings of the collimator. The at least one processor is operably coupled to the pixelated anodes, and configured to acquire a primary signal from one of the pixelated anodes responsive to reception of a photon by the one of the anodes; acquire at least one secondary signal from at least one neighboring pixelated anode of the one of the pixelated anodes responsive to an induced charge caused by the reception of the photon by the one of the anodes; and determine a location for the reception of the photon using the primary signal and the at least one secondary signal.

In another embodiment, a radiation detector assembly is provided that includes a semiconductor detector, a collimator, plural pixelated anodes, and at least one processor. The semiconductor has a surface. The collimator is disposed above the surface, and has openings defining pixels. The plural pixelated anodes are disposed on the surface. Each pixelated anode is configured to generate a primary signal responsive to reception of a photon by the pixelated anode and to generate at least one secondary signal responsive to an induced charge caused by reception of a photon by at least one surrounding anode. Each anode unit-structure includes a first portion and a second portion that form portions of different pixelated anodes located in different pixels corresponding to the different openings of the collimator. The at least one processor is operably coupled to the pixelated anodes, and configured to acquire a primary signal from one of the pixelated anodes responsive to reception of a photon by the one of the anodes; acquire at least one secondary signal from at least one neighboring pixelated anode of the one of the pixelated anodes responsive to an induced charge caused by the reception of the photon by the one of the anodes; and determine a location for the reception of the photon using the primary signal and the at least one secondary signal.

In another embodiment, a method is provided that includes providing a semiconductor substrate. The method also includes providing anode unit-structures on the semiconductor substrate, with each of the anode unit-structures including anode strips configured to receive electrical charge responsive to absorption of a photon. Further, the method includes arranging the plural anode unit-structures into corresponding anode unit-cells, with each anode unit cell including at least two anode unit-structures. Also, the method includes arranging the anode unit-cells into pixelated anodes, wherein at least a first portion and second portion of each anode unit-structure form portions of different pixels wherein each pixel is defined by an opening of a collimator placed above the unit-cells.

BRIEF DESCRIPTION OF THE DRAWINGS

FIG. 4b provides a side sectional view of the anode unit-structure of FIG. 4a.

FIG. 4c provides an end sectional view of the anode unit-structure of FIG. 4a.

FIG. 5b schematically illustrates grids (or fork-like structures in the illustrated example) of the anode unit-structure of FIG. 5a.

FIG. 5c provides a schematic top view of the anode unit-structure of FIG. 5a.

DETAILED DESCRIPTION OF THE INVENTION

Figure 1:
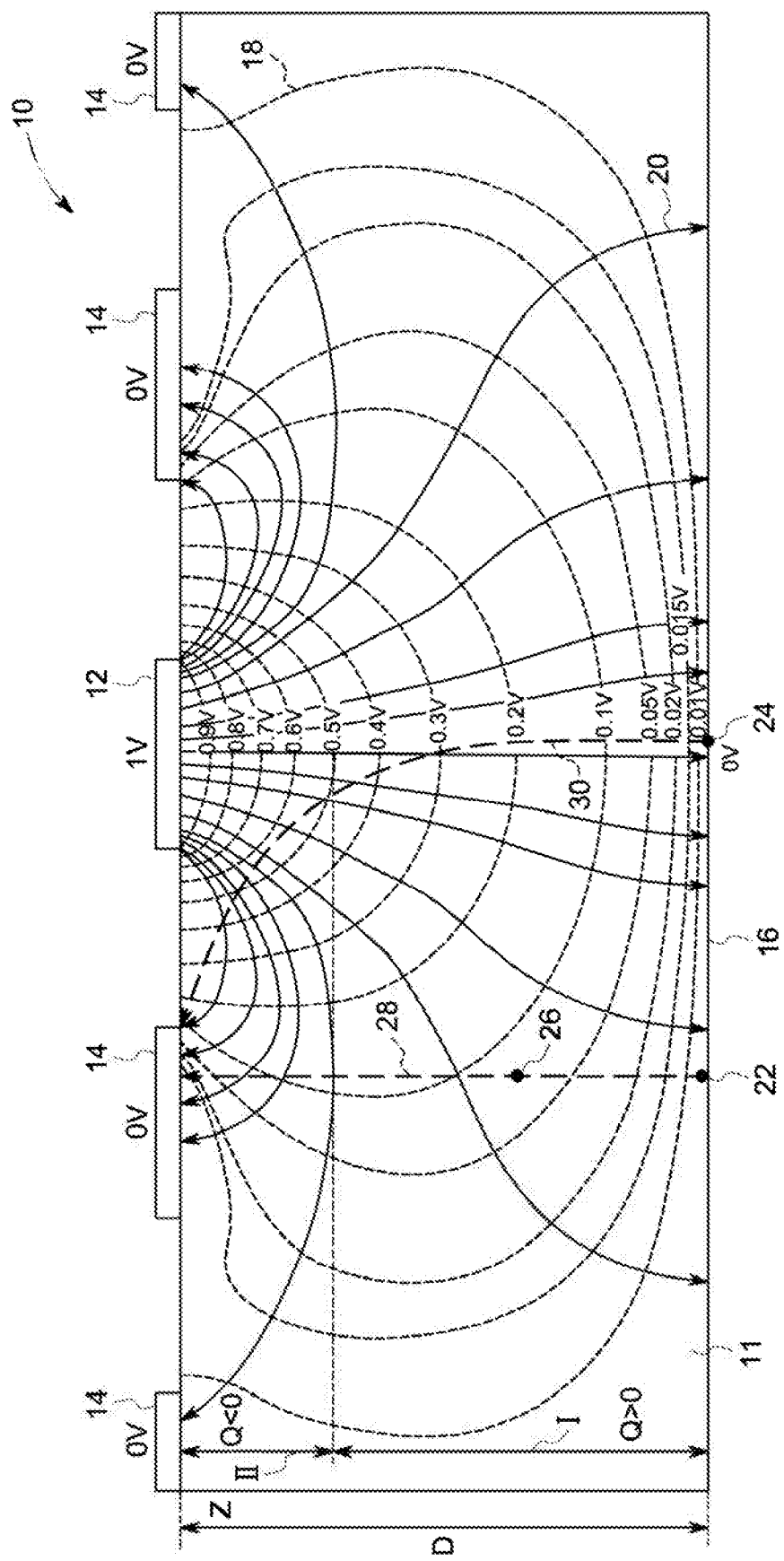
FIG. 1 depicts a representation of weighting potentials of a detector having a pixel biased by a voltage potential.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" of are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various techniques may be employed to improve the quality of X-Ray and Gamma ray imaging using virtual sub-pixilation. Examples of such methods include those discussed in U.S. Pat. No. 9,696,440, "Systems and methods for improving energy resolution by sub-pixel energy calibration," issued Jul. 4, 2017; U.S. Pat. No. 9,632,186, "Systems and methods for sub-pixel location determination," issued Apr. 25, 2017: and U.S. patent application Ser. No. 15/613,998, filed Jun. 5, 2017 and published as U.S. Published Application No. 2017/0269240 "Systems and methods for improving imaging by sub-pixel calibration," published on Sep. 21, 2017, all of which are hereby incorporated by reference in their entirety.

The virtual division of physical pixels into virtual sub-pixels may be performed by identifying the coordinates of the event location within the physical pixels and assigning the events, according to their position coordinates in the physical pixels, to the sub-pixels into which the physical pixels are divided. The location of events inside the physical pixels may be identified based on the weighted average of the non-collected transient signals induced on the anodes of the pixels, which are adjacent to the primary pixel in which the event (the absorbing of a photon by the primary pixel) occurs.

However, the non-collected induced transient signals, in the pixels adjacent to the primary pixel, may be weak and suffer from poor Signal-To-Noise-Ratio (SNR). Poor SNR for the non-collected induced transient signals may result in error in deriving the position of the events inside the physical primary pixels, which degrades the efficiency of the use of virtual sub-pixelization to improve the image quality of the X-Ray and Gamma ray imaging systems.

Accordingly, various embodiments provide detectors and methods to improve the SNR of the measured non-collected transient induced signals in the pixels adjacent to the primary pixels. For example, various embodiments provide anode geometry that enhances the amplitude of the measured non-collected transient induced signals in the pixels adjacent to the primary pixels. Additionally or alternatively, various embodiments provide pixelated anode geometry that includes collecting and non-collecting regions in the same anode. For example, various embodiments provide the collecting and non-collecting regions in the pixilated anodes in a form of grid or strips. It may be noted that various embodiments define the collecting and non-collecting regions in the pixelated anodes by the relative position between an associated collimator and pixelated detector.

Generally, in conventional configurations, the non-collected signal in the adjacent pixels is induced by a charge in the primary pixels, which is relatively far away from the adjacent pixel where the electrical field of the weighting potential is weak, resulting in weak non-collected induced signals. Various embodiments disclosed herein improve imaging by enhancing the adjacent non-collected induced transient signals using a configuration in which the non-collected induced signal in the adjacent pixels are produced by the charge in the primary pixel when the charge moves under the non-collecting anode of the adjacent pixels which is located in the region of the primary pixel. Accordingly, the adjacent non-collected induced transient signals are produced where the electrical field of the weighting potential is stronger, resulting in stronger non-collected induced signals.

Before addressing specific aspects of example embodiments, the behavior of detectors impacted photons is first discussed. FIG. 1 shows, according to Shockley-Ramo theorem, the weighting potential of a pixel 12 (or pixelated anode), in a pixelated detector 10, that is biased by a potential of 1V while the surrounding anodes 14 and the cathode 16 are grounded (V=0). The detector 10 may be fabricated, for example, from a semiconductor wafer 11, which may be made of CdTe, CdZnTe (CZT), Ge or Si. (It may be noted in practice that, for example, the pixel 12 and anodes 14 may be biased at the same voltage in practice; however the biasing of FIG. 1 is provided for ease and clarity of description of certain aspects of detector behavior.)

According to this theorem, the induced current produced in pixel 12 (or pixelated anode 12), by the weighting potential, is given by the equation (1): Eq. (1) $i=qE*V=qE*V*\cos(a)$, where i is the induced current, q is the electron charge moving in detector 10 having a thickness D in a Z direction, and $E*V$ is the scalar product between the vector of the electrical field E of the weighting potential and the vector of the velocity V of the electron, and (a) is the angle between the vectors E and V. (It may be noted that i is the induced current on an electrode having potential of 1V thus, units wise, the left side of the equation above may be multiplied by 1V to provide the proper units; however, this will not change the absolute value of the induced current.)

In operation, pixel 12 and anodes 14 (or pixelated anodes 12, 14) of the detector 10 have high potential relative to the cathode 16. As noted above, the bias of 1V for the pixel 12 and bias of 0V for anodes 14 and cathode 16, as depicted by FIG. 1, are shown as such for clarity in depicting the calculation of the weighting potential of the pixel 12. As seen in FIG. 1, the weighting potential of pixel 12 includes equipotential lines 18 illustrated by broken lines and electrical field lines 20.

When the pixel 12 is a non-collecting pixel (e.g., when a pixel or anode adjacent to the pixel 12 is collecting pixel), the charges at points 22, 24 and 26 moving toward pixel 14 induce current or charge on non-collecting pixel 12 according to equation (1) above. It may be noted that in range I, the charge induced on the pixel 12 by the charges moving from points 22, 24 and 26 toward anode 14, is positive (Q>0) according to equation (1), since, in this range, the scalar product of the orientation of the lines of the electrical field E with the orientation of the velocity V of the moving charges multiplied by the polarity of the charges q is positive. However, in range II, the induced charge, by the charges moving from points 22, 24 and 26 toward anode 14, on anode 12 is negative (Q<0) according to equation (1) since, in this range, the scalar product of the orientation of the lines of the electrical field E with the orientation of the velocity V of the moving charges multiply by the polarity of the charges q is negative. It may be noted that the charges starting at points 22 and 26 move toward the anode 14 along trajectory 28. Similarly, the charge starting at point 24 moves toward the anode 24 along trajectory 30.

Accordingly, it may be seen from FIG. 1 that the electrical field of the weighted potential is stronger under an anode than away from an anode. Accordingly, if the anode 14 were biased by a potential that is higher than that of the pixel 12, the charge created by an event under the pixel 12 at point 24 would be collect by the anode 14 while moving along trajectory 30 under the pixel 12. At the same time, such an event would induce a non-collected charge on the pixel 12 which is much stronger than the non-collected charge induced on the pixel 12 by an event created under the anode 14 at point 22 that moves in a conventional way along trajectory 28 to be collected by the anode 14.

Figure 2:
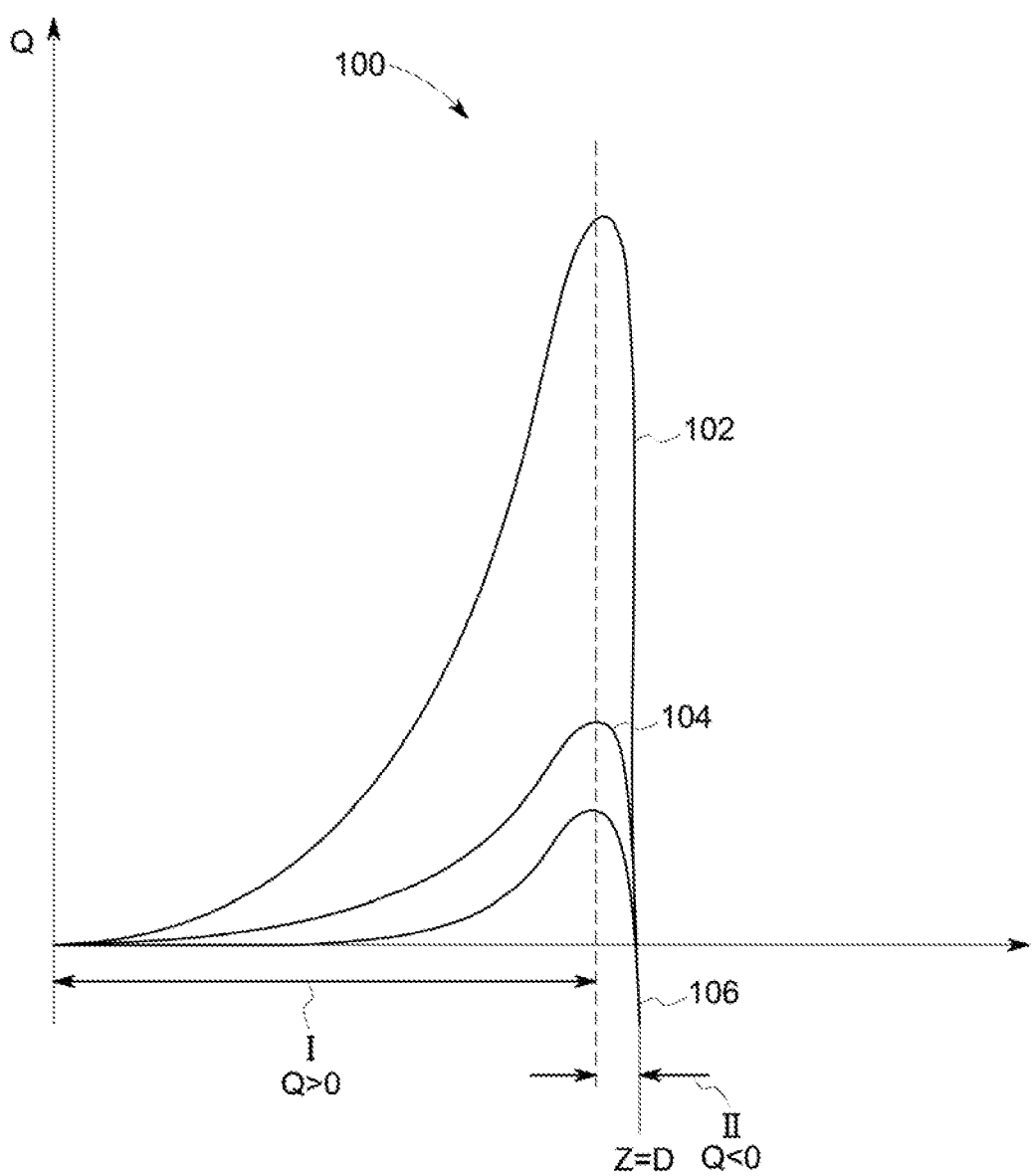
FIG. 2 illustrates a graph of an induced integrated charge Q on a pixel of the detector of FIG. 1.

FIG. 2 illustrates a graph 100 of the induced integrated charge Q on the pixel 12 as a function of the coordinate Z, in detector 10, of the charges moving toward the anode 14 of the detector 10. Included in the graph 100 are curves 102, 104 and 106 of the non-collected induced transient signals produced on the pixel 12 by the charges moving from points 24, 22 and 26, respectively, toward the anode 14 along trajectories 28 and 30. It may be noted that the signal 102 is stronger than the signals 104, 106, because the charge created by the event for signal 102 moves under the non-collecting anode on which it induces the non-collecting signal.

The induced integrated charge Q of the curve 102 increases in range I along trajectory 30 where positive charge is induced on the pixel 12 and decreases in range II along trajectory 30 where negative integrated charge is induced on the pixel 12. At point Z=D the induced charge $Q_{102}$ on the pixel 12 is zero as shown by equation (2): Eq. (2) $Q_{102}=Q(I)_{102}-Q(II)_{102}=0$, where $Q(I)_{102}$ and $Q(II)_{102}$ are the induced charges on pixels 12 in regions I and II, respectively Similarly, the induced integrated charge Q of curve 104 increases in range I along trajectory 28 where positive charge is induced on anode 12, and decreases in range II along trajectory 28 where negative integrated charge is induced on anode 12. At point Z=D the induced charge $Q_{104}$ on the pixel 12 is zero as shown by equation (2): Eq. (3) $Q_{104}=Q(I)_{104}-Q(II)_{104}=0$, where $Q(I)_{104}$ and $Q(II)_{104}$ are the induced charges on pixel 12 in regions I and II, respectively.

It may be noted that curve 104 represents an induced integrated charge $Q_{104}$ that is smaller than the integrated charge $Q_{102}$ represented by curve 102, because curve 104 is for trajectory 28 (see FIG. 1), which is located more remotely from the pixel 12 than trajectory 30 for curve 102 is. Accordingly, the electrical field of the weighting potential for curve 104 is smaller than that for curve 102, resulting in smaller induced integrated charge $Q_{104}$ for curve 104 than for curve 102.

The induced charge $Q_{106}$ of curve 106 goes up in range I along trajectory 28 where positive charge is induced on the pixel 12 and goes down in range II along trajectory 28 where negative charge is induced on the pixel 12. Since for curve 106 the charges start to move from point 26, the integration range along trajectory 28 within range I is shorter than that discussed above for curve 104. Accordingly, the positive integrated charge in region I $Q(I)_{106}$ for curve 106 is smaller than the positive integrated charge in region I $Q(I)_{104}$ for curve 104. Both curve 106 and curve 104 have the same integrated negative charge in range II $(-Q(II)_{104}=-Q(II)_{106})$. Accordingly, since the positive integrated charge Q of curve 106 is smaller than this of curve 104 $(Q(I)_{106}<Q(I)_{104})$, and since they both have the same negative integrated charge $(Q(II)_{106}=Q(II)_{104})$, the induced charge at Z=D for curve 106 is negative as shown below by equation (4) and (6).

For example, equation (4) is as follows: Eq. (4) $Q_{106}=Q(I)_{106}-Q(II)_{106}$. Since $(Q(II)_{106}=Q(II)_{104})$, then: Eq. (5) $Q_{106}=Q(I)_{106}-Q(II)_{106}=Q(I)_{106}-Q(II)_{104}$. Since $(Q(I)_{106}<Q(I)_{104})$, and at Z=D $Q_{104}=Q(I)_{104}-Q(II)_{104}=0$, then: Eq. (6) $Q_{106}=Q(I)_{106}-Q(II)_{106}=Q(I)_{106}-Q(II)_{104}<Q(I)_{104}-Q(II)_{104}=0$. Accordingly, $Q_{106}=Q(I)_{106}-Q(II)_{106}<0$.

It may be noted that the negative value of the induced charge $Q_{106}$ on pixel 12 at Z=D is kept almost constant on Charge Sensitive Amplifies (CSA) such as CSA 202 shown in FIG. 3. The negative integrated charge $Q_{106}$ on CSA 202 slowly decays toward a value of zero with a time constant τ that is equal to the product of the feedback capacitor $C_{204}$ and the feedback resistor $R_{206}$ of CSA 202 (see FIG. 3).

From FIG. 2, it may be seen that the farther away is the trajectory of the moving charges collected by the anode 14 from the pixel 12, the smaller is the amplitude of the non-collected induced signals on the pixel 12.

FIG. 3 schematically illustrates an assembly 200 including a detector 210 including pixelated anodes 212, 214 and 216. The pixelated anodes 212, 214, and 216 in various embodiments are coupled to CSA's such as CSA 202 including feedback capacitor 204 and resistor 206. The illustrated detector 210 has a monolithic cathode 208. The pixelated anodes (or pixels) 212, 214 and 216 are positively biased with respect to the cathode 208 and have voltages V, V, and V-ΔV relative to cathode 208, respectively.

As seen in FIG. 3, charge cloud 218 is formed by absorbing a photon in the detector 210 near the cathode 208. The charge cloud 218 moves along trajectory 232 and, close to anodes 212 and 214, is split into two charge clouds 218a and 218b moving along trajectories 224 and 226 toward pixels 212 and 214, respectively.

FIGS. 3a-3d provide graphs 240, 250, 260 and 270, respectively, showing the induced charge Q on the pixelated anode 212 by the various charge clouds 218, 220 and 222 shown in FIG. 3, respectively, as a function of the time t.

Figure 3A:
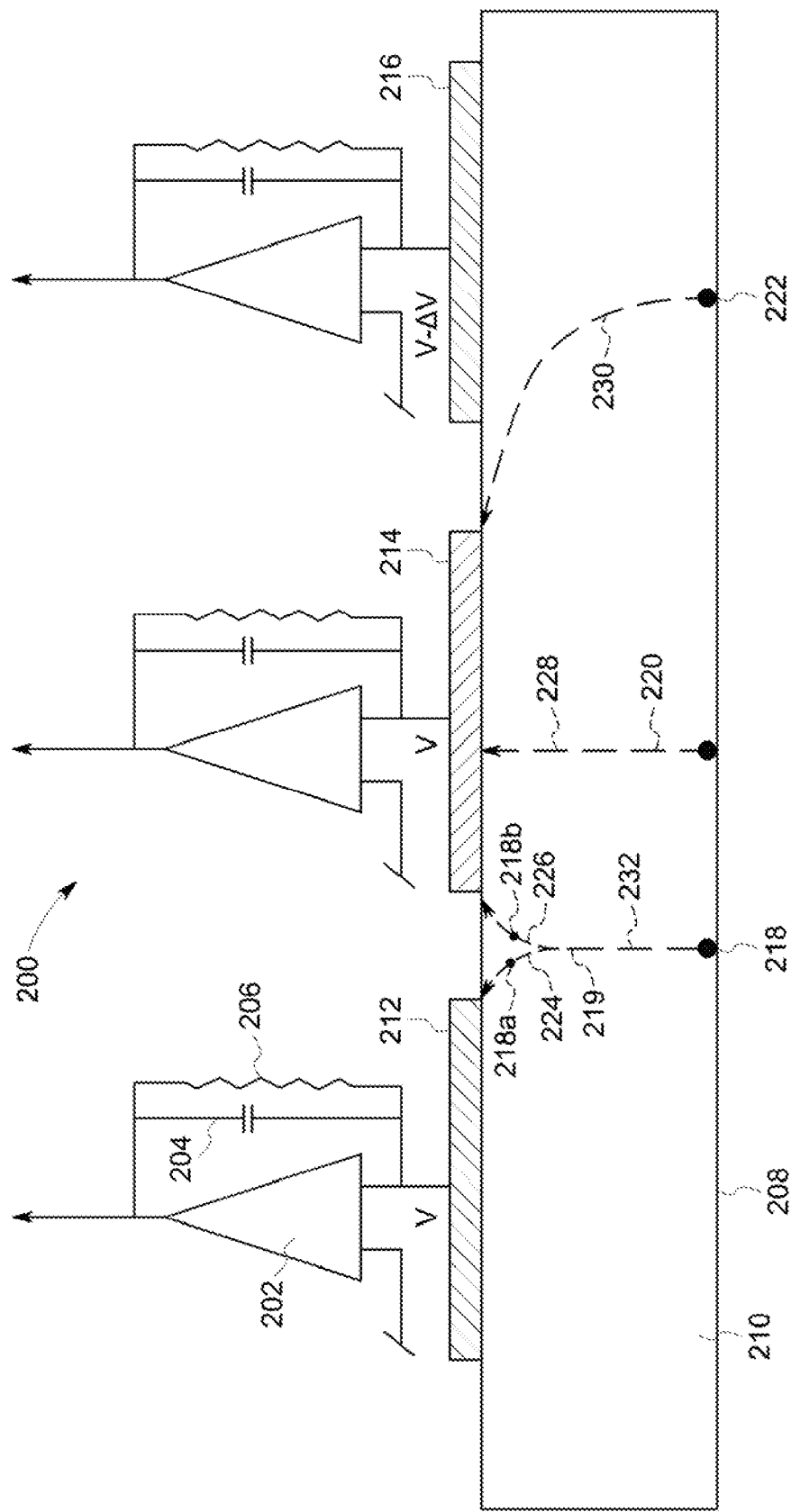
FIG. 3a schematically illustrates a graph showing an induced charge Q on a pixelated anode by charge clouds as a function of time.
Figure 3B:
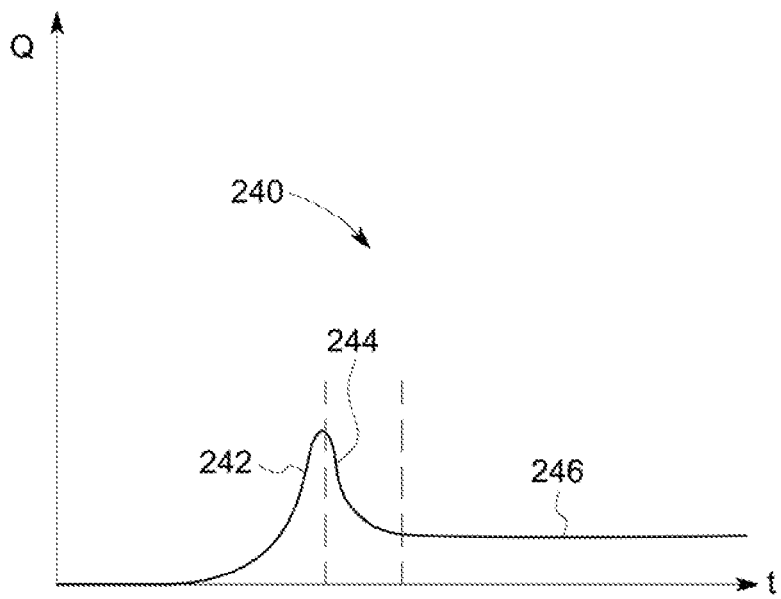
FIG. 3b schematically illustrates a graph showing an induced charge Q on a pixelated anode by charge clouds as a function of time.

FIG. 3a schematically illustrates, in conjunction with FIG. 3, graph 240 showing the induced charge Q on the pixelated anode 212 by charge clouds 218, 218a, and 218b as a function of the time t. Segment 242 in graph 240 relates to trajectory 232 (see FIG. 3) along which charge 218 moves. Charge cloud 218 induces charge Q on the pixelated anode 212 until charge cloud 218 is split into charge clouds 218a and 218b at point 219.

Segment 244 in graph 240 relates to trajectories 224 and 226 (see FIG. 3) along which charges 218a and 218b move from point 219, at which point charge 218 is spit, to pixelated anodes 212 and 214, respectively. Charge 218a induces charge on the pixelated anode 212 as a collected charge, and charge 218b induces charge on the pixelated anode 212 as a non-collected charge moving away from the pixelated anode 212. Since charge 218b moves away from the pixelated anode 212, charge 218b induces negative charge on the pixelated anode 212, which causes the total induced charge Q on pixel 212 to drop down as shown in segment 244 of graph 240. Segment 244 in graph 240 relates to the situation after charges 218a and 218b are already collected by pixelated anodes 212 and 214, respectively. In this situation, the charge Q on the pixelated anode 212 is stabilized at the value related to charge 218a collected by the pixelated anode 212.

With continued reference to FIG. 3, charge cloud 220 is formed by absorbing a photon in the detector 210 near the cathode 208 of the detector 210. The charge cloud 220 moves along trajectory 228 and toward the pixelated anode 214 to be collected by the pixelated anode 214. FIG. 3b schematically illustrates, in conjunction with FIG. 3, graph 250 showing the induced charge Q on the collecting pixelated anode 214 by charge cloud 220 as a function of time t. Segment 252 in graph 240 relates to trajectory 228 (see FIG. 3) along which charge 220 moves. Charge cloud 220 induces charge Q on the collecting (or primary) pixelated anode 214 until it is collected by the pixelated anode 214 as is shown by segment 252 of graph 250. Segment 254 of graph 240 relates to the situation after charge 220 is already collected by the pixelated anode 214. In this situation, the charge Q on the pixelated anode 214 is stabilized at the value related to charge 220 collected by the pixelated anode 214.

Figure 3C:
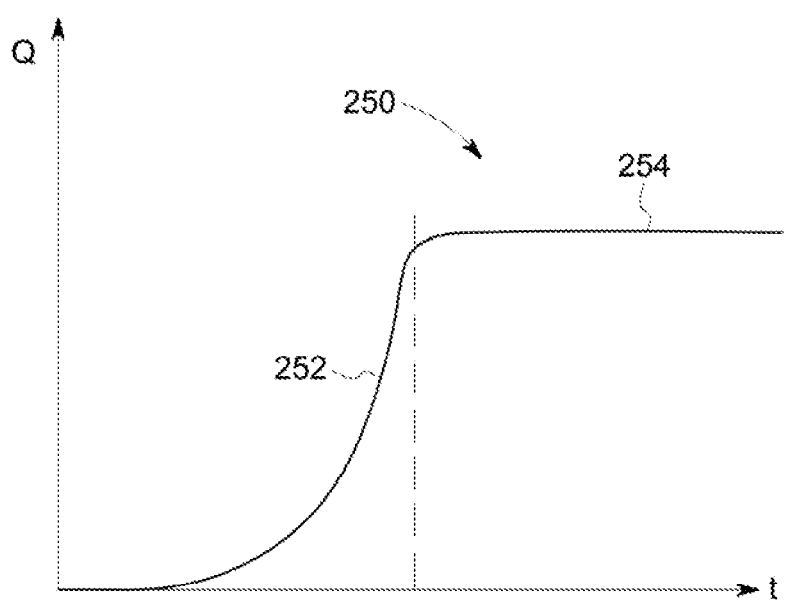
FIG. 3c schematically illustrates a graph showing an induced charge Q on a pixelated anode by charge clouds as a function of time.

FIG. 3c schematically illustrates graph 260 showing the induced charge Q on the pixelated anode 212 versus time t produced by the charge 220 collected by the primary pixelated anode 214. Graph 260 includes segment 262 in which the induced charge Q increases (as discussed above) for the positive integrated induced charge in region (I) of FIGS. 1 and 2. Segment 264 in graph 260 shows the induced charge Q decreasing (as discussed above) for the negative integrated induced charge in region (II) of FIGS. 1 and 2. From graph 260 of FIG. 3c it may be seen that the amplitude of the induced charge on the non-collecting pixelated anode is relatively small, much smaller than the amplitude of the collected signal shown in graph 250 of FIG. 3b. This means that the non-collected signal may have poor SNR which may cause a relatively larger error in deriving the position of the event inside the physical primary pixel.

Figure 3D:
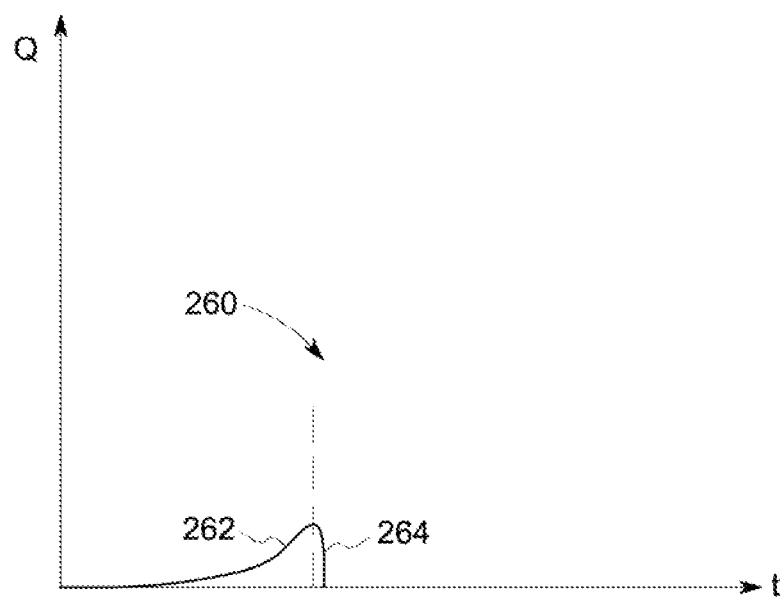
FIG. 3d schematically illustrates a graph showing an induced charge Q on a pixelated anode by charge clouds as a function of time FIG. 4a provides a plan view of an anode unit-structure in accordance with various embodiments.
Figure 3E:
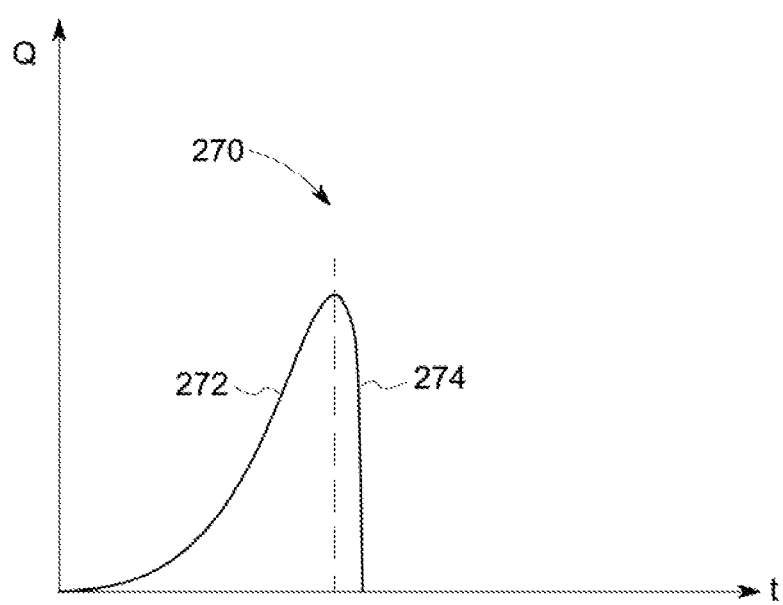
FIG. 3 schematically illustrates an assembly including a detector including pixelated anodes.

FIG. 3d provides an illustration of graph 270 showing the induced charge Q on the pixelated anode 216 versus time t produced by charge 222 collected by the primary pixelated anode 214. Graph 270 includes segment 272 in which the induced charge Q increases (as discussed above) for the positive integrated induced charge in region (I) of FIGS. 1 and 2. Segment 274 of graph 270 shows the induced charge Q decreasing (as discussed above) for the negative integrated induced charge in region (II) of FIGS. 1 and 2. As seen in FIG. 3d, the amplitude of the induced signal on the non-collecting pixelated anode in graph 270 is significantly larger than that depicted in graph 260 of FIG. 3c. This is due to the difference in the relative positions of the trajectories of charge clouds 220 and 222 with respect to their non-collecting pixelated anodes 212 and 216 on which charge clouds induce their charges, respectively, while being collected by primary pixelated anode 214.

It may be noted that the trajectory 228 of cloud 220 is far away from the pixelated anode 212. Accordingly, the induced signal on the pixelated anode 212, by cloud 220, is relatively small as illustrated by graph 260 of FIG. 3c. Unlike trajectory 228 of cloud 220, however, trajectory 230 of cloud 222 is relatively close and immediately under the pixelated anode 216 where the electrical field of the weighting potential of the pixelated anode 216 is strong. Accordingly, the induced signal on the pixelated anode 216, by cloud 222, is large as illustrated by graph 270 of FIG. 3d.

It may further be noted that charge cloud 222 can move from the cathode 208 to the pixelated anode 214 along trajectory 230 without being collected by the pixelated anode 216 even though most of trajectory 230 is under the pixelated anode 216, because, in the illustrated example, the pixelated anode 216 has a potential (V-ΔV) that is lower than the potential V of the pixelated anode 214. Accordingly, charge cloud 222 is attracted to the pixelated anode 214 rather than to the pixelated anode 216 due to the higher potential of the pixelated anode 214.

It may be noted that in the case of FIG. 3d, the induced charge is higher than that for FIG. 3c, and accordingly has better SNR resulting in more accurate position derivation of the primary event inside the primary pixel 214. The principle of biasing the non-collecting anodes with a potential that is lower than the potential of the collecting anodes for enhancing the induced signal on the non-collecting anodes is illustrative of various embodiments described below. However, in various embodiments discussed herein specific anode geometry techniques are employed to provide higher induced non-collected charges.

Figure 4A:
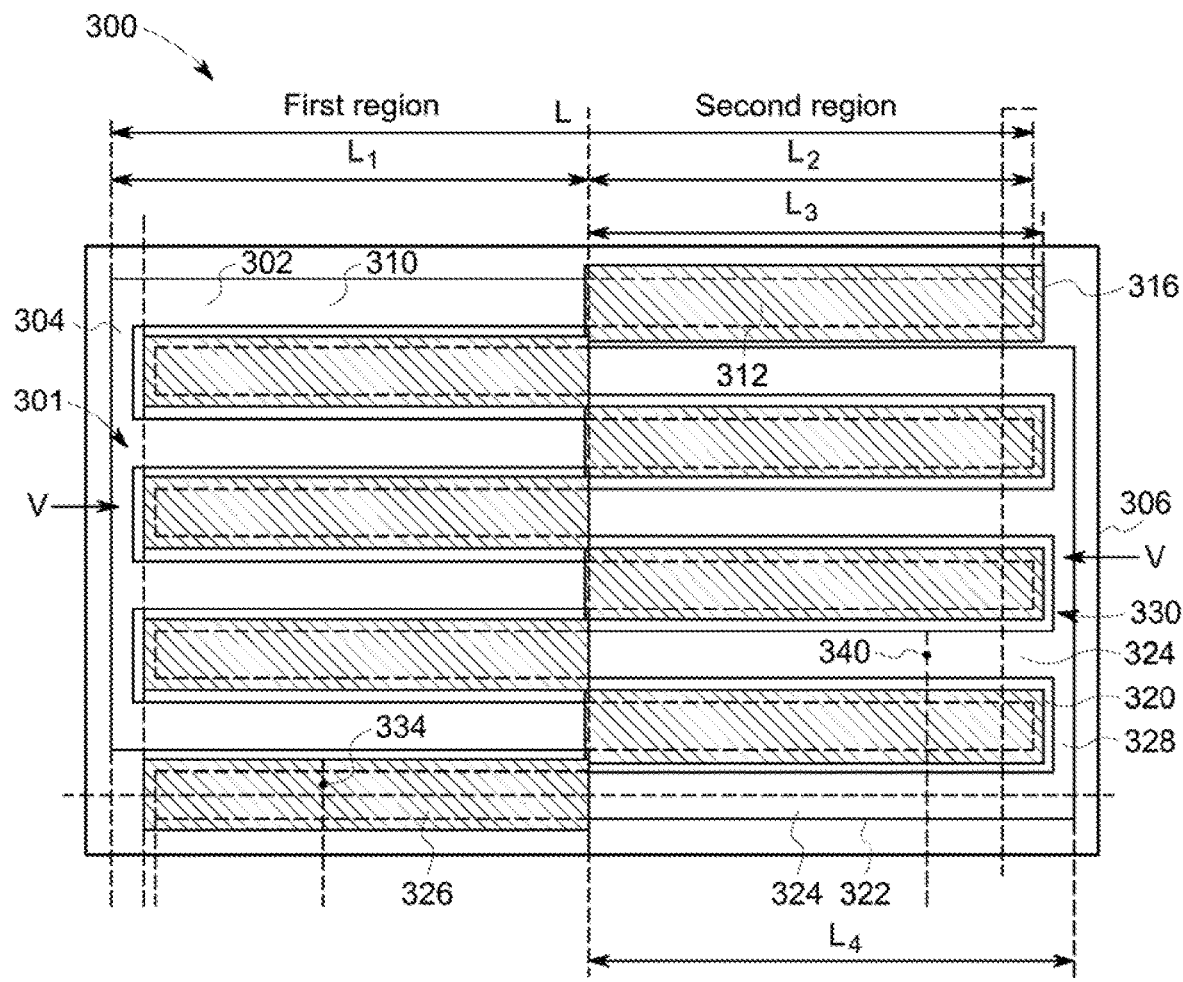
Figure 4B:
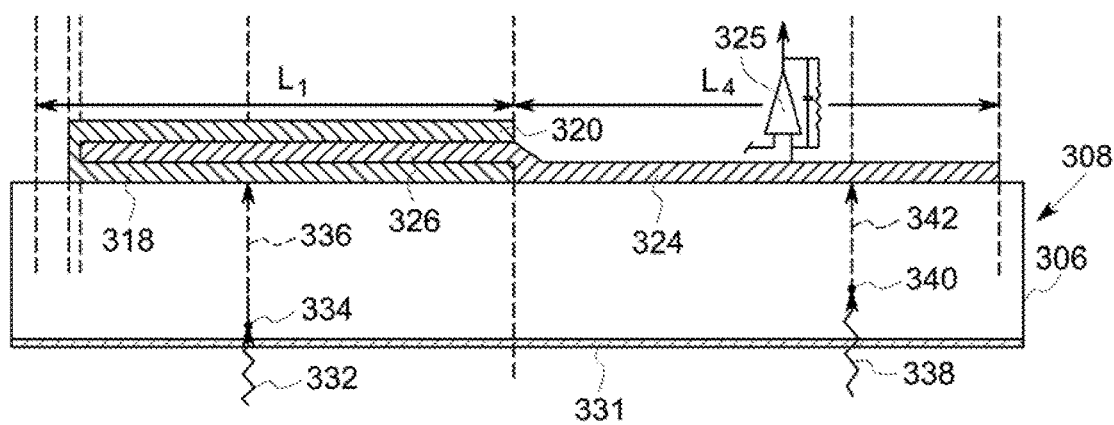
Figure 4C:
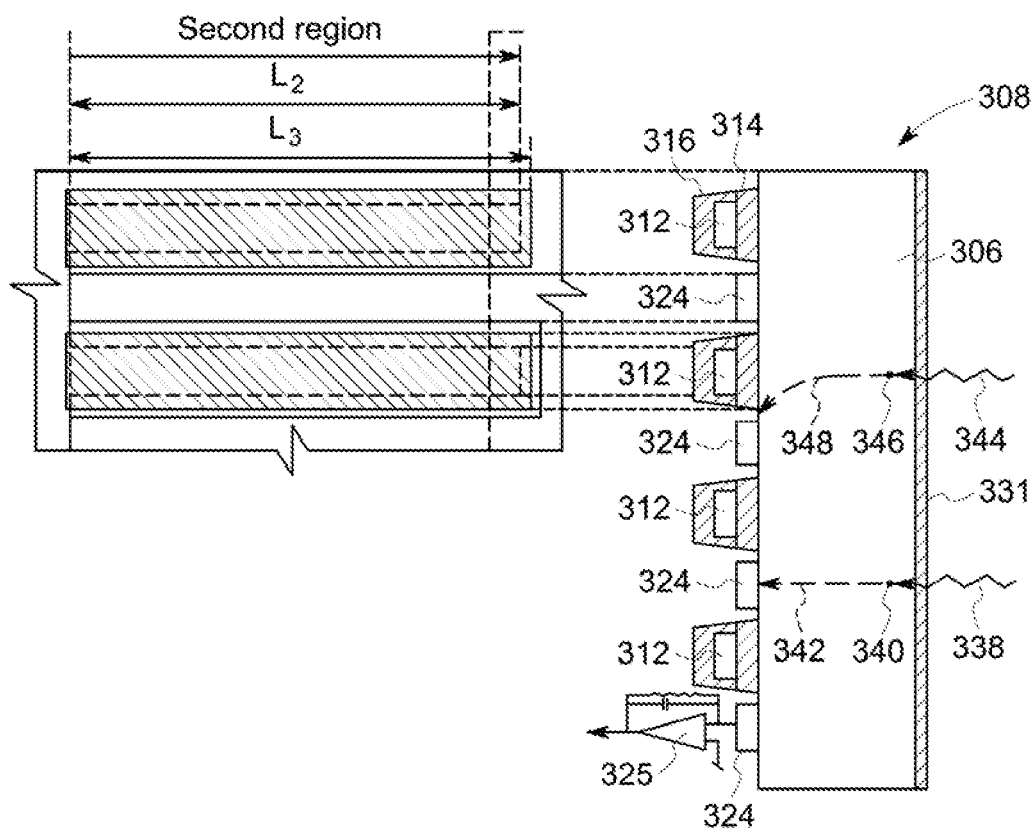

For example, FIGS. 4a-4c provide a schematic top view, a schematic side sectional view, and a schematic end sectional view of an anode unit-structure 300 according to various embodiments. The anode unit-structure 300 is configured to enhance the amplitude of the non-collected signal on the non-collecting anodes. In various embodiments, the anode unit-structure 300 uses a bias voltage configuration that is similar in various respects to the one shown in FIG. 3, in which the bias voltage on the non-collecting anodes is lower than the bias voltage on the collecting anodes. Generally, in various embodiments, as discussed in more detail below, the anode unit-structure 300 includes two grids interleaved together. Each grid has two segments or regions, including a first segment or region that has exposed lines of metal strips (e.g., metal strips applied directly on the semiconductor of the detector), and a second segment or region that includes isolated metal strips buried in electrically isolating material, with at least a portion of the electrically isolating material forming an insulating layer located between the metal strips and the semiconductor of the detector. The detector under the first segment or region accordingly may be at a higher bias voltage than the detector under the second segment or region, with the first segment or region utilized as a collecting anode, and the second segment or region utilized as a non-collecting anode. In various embodiments, plural anode unit-structures (or portions thereof) are joined to form an anode cell, with the anode cell used as a pixelated anode in a grid of pixelated anodes.

FIG. 4a provides a plan view of an anode unit-structure 300. The anode unit-structure 300 includes metal anode strips 302 electrically connected by a metal base strip 304 to form a fork-like structure 301 with the anode strips 302. The depicted anode strips 302 have a length L containing two segments. The first segment has a length $L_1$ and is an exposed segment 310 that is applied directly on semiconductor plate 306 (shown in FIGS. 4a and 4c) from which detector 308 (shown in FIG. 4c) is made. The second segment has a length $L_2$, and is a buried segment 312 shown by broken lines. The buried segment 312 is buried (or interposed) between two insulating layers 314 and 316 shown in FIGS. 4a and 4c. The insulating layers 314, 316 have length $L_3$.

The electrically insulating layer 314 in various embodiments is applied directly on the semiconductor plate 306 of the detector 308, and the anode strips 302, in segment 310, are deposited directly on the semiconductor plate 306 and deposited on layer 314 in segment 312. The anode strips 302 may be deposited as segments 312 which are covered by an additional insulating layer 316 to form a buried strip 312 that is surrounded by the insulating layer 314 and the insulating layer 316 as shown in FIG. 4c and also shown in FIG. 4a. It may be noted that the insulating layers 314, 316 may be made of, by way of example, positive or negative photoresistors, Polyimid, polymers, insulating sticky tapes, or other insulating materials that may be applied on the semiconductor plate 306. Various techniques that may be used to apply the insulating layers include, for example, photolithographic techniques, painting, brushing, spraying, or taping. As shown in FIG. 4a, the depicted insulating layers 314, 316 have a length $L_3$, which is larger than the length $L_2$ of the segments 312. The longer lengths of the insulating layers helps ensure that the segments 312 are surrounded by insulating materials from all sides except for the side where the segments are connected to the segments 310.

In addition to the fork-like structure 301 (which includes the anode strips 302, the connecting strip or base strip 304, the exposed segments 310, and the buried segments 312) and the electrically insulating layers 314 and 316, the anode unit-structure 300 includes fork-like structure 330 having a mirror symmetry with the fork-like structure 301. The fork-like structure 330 includes corresponding anode strips 322, connecting strip 328, exposed segments 324, buried segments 326, and electrically insulating layers 318, 320 (see FIGS. 4a and 4b). The segments and regions of the two grids (a first grid formed by the first fork-like structure 301 and a second grid formed by the second fork-like structure 330) are arranged such that where the first grid has a region with exposed strips, the second grid has buried or insulated strips, and vice versa. As seen in FIG. 4a, the exposed segments 310 of the first fork-like structure 301 are adjacent to (or disposed in openings between) the buried segments 326 of the second fork-like structure 330, and the buried segments 312 of the first fork-like structure 301 are adjacent to (or disposed in openings between) the exposed segments 324 of the second fork-like structure 330. It may be noted that the fork-like structures are examples of grids, and that other shapes of grids may be used in various alternate embodiments.

It may be noted that FIG. 4b shows a cross-section of the buried strip 326 surrounded by electrically insulating layers 318 and 320 from all sides except where the buried strip 326 is connected to the exposed strip 324, with the cross-section of the buried strip 326 having mirror symmetry to the cross-section of the buried strip 312 surrounded by electrically insulating layers 314 and 316 from all sides except where it is connected to exposed strip 310. It may also be noted that while the side sectional view of FIG. 4c shows strips 312 that are buried by or interposed between insulating layers 314 and 316, that strips 326 are buried by or interposed between insulating layers 318 and 320 on the other side of the anode unit-structure 300, where the strips 310 are exposed. It may further be noted that, in various embodiments, the detector 308 is a pixelated detector having pixilated anodes made of anode cells, with each anode cell including one or more anode unit-structures 300.

In various embodiments, both fork-like structures 301 and 330 are biased at the same potential V. The exposed segments 302 and 324 are applied on top of the semiconductor plate 306 and accordingly the detector underneath segments 302 and 324 has potential V. In contrast, the buried segments 312 and 326 are coupled to the semiconductor plate 306 via a resistor-like and/or capacitor-like structure formed by the electrically insulating layers 314 and 318. Accordingly, all the DC voltage V, applied between cathode 331 and the anodes, is dropped on these resistor and or capacitor-like structures and the potential of the semiconductor under buried segments 312 and 326 is much lower than V or may be even close to zero. Accordingly, the buried segments 312 and 326 act as non-collecting electrodes, with the potential, on detector 308, underneath these segments is much lower than the potential, on detector 308, underneath exposed segments 302 and 324 and may even be close to zero, and substantially lower than the potential V underneath the exposed segments 310 and 324.

As seen in FIG. 4a, the depicted anode unit-structure 300 includes two regions. A first region along length $L_1$ contains exposed segments 310 of the fork-like structure (or grid) 301, which are collecting anode strips, and buried segments 326 of the fork-like structure (or grid) 330, which are non-collecting anode strips. Similarly, the second region along length $L_2$ contains exposed segments 324 of the fork-like structure (or grid) 330, which are collecting anode strips, and buried segments 312 of the fork-like structure (or grid) 301, which are non-collecting anode strips. The length of the exposed segments 324 including their connecting strip 328 is $L_4$.

As best seen in FIG. 4b, a photon 332 is absorbed in the semiconductor plate 306 of the detector 308 and produces charge cloud 334. The charge cloud 334 moves along trajectory 336 from the cathode 331 toward the anode strips in the first region of the anode unit-structure 300. Even though photon 332 is absorbed under one of non-collecting buried segments 326 in the first region of anode unit-structure 300, as shown in FIG. 4a, it will be collected by one of collecting exposed segments 310 in the first region of structure 300 (due to the higher potential of the exposed segments relative to the buried segments).

This process is similar to that illustrated in the end sectional view in FIG. 4c, where the photon 344 is absorbed in the semiconductor plate 306 of the detector 308 under the non-collecting buried anode strip 312 and produces charge clouded 346 that moves toward the collecting exposed anode strip 324 to be collected by the anode strip 324. This process is also generally similar in respects to that shown by charge 222 and trajectory 230 of FIG. 3, which results in enhanced induced non-collected signal shown by graph 270 of FIG. 3d. As used herein, an enhanced induced non-collected signal, such as the one shown by graph 270 of FIG. 3d, means a non-collected induced signal, such as the one produced by moving charges under the non-collecting anodes, that is larger than the induced non-collected signal, such as the one shown in graph 260 of FIG. 3c, which is received from a primary event occurring at a primary pixel that is adjacent to and remote from the non-collecting pixel on which the non-collected signal is measured. Accordingly, events absorbed in the first region of the anode unit-structure 300 are collected by one of the exposed segments 310 of the first fork-like structure (or grid) 301 and produce enhanced non-collected signals on the non-collecting buried segments 326 of the second fork-like structure (or grid) 330.

Also, as shown in FIG. 4c, photon 338 is absorbed in the semiconductor plate 306 of the detector 308 and produces charge cloud 340 moving along trajectory 342 from the cathode 331 toward the anode strips in the second region of the anode unit-structure 300. Photon 338 is absorbed under one of collecting exposed segments 324 of the grid 330 in the second region of the anode unit-structure 300, as shown in FIG. 4a, and is collected by one of the collecting exposed segments 324 in the second region of the anode unit-structure 300. The collected charge on the segment 324 is fed into the input of CSA 325, which is the first stage of a pre-amp of an associated electronic channel in an ASIC. For the illustrated embodiment, the detector 308 includes many segments 324 and each of them is coupled to a corresponding CSA like CSA 325. It may be noted that, for example, segments 324, such as, segments 324 in grid 330, are electrically connected by strip 328 and may be coupled to a single CSA, such as CSA 325.

This process is also illustrated by the end sectional view shown in FIG. 4c where the photon 338 is absorbed in the semiconductor plate 306 of the detector 308 under the collecting exposed anode strip 324 of the grid 330 and produces charge cloud 340 that moves toward the collecting exposed anode strip 324 to be collected by the exposed anode strip 324. Even though charge cloud 340 is produced under segment 324 as shown in FIG. 4a, and moves along trajectory 342 directly toward the collecting exposed segment 324 of the grid 330, the charge cloud 340 still moves under the non-collecting buried segments 312 of the grid 301 and, accordingly, produces an enhanced non-collected signal on the segments 312. Accordingly, events absorbed in the second region of the anode unit-structure 300 are collected by one of exposed segments 324 of the grid 330 and produce enhanced non-collected signals on the non-collecting buried segments 312 of the grid 301.

In summary, as seen in FIGS. 4a-c, any event that is produced in the first region of the anode unit-structure 300 of the detector 308 will produce a collected signal on the grid 301 and an enhanced non-collected signal on the grid 330. Similarly, any event that is produced in the second region of the anode unit-structure 300 of the detector 308 will produce a collected signal on the grid 330 and an enhanced non-collected signal on the grid 301. As the anode unit-structure 300 includes both collecting and non-collecting portions, any pixelated anode including one or more anode unit-structures 300 (or portions thereof) provides an example of a pixelated anode that includes collecting and non-collecting portions.

FIGS. 5a-5d schematically illustrate example processing steps that may be used to fabricate the detector 308 with anode unit-structures 300. FIGS. 5a-5d and FIGS. 4a-4c illustrate corresponding components and aspects. Accordingly, similar reference numerals will be used in connection with FIGS. 4a-c and 5a-d.

Figure 5A:
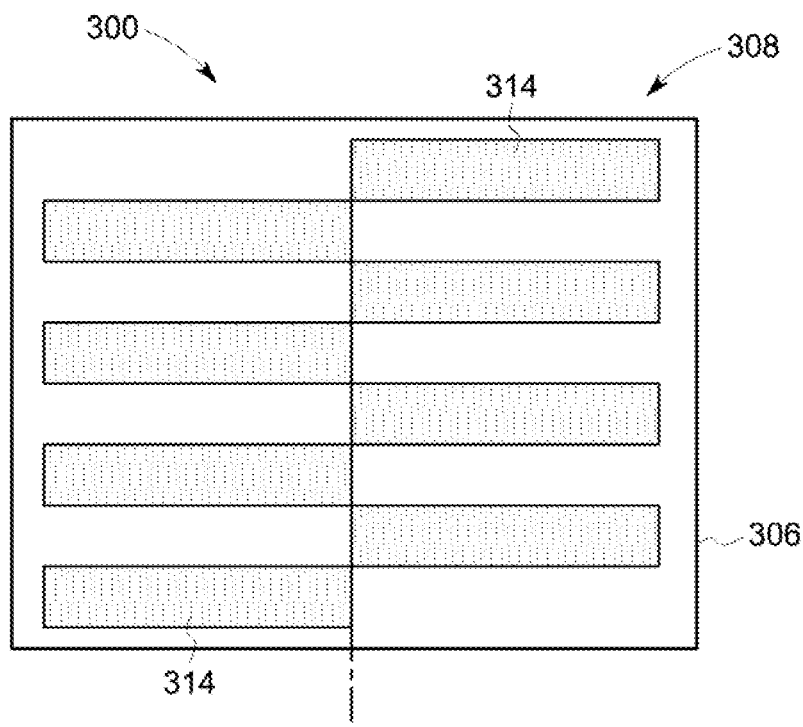
FIG. 5a provides a schematic plan view of insulating layers of an anode unit-structure in accordance with various embodiments.

FIG. 5a illustrates a schematic plan view of the anode unit-structure 300 showing the electrical insulating layer 314 in the form of staggered strips. The insulating layer 314 may be made, for example, of positive or negative photoresistors or polyimid applied on top of the semiconductor plate 306 using photolithographic techniques. Alternatively, the insulating layer 314 may be made of a passivation layer, or may be made of ZnS evaporated on the semiconductor plate 306 via shadowing mask or shaped by photolithographic methods.

Figure 5B:
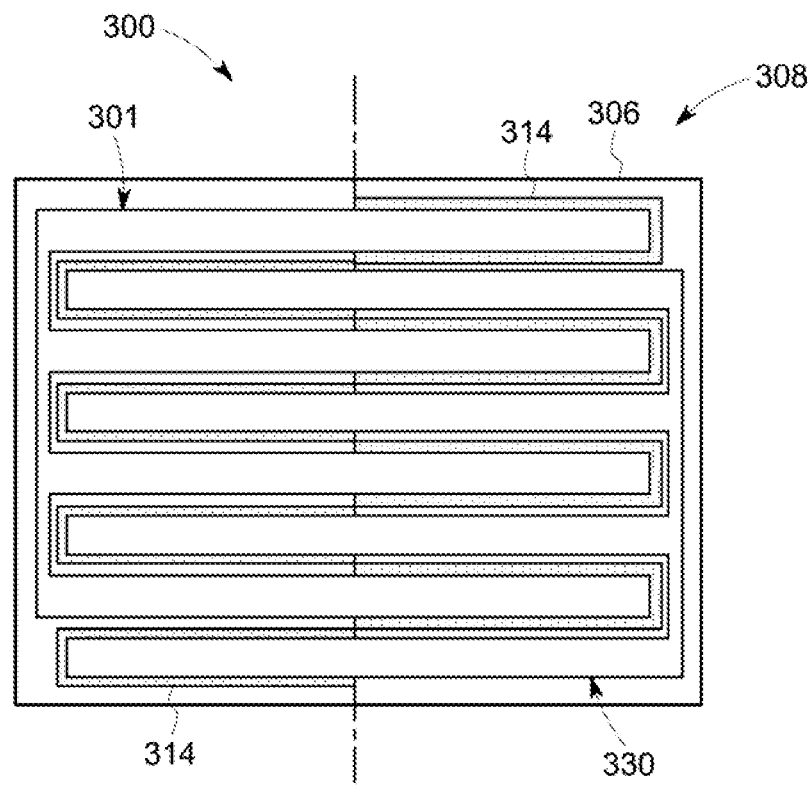

FIG. 5b schematically illustrated grids (or fork-like structures in the illustrated example) 301 and 330. The grids 301, 330 of the illustrated embodiment are made of metal anode strips partially evaporated on the electrically insulating layer 314 as well as on the semiconductor plate 306. The grids 301 and 330 are interleaved one inside the other (e.g., with the fingers or strips of each grid extending adjacent one or more fingers or strips of the other grid). The particular shapes of the grids 301 and 330 may be formed by photolithographic techniques or using shadowing masks, for example. FIG. 5d provides an exploded view of the grids 301 and 330. FIG. 5d is provided for clarity of illustrating the shapes of the grids. As seen in FIG. 5d, the grids 301 and 330 are shown as two separated grids that are illustrated individually without being interleaved in the other grid.

Figure 5C:
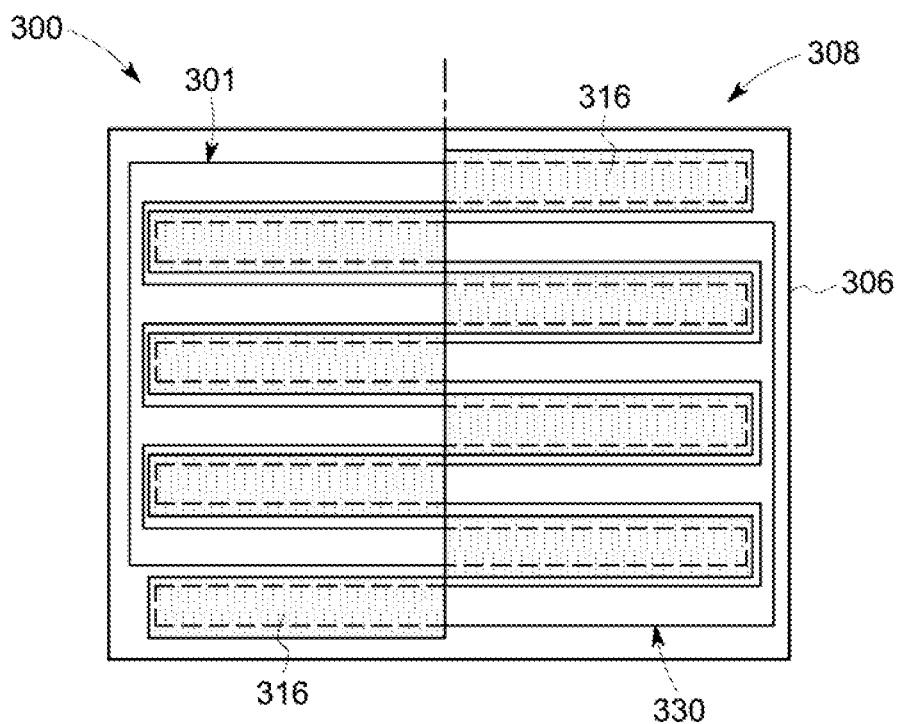
Figure 5D:
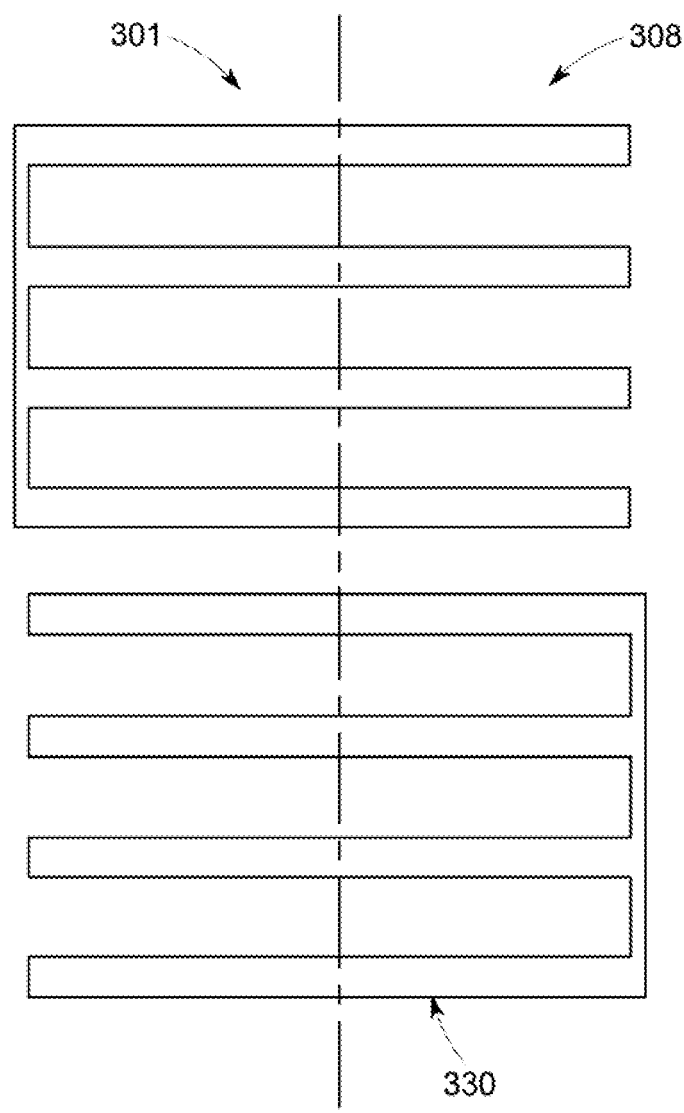
FIG. 5*d* provides an exploded view of the grids of FIG. 5*b*.

FIG. 5c provides a schematic top view of the anode unit-structure 300 that shows the electrical insulating layer 316 in the form of staggered strips. The insulating layer 316 in various embodiments may be made of positive or negative photoresistors or polyimid partially applied on top of the grids 301 and 330 and partially applied on the semiconductor plate 306 using photolithographic techniques. The strips of the insulating layer 314 (see FIG. 5a) and the insulating layer 316 in the illustrated embodiment are wider than the strips of the grids 301 and 330. Accordingly, the electrically insulating layers 314 and 316 surround and encapsulate the strips of the grids 301 and 330 from all sides in the buried regions except for the side connecting between the exposed strips and the buried strips of the grids 301 and 330. Alternatively, for example, the layer 316 may be made of ZnS evaporated partially on the grids 301 and 306 and partially evaporated on the semiconductor plate 306 via shadowing mask or shaped by photolithographic methods.

Figure 6:
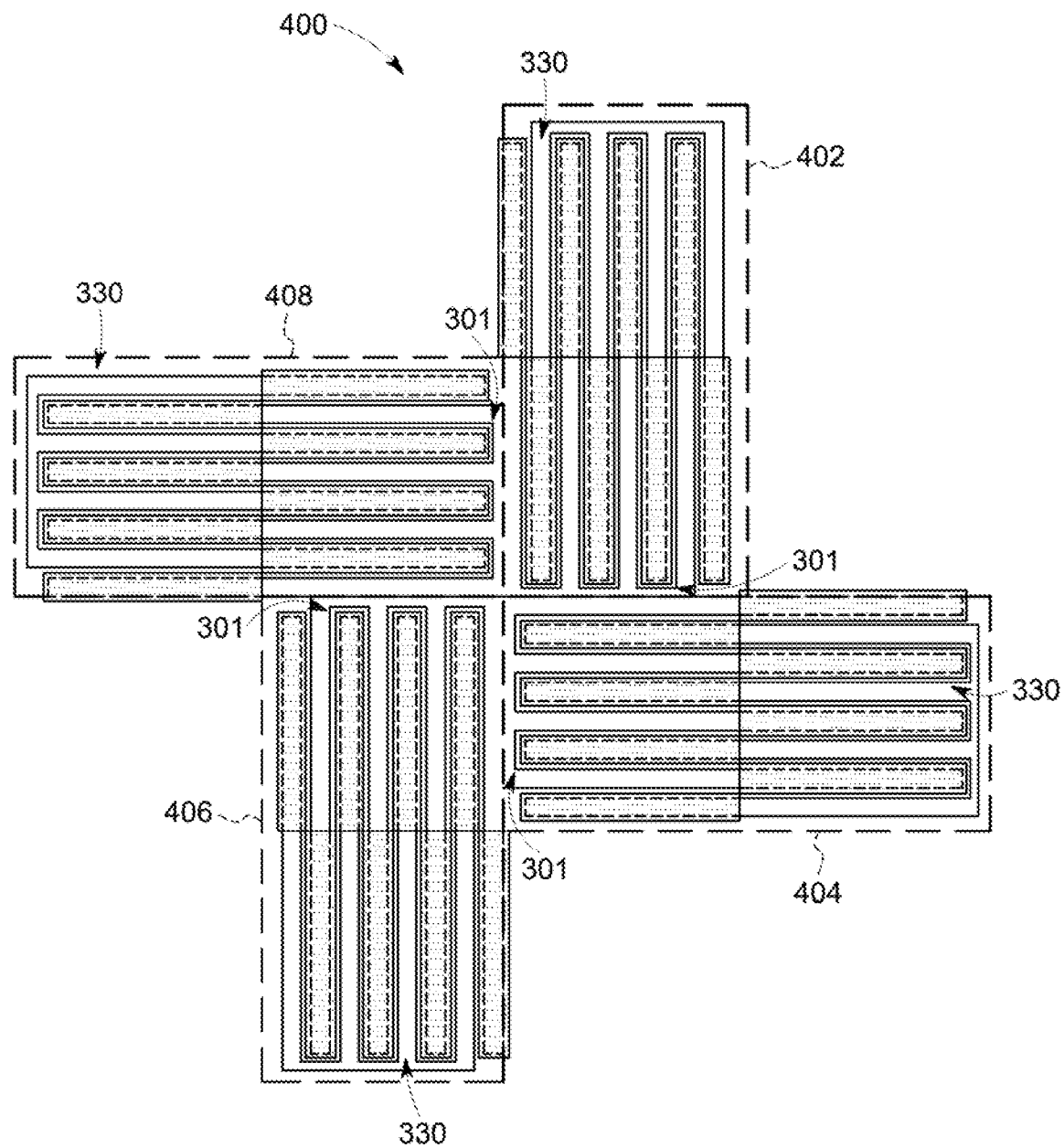
FIG. 6 provides a schematic plan view of an anode unit-cell that includes four anode unit-structures in accordance with various embodiments.
Figure 7:
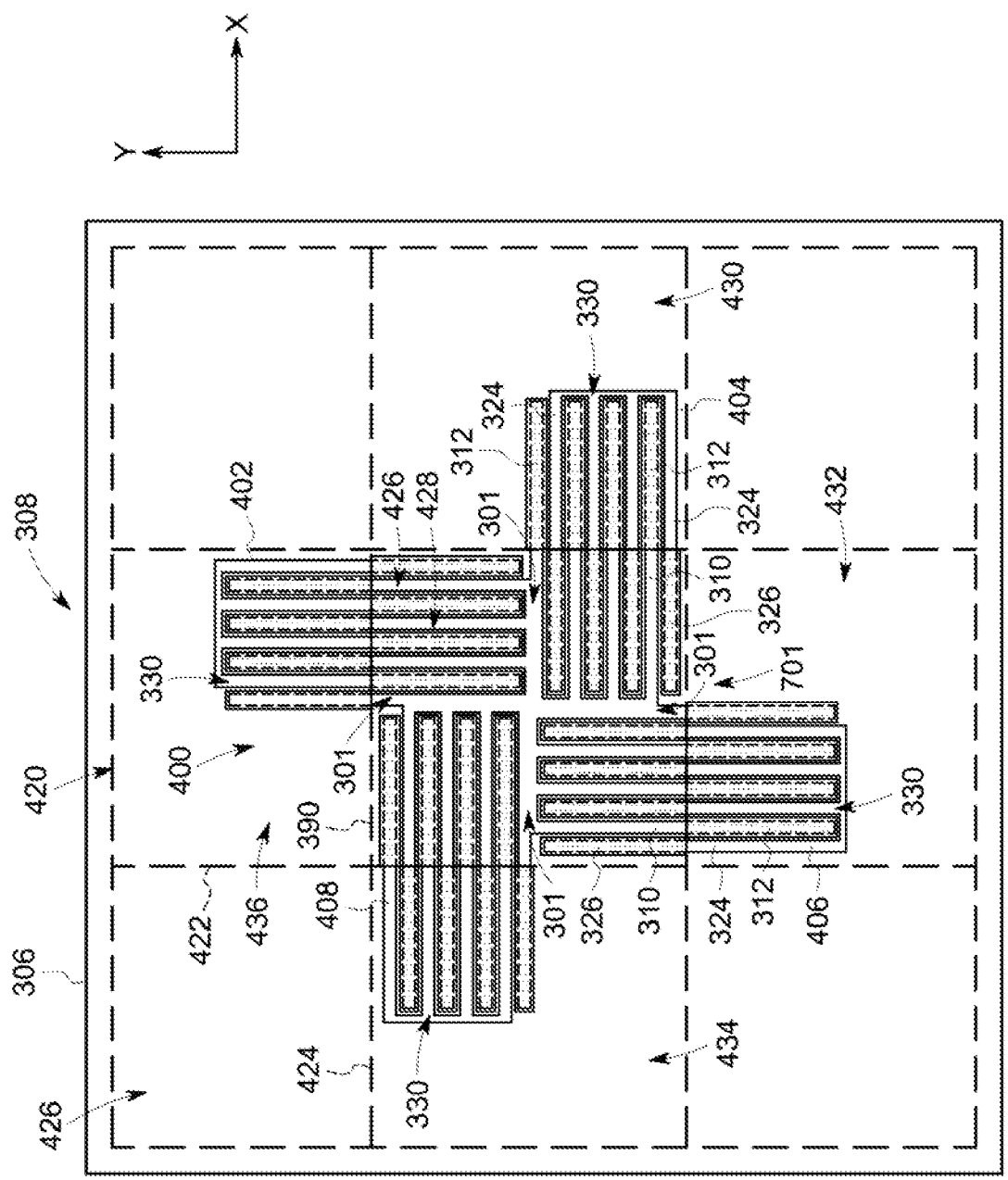
FIG. 7 provides a schematic top view of a radiation imaging detector in accordance with various embodiments.

FIG. 6 provides a schematic plan view of an anode unit-cell 400 that includes four anode unit-structures 402, 404, 406 and 408 marked by frames of broken lines. Each anode unit-structure 402, 404, 406, and 408 may be generally similar in various aspects to the anode unit-structure 300 discussed herein. As explained above in the descriptions accompanying FIGS. 4a-4c and 5a-5d, each one of the anode unit-structures 402, 404, 406 and 408 contains two grids, grid 301 and grid 330. In the unit-cell 400 all the grids 330 of the anodes unit-structures 402, 404, 406 and 408 are facing out. Further, the grids 301 of the anode unit-structures 402, 404, 406 and 408 are electrically connected and may form one contact-layer containing multiple grids 301, as shown in FIG. 7. For example, the grids 301 are connected to electronic channels of an ASIC when at least one electronic channel is connected to the corresponding grids 301 of each one of the pixels. The connected grids 301 may be referred to as a pixelated anode. Accordingly, a pixelated anode including the grids 301 includes exposed regions 310 within a square foot print 390 (which may be defined by a collimator opening) and insulated regions 312 extending beyond the square footprint 390 (which corresponds to opening 426 of collimator 420 shown in FIG. 7).

It may be noted that the grid 301 and the grid 330 in unit-structures 300 of unit-cell 400 have rotational symmetry of 180°. According, the position of grids 301 and 330 may be swapped such that all grids 330 of the anode unit-structures 402, 404, 406 and 408 are electrically connected and may form one contact-layer containing multiple grids 330 and all the grids 301 of the anodes unit-structures 402, 404, 406 and 408 are facing out. Similarly, groups of connected grids 330 may be in turn connected to electronic channels of an ASIC, with at least one electronic channel is connected to the corresponding grids 330 of each one of the pixelated anodes (or connected groups of grids 330).

FIG. 7 provides a schematic top view of a radiation imaging detector 308. The detector 308 includes a semiconductor plate (or substrate) 306, and also includes a collimator 420 having septa 422 along Y direction and septa 424 along X direction, with the septa 422, 424 illustrated by broken lines. The septa 422 and septa 424 form collimating openings 426 in the collimator 420. FIG. 7 schematically illustrates a similar anode unit-cell 400 to that shown in FIG. 6, which includes four anode unit-structures 402, 404, 406 and 408 in a configuration with all grids 301 are electrically and geometrically combined together to form a single layer 301 containing multiple grids 301. The four connected grids 301 of FIG. 7 may be referred to as a pixelated anode 701. It may be noted that pixelated anode 701 includes the exposed portions within the corresponding pixel 428, but not the buried portions within the corresponding pixel 428. The pixelated anode 701 also includes the buried portions that extend from the pixel 428 into adjacent pixels shown in FIG. 7.

It may be noted that for a particular grid 301, that grid 301 is interleaved with a given grid 330 to form an anode unit-structure. However, due to the connection of the particular grid 301 with other grids 301 and the connection of the given grid 330 with other grids 330, the grid 330 is part of an adjacent pixelated anode to the pixelated anode that is formed with the grid 301. Accordingly, while two grids may cooperate to form an anode unit-structure, the two grids may be part of separate pixelated anodes in various embodiments. It may further be noted that each pixel may be understood as being composed of two portions. The first portion of the pixel is the exposed portions, which serve as the collecting part of the pixel or corresponding pixelated anode. The second portion of the pixel is the buried portions of the grids that serve as the non-collecting portions of the pixels that are adjacent to the collecting pixel.

The collimator 420 is disposed above the surface of the semiconductor plate 306 and close to the anode unit-cell 400. The opening 426 above the anode unit-cell 400 defines a pixel 428 of the detector 308. It may be noted that for clarity and ease of illustration, only one anode unit-cell 400 of the detector 308 is shown. However, in practice, the detector 308 may include multiple anode unit-cells 400 as discussed herein.

The septa 422 and 424 are aligned along the borders between the exposed segments 310 and 324 and buried segments 312 and 326 of the anode unit-structures 402, 404, 406 and 408 (see also exposed segments 310 and 324 and buried segments 312 and 326 of anodes unit-structure 300 of FIGS. 4a-4c). As mentioned above, the relative position between the openings 426 of collimator 420 and the anode unit-cell 400 determines the location of the pixel 428 to be the area on the anode unit-cell 400 that the opening 426 surrounds or contains. The pixel 428 includes the exposed segments of four grids 301 of anodes unit-structures 402, 404, 406 and 408, which are interleaved with the buried segments of four grids 330 of anodes unit-structures 402, 404, 406 and 408. It may be noted that the buried portions or segments of the four grids 301 forming the pixelated anode 701 extend beyond the opening 426, or outside of the pixel 428. Accordingly, portions of the pixelated anode 701 (e.g., the buried portions of the grids 301) extend beyond the pixel 428 associated with the pixelated anode 701, or beyond the pixel 428 where the pixelated anode 701 resides.

When an event (e.g., absorbed photon) is produced in the area under pixel 428, the charge of this event produces a collected induced signal on the combined grid 301 inside the pixel 428 and produces at least one enhanced non-collected induced signal on one of the grids 330 having non-collecting buried portions inside pixel 428 and exposed portions located in one of the surrounding pixels 430, 432, 434 or 436 that are adjacent to pixel 428. For example, if the event is produced under the area of anode unit-structure 404 inside pixel 428, there would be a collected signal on the combined grid 301 in the pixel 428 and an enhanced non-collected signal on the grid 330 inside adjacent pixel 430. Similarly, if the event is produced under the area of the anode unit-structure 406 that is inside pixel 428, there would be a collected signal on the combined grid 301 in the pixel 428 and an enhanced non-collected signal on the grid 330 inside the pixel 432. Similarly, if the event is produced under the area of the anode unit-structure 408 inside the pixel 428, there would be a collected signal on the combined grid 301 in the pixel 428 and an enhanced non-collected signal on the grid 330 inside the pixel 434. Or if, the event is produced under the area of anodes unit-structure 402 inside pixel 428, there would be a collected signal on combined grid 301 in pixel 428 and an enhanced non-collected signal on grid 330 inside pixel 436.

Accordingly, when a collected event is measured on a combined grid 301 at pixel 428 and a simultaneously enhanced non-collected signal is measured on grid 330 in one of the pixels 430, 432 434 or 436, it means that the event location is within the area of a quarter of pixel 428, which is the area of one of anode unit-structures 402, 404, 406 or 408, inside pixel 428, in which the enhanced non-collected signal is measured on grid 330 at a pixel adjacent to pixel 428.

Accordingly, the location of the event inside the pixel 428 may be found with a spatial resolution that is equal to a quarter of the area of the pixel 428. The specific quarter inside pixel 428 in which the event occurs may be identified by the simultaneous collected signal and enhanced non-collected signals in the pixel 428 and a pixel adjacent to pixel 428, respectively. Further, the quarter of the pixel 428 in which the collected event occurs is included in the anode unit-structure that is common to the pixel 428 and the adjacent pixel in which the simultaneous enhanced non-collected signal is measured. It may be noted that the above discussion relates to the collected signal at pixel 428 and the enhanced non-collected signal at one of the pixels adjacent to pixel 428 when the enhanced non-collected signal is the strongest signal measured out of all the signals at the pixels adjacent to pixel 428. Other adjacent non-collected signals measured at pixels adjacent to pixel 428 may be used to apply weighted average of these signals for deriving sub-pixilation of each of the quarters, mentioned above, inside pixel 428.

Figure 8A:
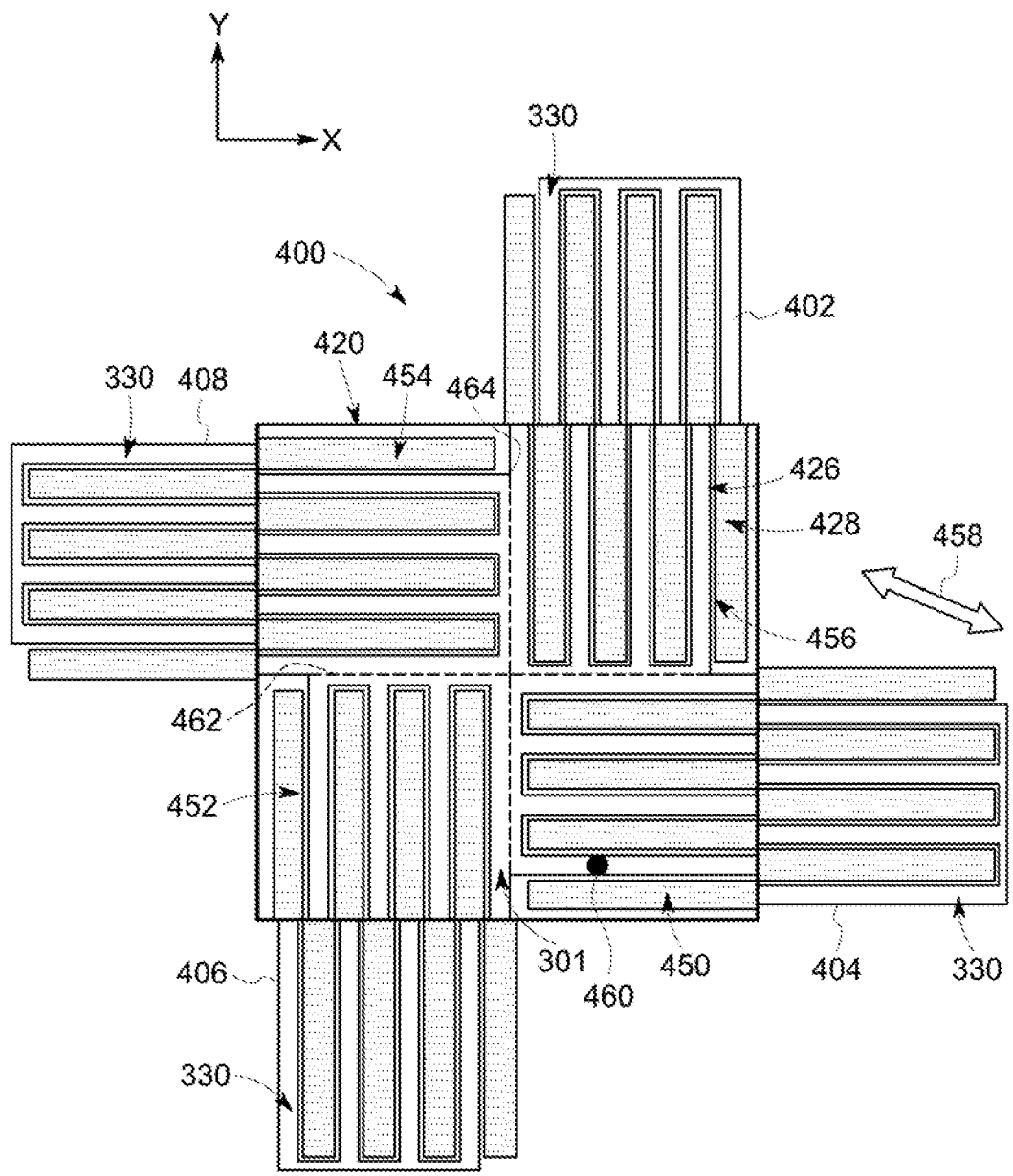
FIG. 8*a* shows an enlarged view of aspects of the collimator of FIG. 8*b*.
Figure 8B:
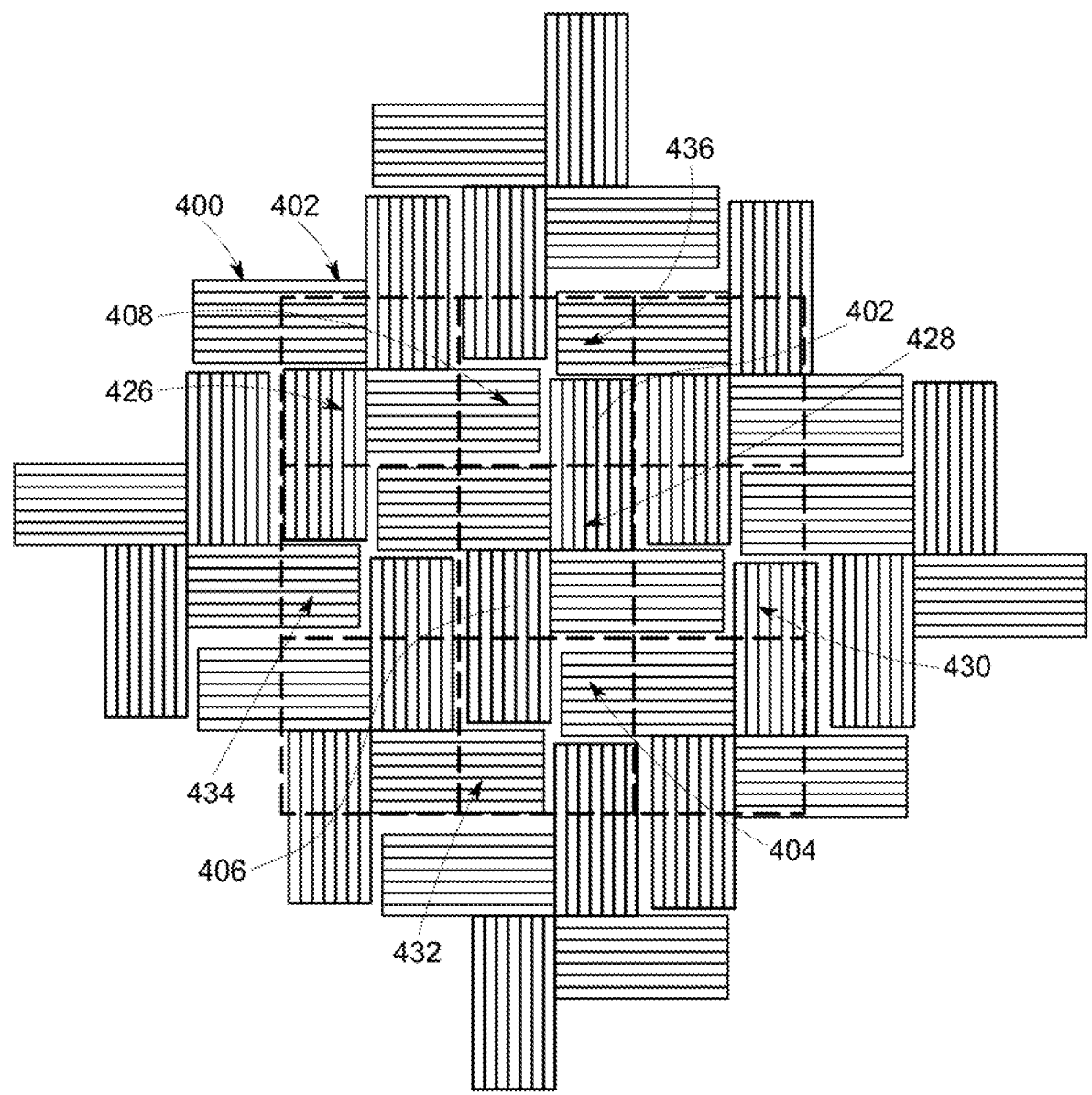
FIG. 8*b* schematically depicts a collimator having nine openings in accordance with various embodiments.

Next, reference is made to FIGS. 8a and 8b. For clarity of illustration, FIG. 8a schematically illustrates an enlarged part of FIGS. 7 and 8b. The arrow 458 indicates that the portion of FIG. 8b that includes the pixel 428 is enlarged in FIG. 8a, and includes the anode unit-cell 400 that contains anode unit-structures 402, 404, 406 and 408. The opening 426 of the collimator 420 is disposed above the pixel 428 and aligned with the pixel 428. The anode unit-structures 402, 404, 406 and 408 have a common combined grid 301 having its exposed portions within the pixel 428 and its buried portions outside pixel 428 in the pixels adjacent to pixel 428, along with grids 330 having their exposed portions located outside of the pixel 428 and their buried portions inside pixel 428. The pixel 428 is virtually divided, by broken lines 462 and 464, into four virtual sub-pixels 450, 452, 454 and 456. As discussed above in connection with FIG. 7, the location of an event such as event 460 in the sub-pixel 450 is identified by measuring simultaneously a collected event in the pixel 428 and an enhanced non-collected event on grid 330 of the anode unit-structure 404 having exposed segments in the pixel adjacent to pixel 428.

FIG. 8b schematically depicts a collimator 20 having nine openings 426, with various of the openings 426 located above the pixels 428, 430, 432, 434 and 436. FIG. 8b shows multiple anode unit-structures 300 forming anode unit-cells 400, which are butted together to form, together with collimator 420, a pixilated plane. Again, it may be noted that one portion of a given anode unit-structure (or unit-cell) may form a portion of a first pixel or pixelated anode, while another portion of the same anode unit-structure (or unit-cell) may form a portion of a different pixel or pixelated anode.

In FIG. 8b, for ease of illustration, the unit-cells 400 are slightly shifted from each other to create a small gap between them to allow visualization of each of the anode unit-cells 400 individually. In practice, in various embodiments there are no such gaps between the anode unit-cells 400, the exposed parts of the grids 301 are electrically connected, and the exposed parts of grids 330 are electrically connected. As mentioned above, the grids 301 and 330 have a symmetry of 180°. Accordingly, the grids 330 and 301 are symmetric between adjacent pixels. Accordingly, pixels behave as if their corresponding grids 301 (or 330) are electrically connected inside all the pixels but not between pixelated anodes. It should be understood that even though there are no or very small gaps between the anode unit-cells 400, there is no electrical connection between the grids 301 and 330 of a given unit-structure or unit-cell.

In various embodiments, the anode unit-cells 400 are butted to each other while their orientation ensures that only one anode unit-structure (e.g., anode unit-structures 402, 404, 406 and 408) is common to two adjacent pixels. For example, adjacent pixels 428 and 430 share only one anode unit-structure 404, adjacent pixels 428 and 436 share only one anode unit-structure 402, adjacent pixels 428 and 434 share only one anode unit-structure 408, and adjacent pixels 428 and 432 share only one anode unit-structure 406. In such a situation, for example, event 460 in pixel 428 (see FIG. 8*a*) will produce simultaneously a collected signal in pixel 428 and an enhanced non-collected signal in pixel 430 (see also FIG. 8*b*) where the exposed segments of grids 330 of the anode unit-structures are electrically connected.

Accordingly, when the collected event and the enhanced non-collected event appear simultaneously on pixels 428 and 430 of FIG. 8*b*, it means that the primary event occurred in the anode unit-structure 404 in the area of the pixel 428, which is virtual sub-pixel 450 in FIG. 8*a*. Similarly, when a collected event and an enhanced non-collected event appear simultaneously on pixels 428 and 432 of FIG. 8*b*, it means that the primary event occurred in the anode unit-structure 406 in the area of pixel 428, which is virtual sub-pixel 452 in FIG. 8*a*. When the collected event and the enhanced non-collected event appear simultaneously on pixels 428 and 434 of FIG. 8*b*, respectively, it means that the primary event occurred in anode unit-structure 408 in the area of pixel 428, which is virtual sub-pixel 454 in FIG. 8*a*. Also, when the collected event and enhanced non-collected event appear simultaneously on pixels 428 and 436 of FIG. 8*b*, respectively, it means that the primary event occurred in anode unit-structure 402 in the area of pixel 428, which is virtual sub-pixel 456 in FIG. 8*a*.

Accordingly, as discussed above, the location of every primary event may be found and assigned into one of four virtual pixels to which the physical pixel is divided into. The process is based on the simultaneous measurement of the collected signal and the enhanced non-collected signal in the primary pixel and the pixel adjacent to the primary pixel, respectively. The use of enhanced non-collected signals improves the SNR of the non-collected signals, thus allowing more accurate derivation of the location of the primary event and makes possible measurement of small non-collected signals that without the enhancement of their amplitude discussed herein may not be accurately detected.

Figure 9A:
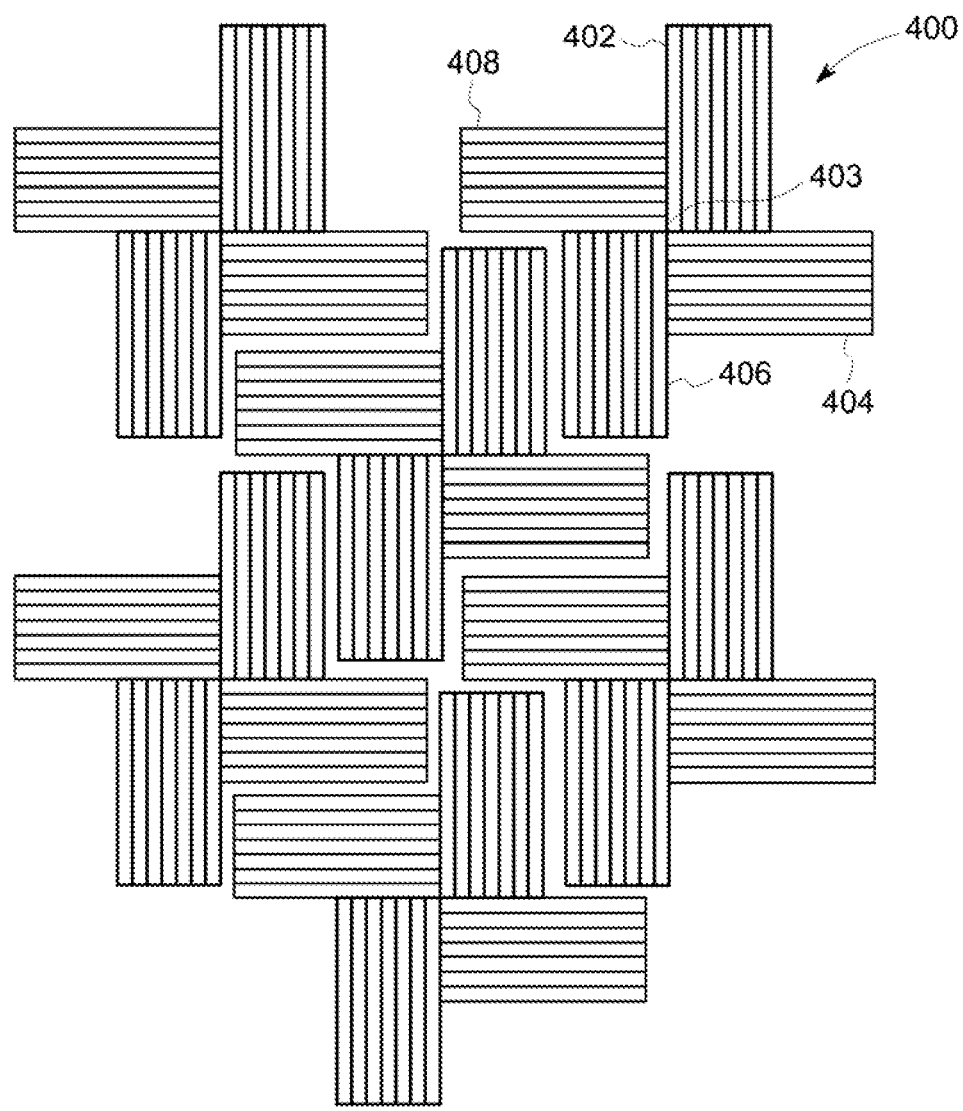
FIG. 9*a* provides a schematic depiction of butting of unit-cells in various embodiments.

FIG. 9*a* provides a schematic depiction of the butting of unit-cells 400 on the semiconductor plate 306 of the detector 308 (not shown in FIG. 9*a*). The anode unit-cell 400 includes 4 anode unit-structures 402, 404, 406 and 408. The orientation of the anode unit-structures 402, 404, 406 and 408 are defined as the orientation of their grids 301 and 330. Accordingly, adjacent anode unit-structures are rotated at 90° relative to each other, with each of the anode unit-structures 402, 404, 406, and 408 having one corner located at point 403. It may be noted that the longest dimension of the anode unit-structures 402, 404, 406 and 408 is in the direction defined as the orientation of the anodes unit-structures.

For ease and clarity of illustration for FIG. 9*a*, the anode unit-cells 400 are shown butted together but with gaps between them. In practice in various embodiments, these gaps do not exist but are shown for depicting the relative positions between the unit-cells 400. In various embodiments, the anode unit-cells 400 are butted with no rotation between them and the longest dimensions of the adjacent anode unit-structures of different unit-cells 400 are oriented in the same direction.

Figure 9B:
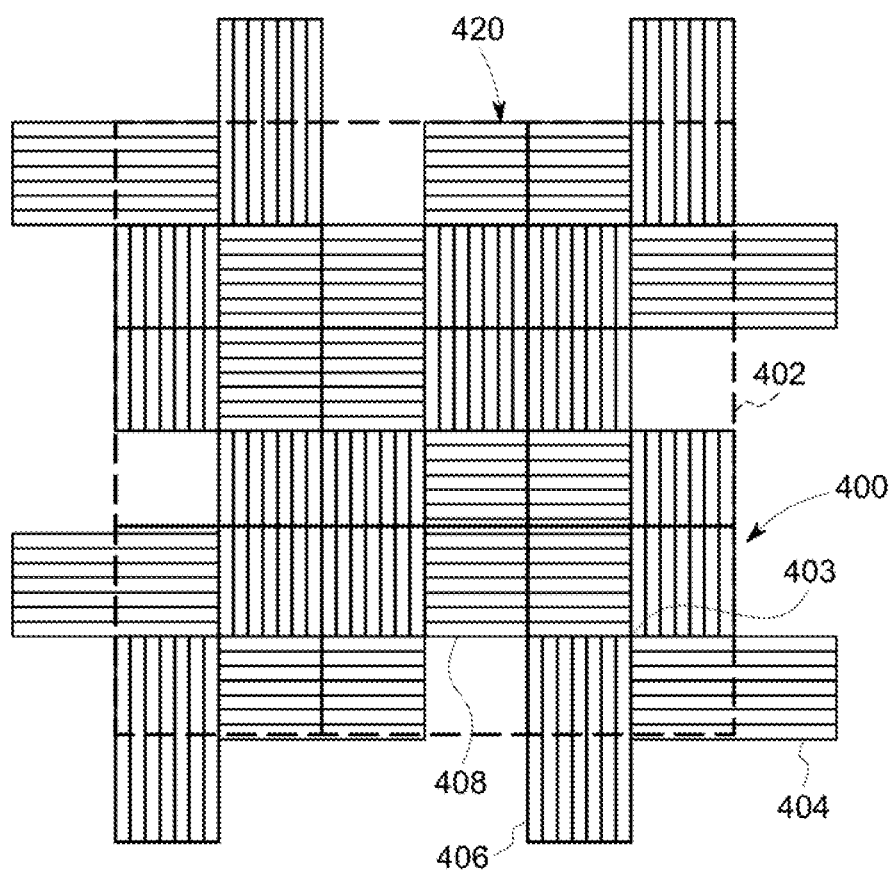
FIG. 9*b* provides a schematic depiction of butting of unit-cells in various embodiments.

FIG. 9*b* schematically depicts a butting or joining of anode unit-cells 400 similar to that shown in FIG. 9*a*. However, in FIG. 9*b*, they are shown without the gaps between the anode unit-cells 400 shown in FIG. 9*a*. FIG. 9*b* also shows the relative position between the unit-cells 400, their anode unit-structures 402, 404, 406 and 408 and a part of collimator 420 (shown in broken lines). It may be seen in FIG. 9*b* that the corners of the collimator 420 are located at the center of the area formed by two adjacent anode unit-structures of two different unit-cells 400 that are aligned along the same orientation. The relative position between collimator 420 including its septa and anodes 400 is also illustrated by FIG. 7 and explained in the associated description.

Figure 9C:
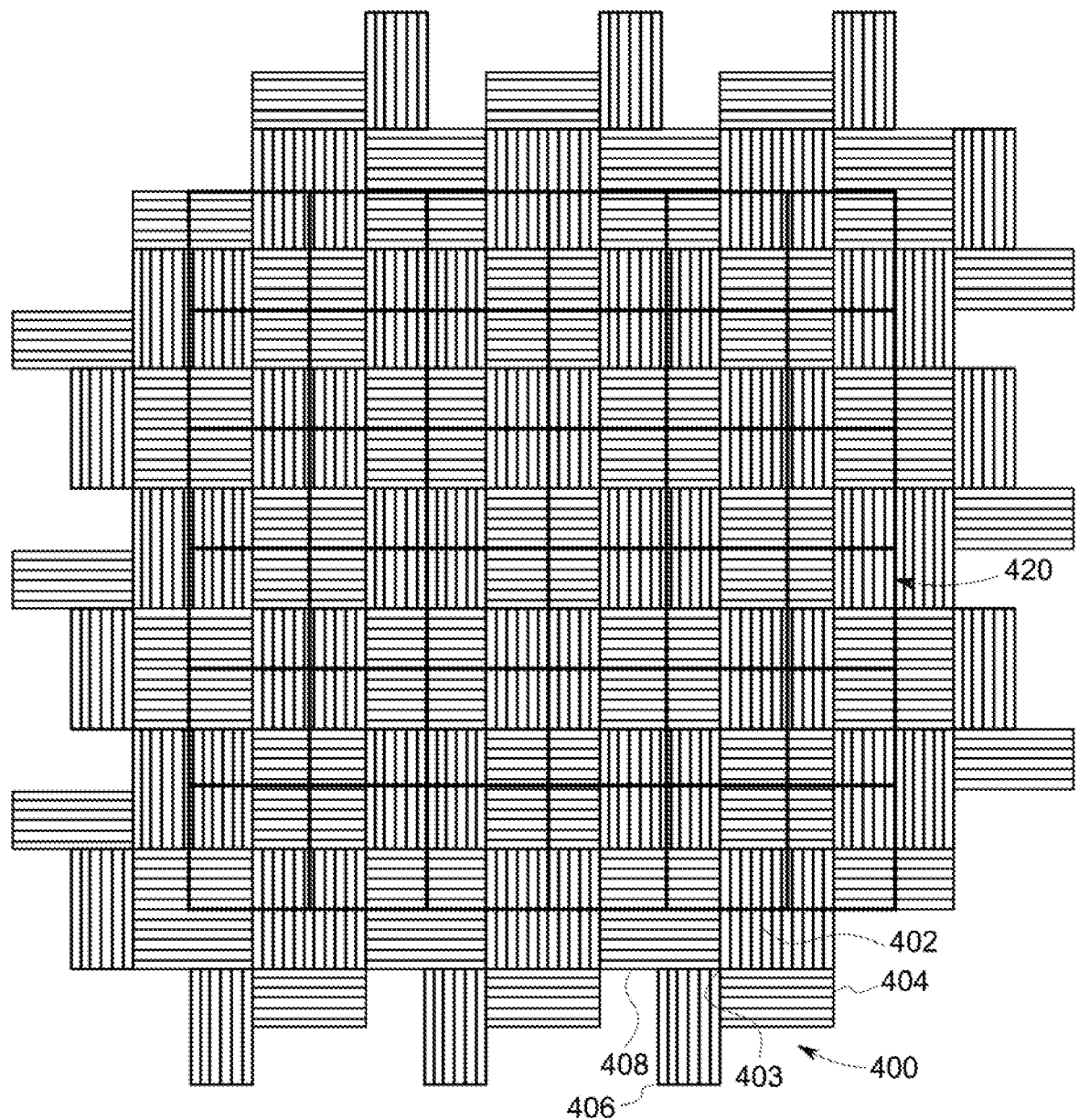
FIG. 9*c* provides a schematic depiction of butting of unit-cells in various embodiments.

FIG. 9*c* schematically depicts the butting or joining of the anode unit-cells 400 over an area greater than the area shown in FIG. 9*b* and arranged to be bigger than the area of collimator 420. As can be seen in FIG. 9*c*, in order for the butted area of the anode unit-cells 400 to cover the whole area of collimator 420, the area of the anode unit-cells 400 should be larger than the area of collimator 420 in the illustrated example. As explained above in connection with FIGS. 7 and 8*b*, each opening of the collimator 420 defines a pixel. Each pixel includes part of four different anode unit-structures that are rotated at 90° relative to each other. Further, two adjacent pixels share only one common anode unit-structure such as one of anodes unit-structures 402, 404, 406 and 408.

Figure 10A:
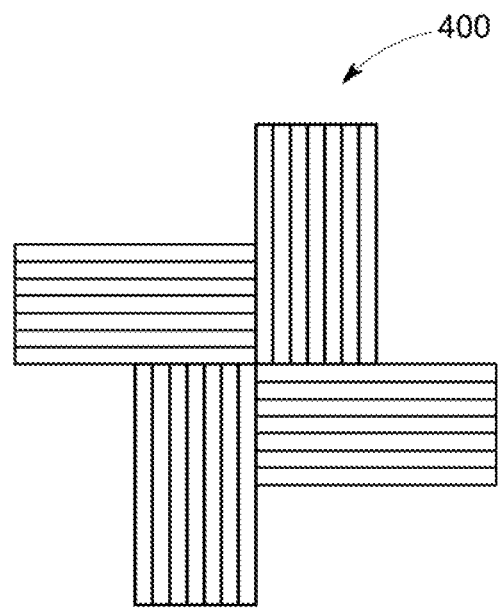
FIG. 10*a* schematically illustrates a unit-cell 400 in accordance with various embodiments.
Figure 10B:
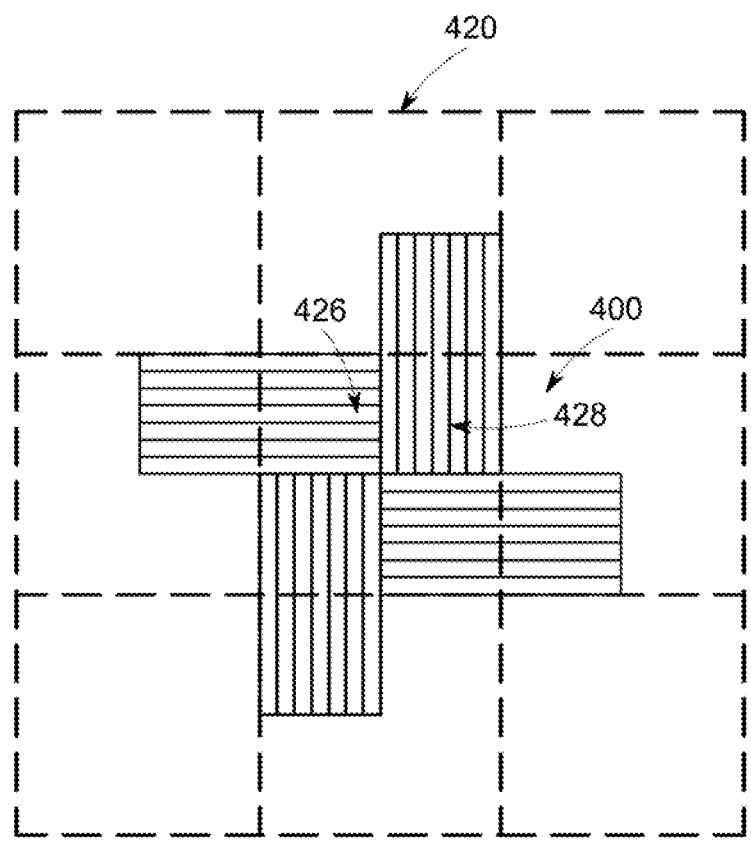
FIG. 10*b* schematically illustrates the relative position between the unit-cell of FIG. 10*a* and a part of an associated collimator in accordance with various embodiments.
Figure 10C:
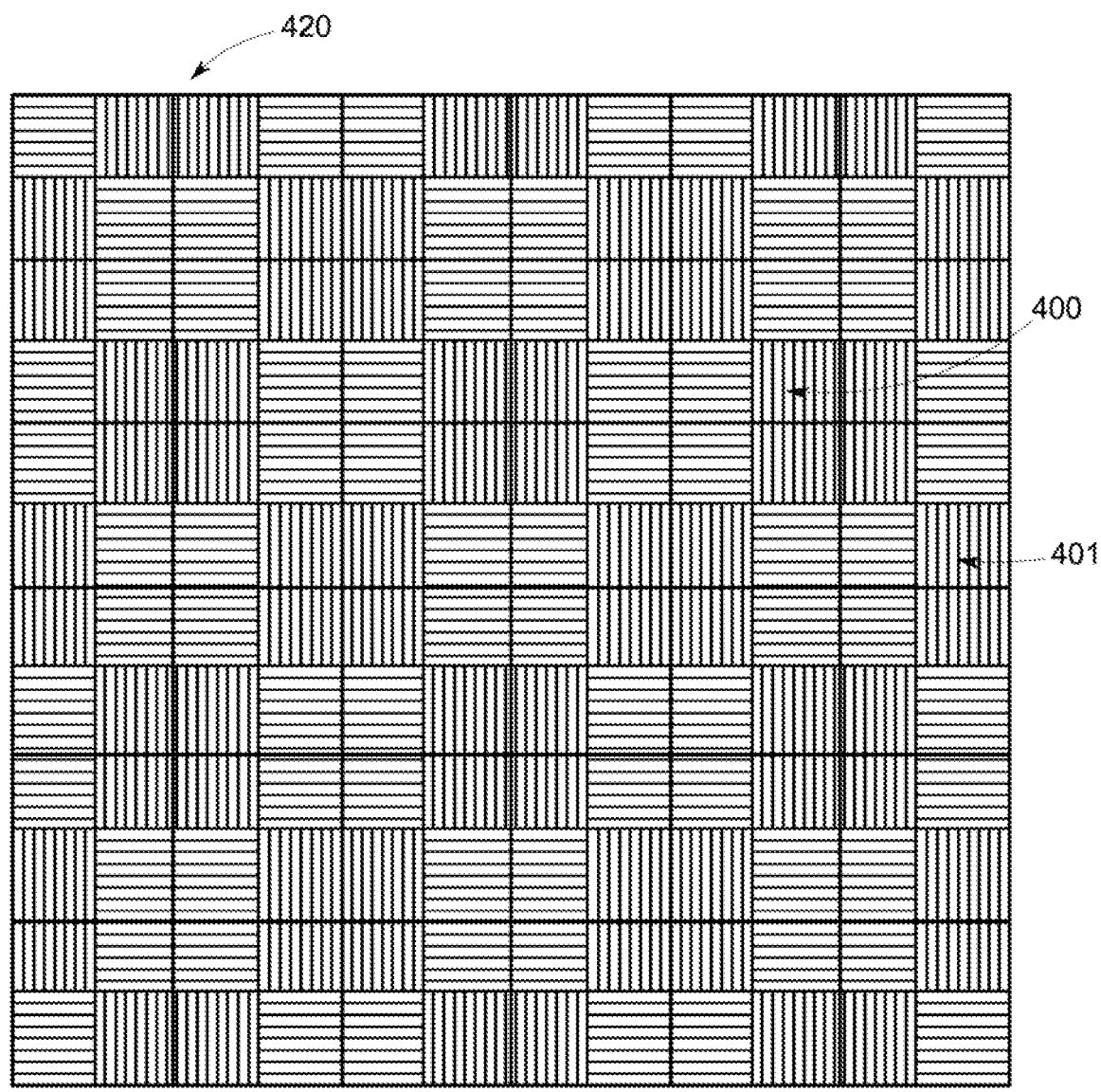
FIG. 10*c* schematically illustrates the area of butted anode unit-cells 400 as being equal to the area under collimator 420.

FIG. 10*a* schematically illustrates a unit-cell 400, FIG. 10*b* schematically illustrates the relative position between the unit-cell 400 and a part of collimator 420 (illustrated by broken lines) with the area under the opening 426 of the collimator 420 defining the pixel 428. FIG. 10*c* schematically illustrates the area of butted anode unit-cells 400 as being equal to the area under collimator 420. As mentioned above, in order for the butted area of unit cells 400 to cover the whole area of collimator 420, the butted area should be larger than the area of collimator 420. As a result, having the butted area of unit cells 400 cover the same area as does the collimator 420 (or detector 308), anode unit-cells 401 under the circumference or edge of the collimator 420 should include only part of the anode unit-structures (whereas anode unit-cell 400 includes the entirety of the corresponding unit-structures). Accordingly, the depicted anode unit-cells 401 include less than four anodes unit-structures.

It may be noted that while collimator 420 appears above the anode unit-cells 400, it is very close to the cathode of detector 308 while the anode unit-cells 400 are still under collimator 420 but, on the other plane of the semiconductor plate 306 facing away from the collimator 420 in various embodiments. It may further be noted that, for each pixel of the detector 308, the exposed segments of grids 301 or 330 are electrically coupled to a Charge-Sensitive-Amplifier (CSA), which is the pre-amplifier of the electronic channel that corresponding to the pixel.

With continued reference to FIGS. 7, 8*a*, and 8*b*, improvements to the intrinsic resolution of detector 308 will be discussed. The location of an event, such as event 460 inside a virtual sub-pixel, such as virtual sub-pixel 450 in physical pixel 428, may be found.

As discussed above, the derivation of the event location within the sub-pixel may be accomplished using the primary event of the pixel and the enhanced non-collected induced signal in the pixel adjacent to the primary pixel. This method has the advantage of having an enhanced non-collected induced signal that is stronger than conventional non-collected induced signals derived from a pixel adjacent to the primary pixel when the pixelated anodes are arranged in the conventional structure of pixelated anodes. On the other hand, both the primary signal and the enhanced induced non-collected signal are insensitive to the location of the event inside the sub-pixels. Accordingly, further information is needed for deriving the location of the event inside the sub-pixels.

The information used in the present discussion to derive the location of the event is the amplitudes of the non-collected induced signals from the anode unit-structures in the pixels adjacent to the primary pixel which do not contain the event. For example, the X, Y coordinates of the location of event 460 inside virtual sub-pixel 450 of physical pixel 428 is derived by measuring the non-collected induced signals from anode unit-structures 406 and 406 in pixels 432 and 436, respectively.

The coordinate X of event 460 in virtual sub-pixel 450 of physical pixel 428 is given by:

$$X = K_X \cdot d(450) \cdot \frac{I(406)}{I(428)} \qquad \text{Eq. (7)}$$

where X is the coordinate along the X axis which is measured from the boundary between the anode unit-structure 406 and the anode unit-structure 404 into virtual sub-pixel 450, $K_X$ is the proportional coefficient along the X axis, d(450) is the dimension of virtual sub-pixel 450, I(406) is the amplitude of the non-collected induced signal at the anode unit-structure 406 as measured by pixel 432, and I(428) is the amplitude of the collected signal at pixel 428. The mathematical term $$\frac{I(406)}{I(428)}$$

is the normalized signal I(406) of the non-collected induced signal. The normalized signal I(406) may be derived using another mathematical term $$\frac{I(406)}{I(404)}$$

when I(404) is the enhanced induced non-collected signal at the anode unit-structure 404. It may be noted that the proportional coefficient along the X axis $K_X$ has different values for different normalization of signal I(406).

Similarly, the coordinate Y of event 460 in virtual sub-pixel 450 of physical pixel 428 is given by:

$$Y = K_Y \cdot d(450) \cdot \frac{I(402)}{I(428)} \qquad \text{Eq. (7a)}$$

where Y is the coordinate along the Y axis which is measured from the boundary between the anode unit-structure 402 and the anode unit-structure 404 into virtual sub-pixel 450, $K_Y$ is the proportional coefficient along the Y axis, d(450) is the dimension of virtual sub-pixel 450, I(402) is the amplitude of non-collected induced signal at the anode unit-structure 402 as measured by pixel 436, and I(428) is the amplitude of the collected signal at pixel 428. The mathematical term $$\frac{I(402)}{I(428)}$$

is the normalized signal I(402) of the non-collected induced signal. The normalized signal I(402) may be derived using another mathematical term $$\frac{I(402)}{I(404)}$$

when I(404) is the enhanced induced non-collected signal at anodes unit-structure 404. It may be noted that the proportional coefficient $K_Y$ has different value for different normalization of signal I(402).

Figure 11:
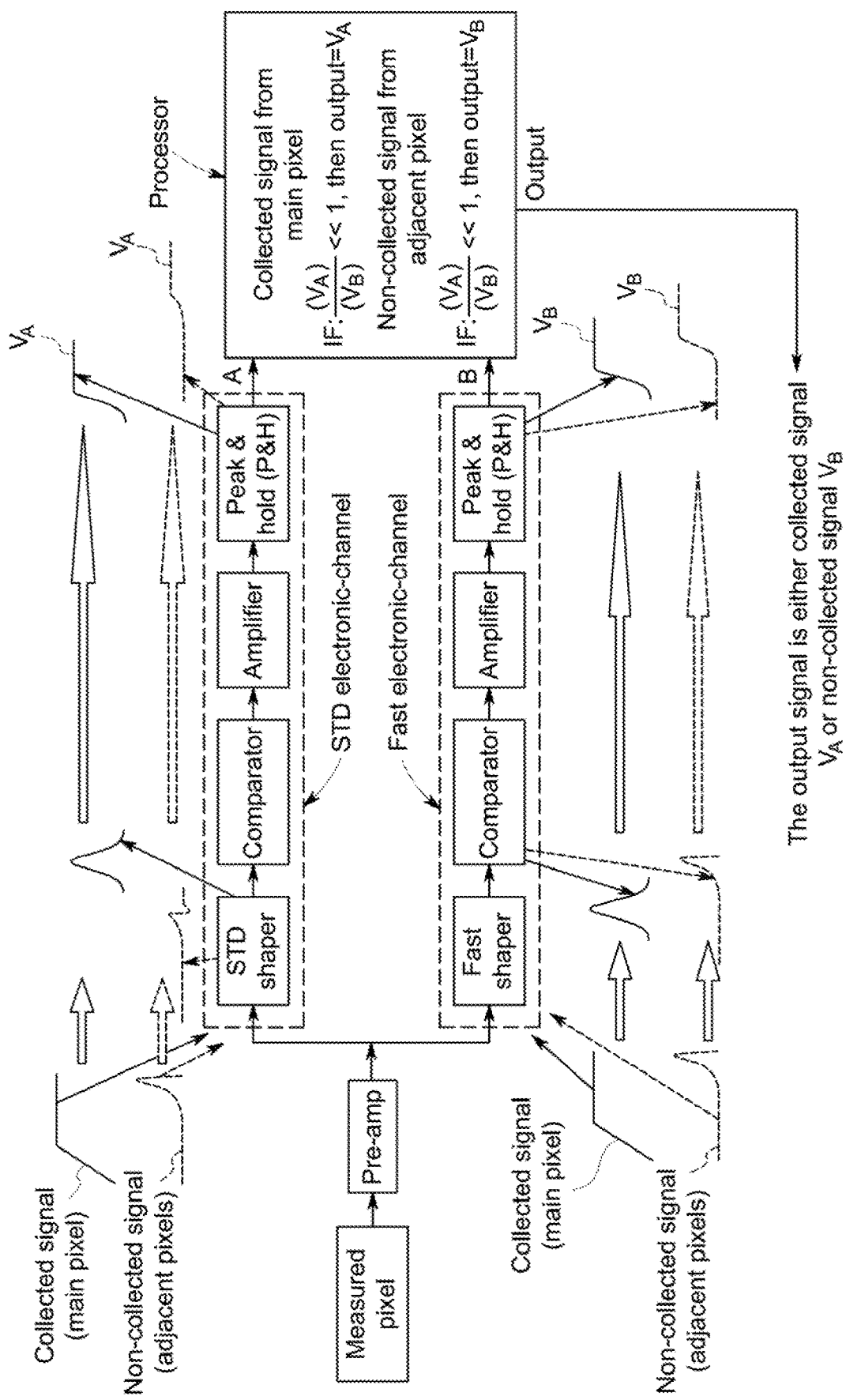
FIG. 11 is a schematic illustration of an electronic channel inside an ASIC used in various embodiments.

FIG. 11 is a schematic illustration of an electronic channel inside an ASIC used in various embodiments. The electronic channel includes two branches. One branch includes a conventional shaper, and the other branch includes a fast shaper. This design facilitates distinguishing between collected and non-collected signals and thus is useful to determine the type of the measured signal on the different pixels. A more complete description of the design of FIG. 11 is provided in U.S. patent application Ser. No. 15/860,325 entitled "Systems and Methods for Collecting Radiation Detection", filed Jan. 2, 2018, which is hereby incorporated by reference in its entirety.

Figure 12:
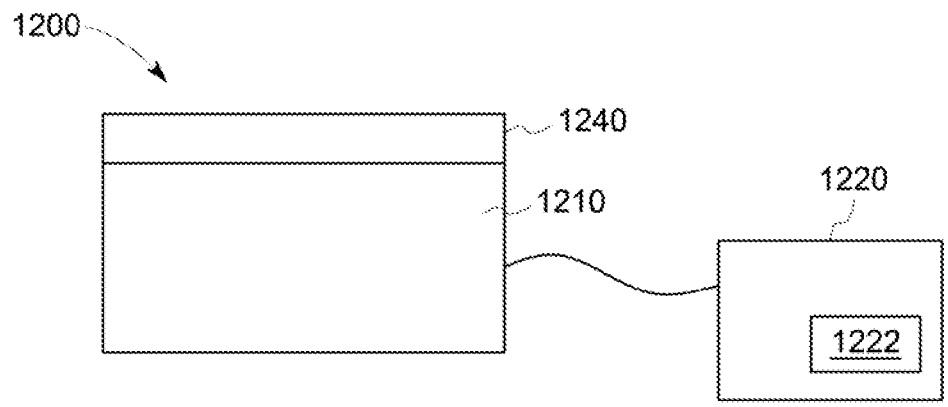
FIG. 12 provides a schematic side view of a radiation detector assembly in accordance with various embodiments.
Figure 13:
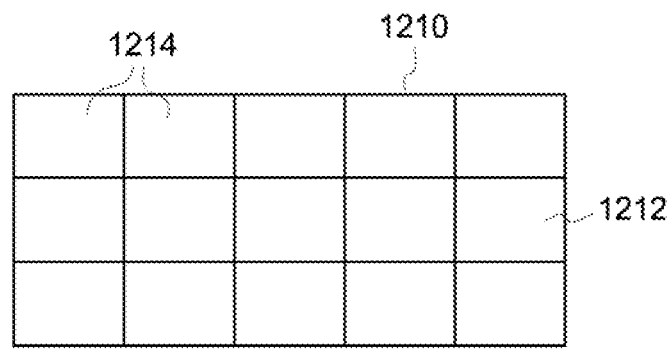
FIG. 13 provides a top view of a semiconductor detector of the radiation detector assembly of FIG. 12.
Figure 14:
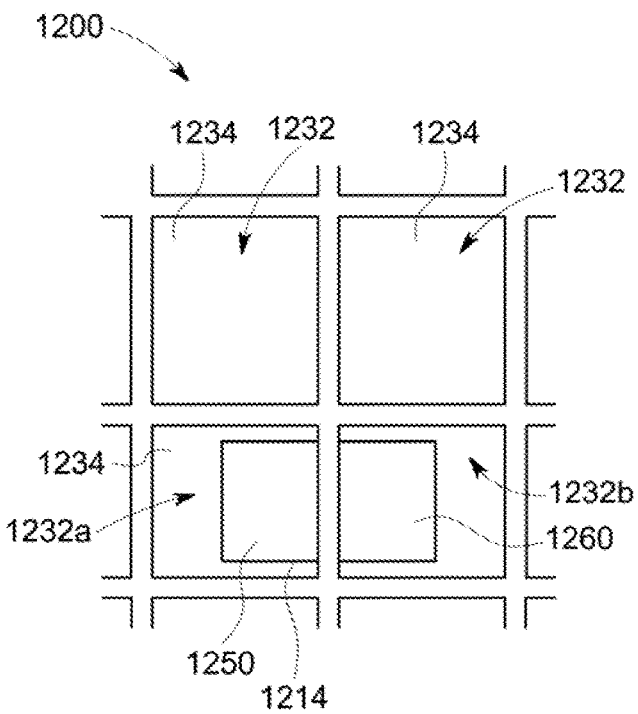
FIG. 14 provides an enlarged plan view of aspects of the radiation detector assembly of FIG. 12.

FIG. 12 provides a schematic side view of a radiation detector assembly 1200 in accordance with various embodiments. FIG. 13 provides a top view of a semiconductor detector 1210 of the radiation detector assembly 1200, and FIG. 14 provides an enlarged plan view of the radiation detector assembly 1200. As seen in FIG. 12, the radiation detector assembly 1200 includes a semiconductor detector 1210, a collimator 1230, and a processing unit 1220. The semiconductor detector 1210 has a surface 1212 (see FIG. 13) on which plural pixelated anodes 1214 (see FIG. 13) are disposed. A cathode (not shown in FIG. 12) may be disposed on a surface opposite the surface 1212 on which the pixelated anodes 1214 are disposed. For example, a single cathode may be deposited on one surface with the pixelated anodes disposed on an opposite surface. Generally, when radiation (e.g., one or more photons) impacts the semiconductor detector 1210, the semiconductor detector 1210 generates electrical signals corresponding to the radiation being absorbed in the volume of detector 1210.

The semiconductor detector 1210 in various embodiments may be constructed using different materials, such as semiconductor materials, including Cadmium Zinc Telluride (CdZnTe), often referred to as CZT, Cadmium Telluride (CdTe), and Silicon (Si), among others. The detector 1210 may be configured for use with, for example, nuclear medicine (NM) imaging systems, positron emission tomography (PET) imaging systems, and/or single photon emission computed tomography (SPECT) imaging systems.

Referring to FIG. 14, the collimator 1230 is disposed above the surface 1212 of FIG. 12, and includes openings 1232 configured to direct radiation to the semiconductor detector 1210. Each opening 1232 defines a corresponding pixel 1234.

In the illustrated embodiment of FIGS. 12 and 13, each pixelated anode 1214 generates different signals depending on the lateral location (e.g., in the X, Y directions) of where a photon is absorbed in the volume of detector 1210 under the surface 1212. It may be noted that the pixelated anodes 1214 in FIGS. 12 and 13 are depicted as being square or rectangular shaped; however, in various embodiments the pixelated anodes may take on other shapes, including those discussed in connection with FIGS. 4-10. For example, each pixelated anode 1214 generates a primary or collected signal responsive to the absorption of a photon in the volume of detector 1210 under or corresponding to the particular pixelated anode 1214 (e.g., under an associated or corresponding opening of the collimator 1230 through which the photon penetrates into the detector volume. The volumes of detector 1210 under corresponding pixels may be defined as voxels (not shown). For each pixelated anode 1214, detector 1210 has the corresponding voxel. The absorption of a photon by a certain voxel corresponding to a particular pixelated anode 1214 also results in an induced charge that may be detected by pixels 1214 adjacent to or surrounding the particular pixelated anode 1214 that receives the photon. The charge detected by an adjacent or surrounding pixel may be referred to herein as a non-collected charge, and result in a non-collected or secondary signal. A primary signal may include information regarding photon energy (e.g., a distribution across a range of energy levels) as well as location information corresponding to the particular pixelated anode 1214 at which a photon penetrates via the surface 1212 and is absorbed in the corresponding voxel.

As best seen in FIG. 14, the collimator 1230 includes openings 1232. Each pixelated anode 1214 of the illustrated example includes a first portion 1250 and a second portion 1260. The first portion 1250 is located in a first opening 1232*a*, while the second portion 1260 is located in a second opening 1232*b*. Accordingly, different portions of the pixelated anode 1214 are located in different pixels.

In some embodiments, the first portion 1250 is a collecting portion configured to collect a primary charge responsive to reception of a photon by the pixelated anode 1214, while the second portion 1260 is a non-collecting portion configured to collect a secondary charge responsive to reception of a photon by an adjacent pixelated anode (e.g., a pixelated anode having a collecting portion disposed in the collimator opening 1232*b* in which the second or non-collecting portion 1260 of the pixelated anode 1214 is disposed). Accordingly, the collecting portion may be disposed in the opening 1232*a* above the pixelated anode 1214, and the non-collecting portion may be disposed within the opening 1232*b* that is above an adjacent pixelated anode. The exposed and buried portions of FIGS. 4-10 provide further examples of collecting and non-collecting portions that may be disposed in adjacent collimator openings or pixels.

For example, in various embodiments, the pixelated anodes 1214 may be made of anode unit-cells (e.g., anode unit-cell 400) that in turn are made of anode unit-structures (e.g., anode unit-structure 300). As discussed above, each anode unit-structure may include a first portion and a second portion that form portions of different pixelated anodes 1214. For example, the exposed portions of an anode unit-structure 300 may form a part of a first pixelated anode, while the buried or insulated portions from a part of a second pixelated anode adjacent to the first pixelated anode. As discussed in connection with FIGS. 4-10, for example, the anode unit-structures may include interleaved collecting and non-collecting grids. For instance, the non-collecting grids may include anode strips interposed between insulating layers as discussed in connection with FIGS. 4-5. Further, the grids may include anode strips (e.g., anode strips 302) that extend from a base strip (e.g., base strip 304) to form a fork-like structure.

Figure 18:
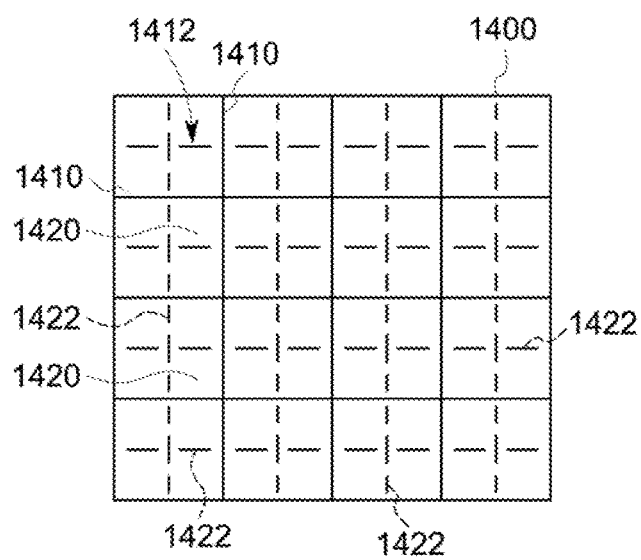
FIG. 18 provides a schematic view of a detector system having an offset collimator and pixelated anodes in accordance with various embodiments.

Alternatively, the openings 1232 of the collimator 1230 may be offset from the pixelated anodes 1214. For example, FIG. 18 depicts a collimator 1400 having septa 1410 forming openings 1412, shown in solid lines. The collimator 1400 may be used in conjunction with pixelated anodes 1420 having borders 1422 shown in dashed lines. In the illustrated embodiment, the pixelated anodes 1420 and collimator openings 1412 having a similar pitch (or width), but are offset by ½ of a pitch, so that the pixelated anode borders 1422 pass through the center of the collimator openings 1412. Other amounts of offset or variances in collimator and pixelated anode pitch may be employed in various embodiments.

The arrangement of FIG. 18 allows the increase of the induced non-collected signal. For example, when the collimator 1400 is registered to the pixelated anodes 1420, the center of the pixel matches the center of the collimator hole. It may be noted that the center of the pixelated anode 1420 is the area with the highest exposure rate. Further, the distance between the center of the pixel and the neighboring pixels is at a maximum when the event hits the center of the pixel. Accordingly, to increase the induce signal detected by the neighboring pixels, the collimator 1400 may be moved by a half pitch in the lateral directions to have the center of the pixel blocked by septa 1410 of the collimator 1400 (it may be noted the center is the pixel area with the lowest subpixel accuracy because it is the portion of the pixel farthest away from neighboring pixels). Accordingly, by shifting the collimator position with respect to pixelated anodes, the portions of the pixels with the lowest subpixel accuracy may be aligned with the septa 902, and to have the center of the collimator openings 1412 match the corners of the pixelated anodes 1420.

Returning to FIGS. 12-14, each pixelated anode 1214 may have associated therewith one or more electronics channels configured to provide the primary and secondary signals to one or more aspects of the processing unit 1220 in cooperation with the pixelated anodes. In some embodiments, all or a portion of each electronics channel may be disposed on the detector 1210. Alternatively or additionally, all or a portion of each electronics channel may be housed externally to the detector 1210, for example as part of the processing unit 1220, which may be or include an Application Specific Integration Circuit (ASIC). The electronics channels may be configured to provide the primary and secondary signals to one or more aspects of the processing unit 1220 while discarding other signals. For example, in some embodiments, each electronics channel includes a threshold discriminator. The threshold discriminator may allow signals exceeding a threshold level to be transmitted while preventing or inhibiting transmission of signals that do not exceed a threshold level. Generally, the threshold level is set low enough to reliably capture the secondary signals, while still being set high enough to exclude lower strength signals, for example due to noise. It may be noted that, because the secondary signals may be relatively low in strength, the electronics utilized are preferably low noise electronics to reduce or eliminate noise that is not eliminated by the threshold level. In some embodiments, each electronic channel includes a peak-and-hold unit to store electrical signal energy, and may also include a readout mechanism. For example, the electronic channel may include a request-acknowledge mechanism that allows the peak-and-hold energy and pixel location for each channel to be read out individually. Further, in some embodiments, the processing unit 1220 or other processor may control the signal threshold level and the request-acknowledge mechanism.

In the illustrated embodiment, the processing unit 1220 is operably coupled to the pixelated anodes 1214, and is configured to acquire primary signals (for collected charges) and secondary signals (for non-collected charges). The processing unit 1220 also determines a location for the reception of the photon using the primary signal and the at least one secondary signal. For example, as discussed in connection with FIGS. 7, 8*a*, and 8*b*, the processing unit 1220 may be configured to determine the location of an event (reception of a photon) based on a simultaneous (e.g., within a narrow, predetermined time range) measurement of a collected signal by a primary pixelated anode and an enhanced non-collected signal in a secondary pixel adjacent to the primary pixel. In various embodiments, the processing unit 1220 is configured to reconstruct an image using acquired counts of events.

The processing unit 1220 in various embodiments is configured to further determine sub-pixel locations using one or more techniques discussed in U.S. patent application Ser. No. 14/724,022, entitled "Systems and Method for Charge-Sharing Identification and Correction Using a Single Pixel," filed 28 May 2015 ("the 022 application); U.S. patent application Ser. No. 15/280,640, entitled "Systems and Methods for Sub-Pixel Location Determination," filed 29 Sep. 2016 ("the 640 application"); and U.S. patent application Ser. No. 14/627,436, entitled "Systems and Methods for Improving Energy Resolution by Sub-Pixel Energy Calibration," filed 20 Feb. 2015 ("the 436 application). The subject matter of each of the 022 application, the 640 application, and the 436 application are incorporated by reference in its entirety.

In various embodiments the processing unit 1220 includes processing circuitry configured to perform one or more tasks, functions, or steps discussed herein. It may be noted that "processing unit" as used herein is not intended to necessarily be limited to a single processor or computer. For example, the processing unit 1220 may include multiple processors, ASIC's, FPGA's, and/or computers, which may be integrated in a common housing or unit, or which may distributed among various units or housings. It may be noted that operations performed by the processing unit 1220 (e.g., operations corresponding to process flows or methods discussed herein, or aspects thereof) may be sufficiently complex that the operations may not be performed by a human being within a reasonable time period. For example, the determination of values of collected and non-collected charges, and/or the determination of DOI's and/or sub-pixel locations based on the collected and/or non-collected charges within the time constraints associated with such signals may rely on or utilize computations that may not be completed by a person within a reasonable time period.

The depicted processing unit 1220 includes a memory 1222. The memory 1222 may include one or more computer readable storage media. The memory 1222, for example, may store acquired emission information, image data corresponding to images generated, results of intermediate processing steps, or the like. Further, the process flows and/or flowcharts discussed herein (or aspects thereof) may represent one or more sets of instructions that are stored in the memory 1222 for direction of operations of the radiation detection assembly 1200.

Figure 15:
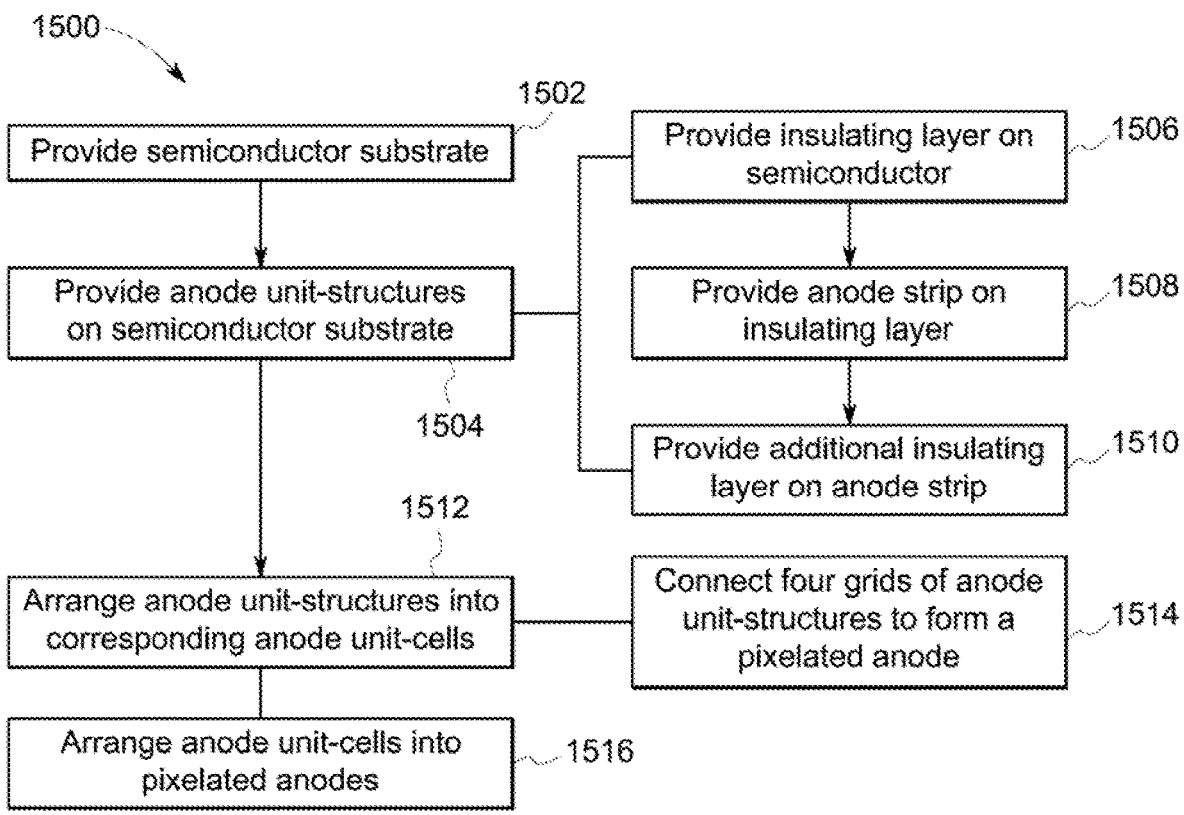
FIG. 15 provides a flowchart of a method in accordance with various embodiments.

FIG. 15 provides a flowchart of a method 1500 in accordance with various embodiments. The method 1500, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1500 may be able to be used as one or more algorithms to direct hardware (e.g., one or more aspects of the processing unit 1220) to perform one or more operations described herein.

At 1502, a semiconductor substrate (e.g., semiconductor plate 306) is provided. At 1504, anode unit-structures (e.g., anode unit-structure 300) are provided on the semiconductor substrate. Each anode unit-structure includes anode strips configured to receive electrical charge responsive to absorption of a photon by the semiconductor. For example, in various embodiments, the anode unit-structure includes collecting and non-collecting portions, which may be arranged in an interleaved arrangement as discussed herein.

Various techniques may be employed for forming the anode unit-structures and/or disposing the anode unit-structures on the semiconductor substrate. The anode unit-structures may be disposed on a surface of the semiconductor substrate that is opposite a cathode. The collecting portions may be formed by direct deposition or joining of an electrically conductive material (e.g., metal) on a surface of the semiconductor substrate. Insulating layers in conjunction with a conductive or metal layer may be utilized to form the non-collecting portions. For example, in the illustrated embodiment, at 1506, an insulating layer is provided on the semiconductor substrate. At 1508, an anode strip is provided on top of the insulating layer, with the insulating interposed between the anode strip and the semiconductor surface. At 1510, an additional insulating layer is provided on top of the anode strip, with the anode strip interposed between the two insulating layers. (See also FIGS. 5a-5d and related discussion.)

At 1512, plural anode unit-structures are arranged into corresponding anode unit-cells, with each anode unit-cell including at least two anode unit-structures. For example, in the depicted example, at 1514, four grids (e.g., grids 301) of four corresponding anode unit-structures are connected to form a corresponding pixelated anode. It may be noted that the anode unit-cell formed by the connection of the anode unit-structures may include insulated or buried non-collecting portions that are electrically separated from the pixelated anode formed by connecting the grids, and that extend into adjacent pixels.

At 1516, the anode unit-cells are arranged into pixelated anodes. The pixelated anodes may be connected to corresponding electronic channels for processing and/or transmission of signals that may be used to determined counts corresponding to received photons. At least a first portion and second portion of each anode unit-structure form portions of different pixelated anodes. (See also FIG. 7 and related discussion.)

Figure 16:
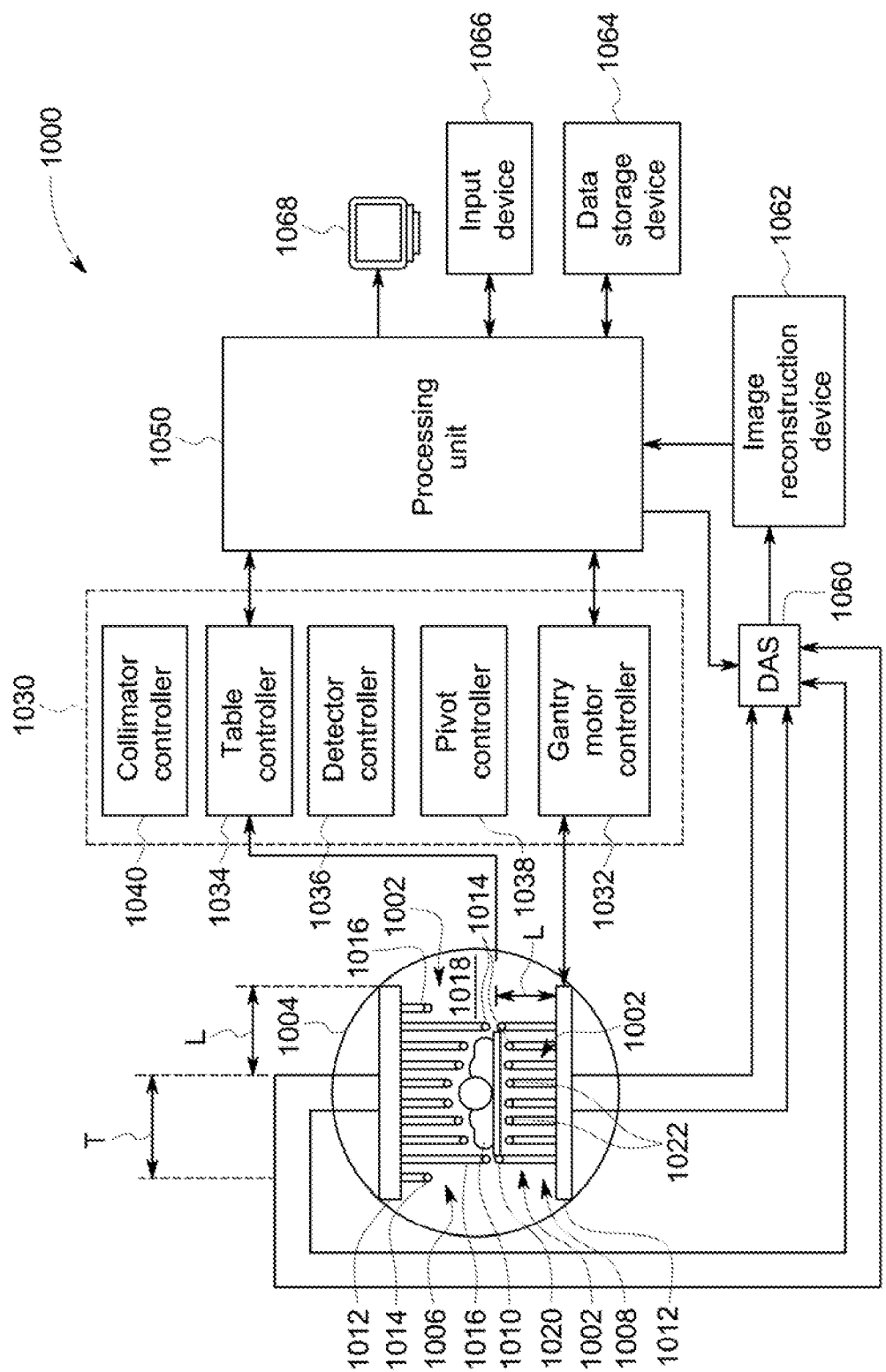
FIG. 16 provides a schematic view of an imaging system in accordance with various embodiments.

FIG. 16 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). In particular, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 16. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 16). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels. In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

In various embodiments, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially as described in more detail herein.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually as described in more detail herein. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 14). In various embodiments, the detector controller 1036 may control the detector carriers 1016 or the support members 1012 to move in different lateral directions. Detector controller 1036 may control the swiveling motion of detectors 1002 together with their collimators 1022.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 14 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

Figure 17:
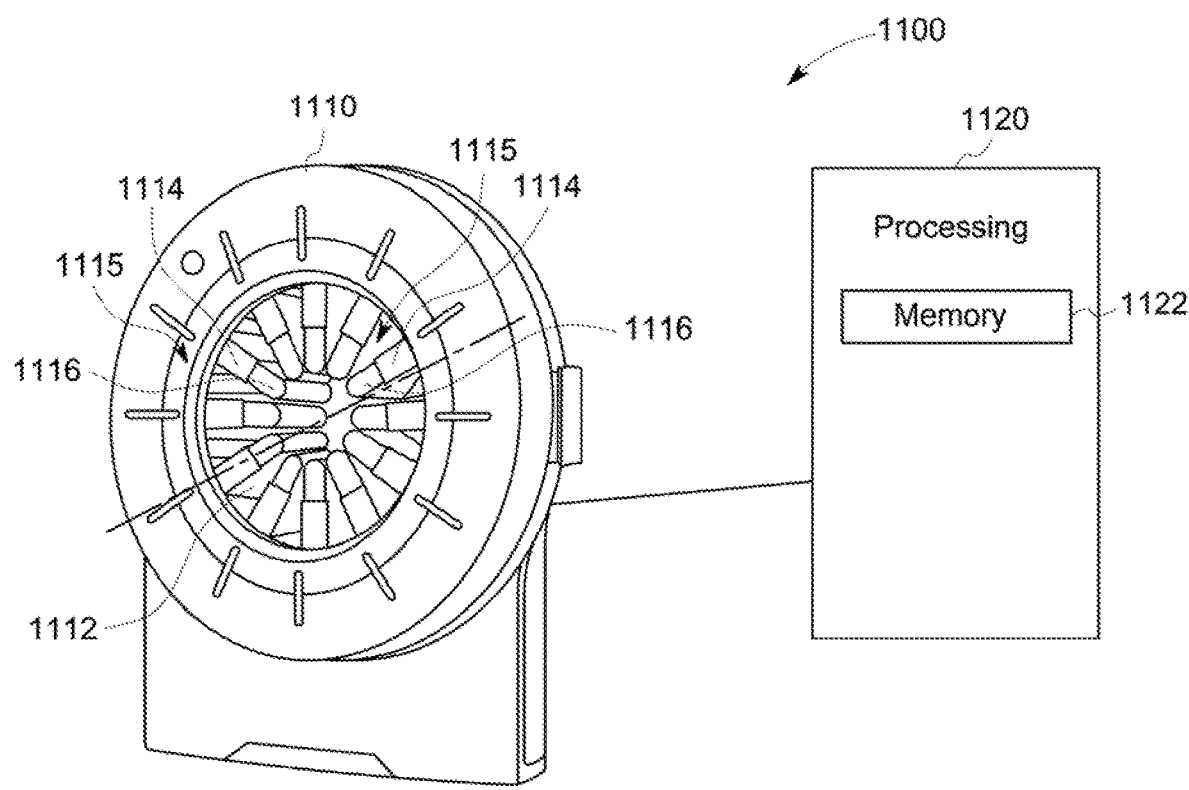
FIG. 17 provides a schematic view of an imaging system in accordance with various embodiments.

It may be noted that the embodiment of FIG. 16 may be understood as a linear arrangement of detector heads (e.g., utilizing detector units arranged in a row and extending parallel to one another. In other embodiments, a radial design may be employed. Radial designs, for example, may provide additional advantages in terms of efficiently imaging smaller objects, such as limbs, heads, or infants. FIG. 17 provides a schematic view of a nuclear medicine (NM) multi-head imaging system 1100 in accordance with various embodiments. Generally, the imaging system 1100 is configured to acquire imaging information (e.g., photon counts) from an object to be imaged (e.g., a human patient) that has been administered a radiopharmaceutical. The depicted imaging system 1100 includes a gantry 1110 having a bore 1112 therethrough, plural radiation detector head assemblies 1115, and a processing unit 1120.

The gantry 1110 defines the bore 1112. The bore 1112 is configured to accept an object to be imaged (e.g., a human patient or portion thereof). As seen in FIG. 15, plural radiation detector head assemblies 1115 are mounted to the gantry 1110. In the illustrated embodiment, each radiation detector head assembly 1115 includes an arm 1114 and a head 1116. The arm 1114 is configured to articulate the head 1116 radially toward and/or away from a center of the bore 1112 (and/or in other directions), and the head 1116 includes at least one detector, with the head 1116 disposed at a radially inward end of the arm 1114 and configured to pivot to provide a range of positions from which imaging information is acquired.

The detector of the head 1116, for example, may be a semiconductor detector. For example, a semiconductor detector various embodiments may be constructed using different materials, such as semiconductor materials, including Cadmium Zinc Telluride (CdZnTe), often referred to as CZT, Cadmium Telluride (CdTe), and Silicon (Si), among others. The detector may be configured for use with, for example, nuclear medicine (NM) imaging systems, positron emission tomography (PET) imaging systems, and/or single photon emission computed tomography (SPECT) imaging systems.

In various embodiments, the detector may include an array of pixelated anodes, and may generate different signals depending on the location of where a photon is absorbed in the volume of the detector under a surface if the detector. The volumes of the detector under the pixelated anodes are defined as voxels. For each pixelated anode, the detector has a corresponding voxel. The absorption of photons by certain voxels corresponding to particular pixelated anodes results in charges generated that may be counted. The counts may be correlated to particular locations and used to reconstruct an image.

In various embodiments, each detector head assembly 1115 may define a corresponding view that is oriented toward the center of the bore 1112. Each detector head assembly 1115 in the illustrated embodiment is configured to acquire imaging information over a sweep range corresponding to the view of the given detector unit. Additional details regarding examples of systems with detector units disposed radially around a bore may be found in U.S. patent application Ser. No. 14/788,180, filed 30 Jun. 2015, entitled "Systems and Methods For Dynamic Scanning With Multi-Head Camera," the subject matter of which is incorporated by reference in its entirety.

The processing unit 1120 includes memory 1122. The imaging system 1100 is shown as including a single processing unit 1120; however, the block for the processing unit 1120 may be understood as representing one or more processors that may be distributed or remote from each other. The depicted processing unit 1120 includes processing circuitry configured to perform one or more tasks, functions, or steps discussed herein. It may be noted that "processing unit" as used herein is not intended to necessarily be limited to a single processor or computer. For example, the processing unit 1120 may include multiple processors and/or computers, which may be integrated in a common housing or unit, or which may distributed among various units or housings.

Generally, various aspects (e.g., programmed modules) of the processing unit 1120 act individually or cooperatively with other aspects to perform one or more aspects of the methods, steps, or processes discussed herein. In the depicted embodiment, the memory 1122 includes a tangible, non-transitory computer readable medium having stored thereon instructions for performing one or more aspects of the methods, steps, or processes discussed herein.

It may be noted that various apparatuses and methods disclosed above enhance non-collected induced signals measured at pixels adjacent to a pixel that includes a primary collected event. It may further be noted that the charge collection efficiency of the primary signal and the enhancement of the non-collected induced signals are both proportional to the respective areas of the collecting electrodes and the non-collecting electrodes included in each pixel. Accordingly, in various embodiments, it is desirable to have the areas of the collecting and non-collecting electrodes in each pixel as large as possible. However, as the total area available within each pixel is limited, increasing the area of the collecting electrodes will reduce the area of the non-collecting electrodes, or increasing the area of the non-collecting electrodes will reduce the area of the collecting electrodes.

Accordingly, in various embodiments, the areas of the collecting and non-collecting electrodes are varied, adjusted, or selected to provide an improved or optimal balance between charge collection efficiency (e.g., as provided by the collecting electrodes) and enhancement of non-collected signals. Additionally or alternatively, various embodiments provide improved accuracy or efficiency of electrical connection points (e.g., gluing or soldering bumps) for each pixel for connection to an electrical board (e.g., an analog-front-end (AFE) electronic board).

FIGS. 19A-19D schematically illustrate an anode unit-structure 1200 in accordance with various embodiments. It may be noted that the anode unit-structure 1200 may be generally similar to or incorporate various aspects of anode unit-structure 300 discussed in connection with FIGS. 5A-5D, or other examples discussed herein. For example, the anode unit-structure 1200 may be used in connection with anode unit-cell 400 discussed in connection with FIG. 6, and/or with systems discussed in connection with FIGS. 12, 16, and 17. As seen in FIGS. 19A-19D, the anode unit-structure 1200 includes a grid 1201 and a grid 1230 that have interleaving strips or segments.

The anode unit-structure 1200, however, differs from the anode unit-structure 300 of FIGS. 5A-5D in various respects. For example, the grid 1201 includes collecting strips 1205 that are relatively wider (or wider than the non-collecting strips), and non-collecting strips 1203 that are relatively narrower (or narrower than the collecting strips). Also, the grid 1230 includes collecting strips 1235 that are relatively wider and non-collecting strips 1233 that are relatively narrower.

Accordingly, the collecting strips 1205 and 1235 of the collecting electrodes of grids 1201 and 1230, respectively, are wider and have a relatively larger area (e.g., larger than the non-collecting strips, or larger than the area for collecting strips in examples where the collecting and non-collecting strips are the same size) providing higher charge collection efficiency for the primary signal. On the other hand, the non-collecting segments 1203 and 1233 of the non-collecting electrodes of grids 1201 and 1230, respectively, are narrower and have a relatively smaller area, resulting in reduced enhancement of non-collected induced signals.

Figure 19A:
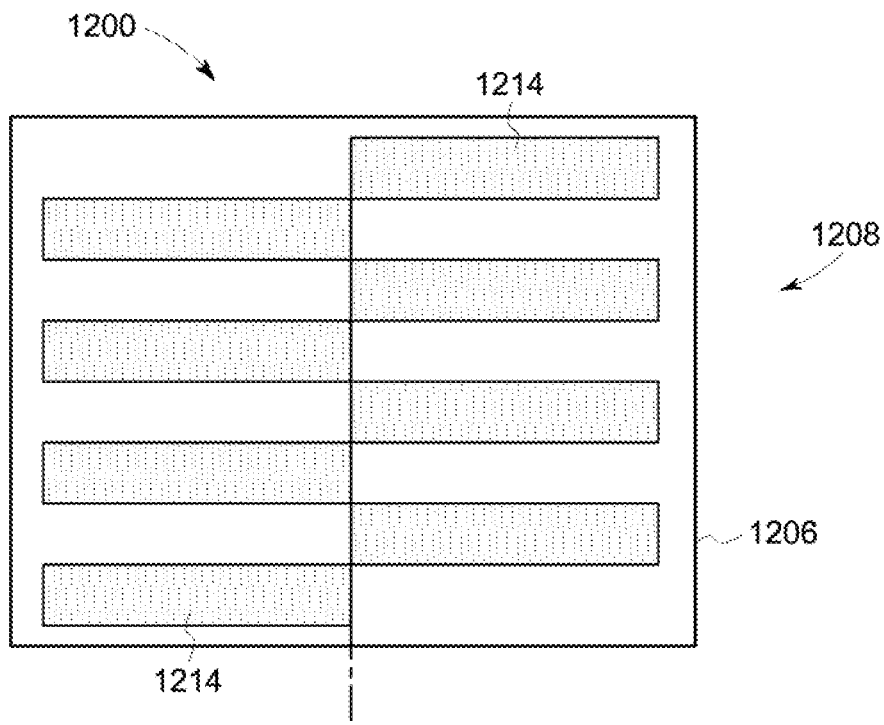
FIG. 19*a* provides a schematic plan view of insulating layers of an anode unit-structure in accordance with various embodiments.
Figure 19B:
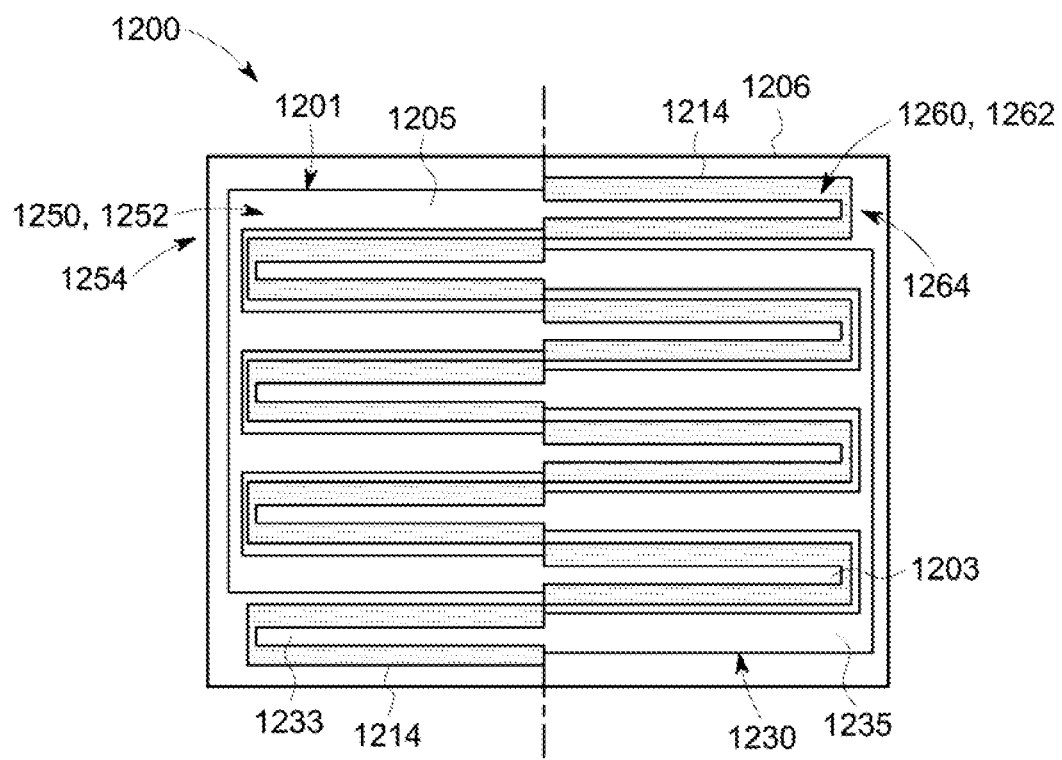
FIG. 19*b* schematically illustrates grids (or fork-like structures in the illustrated example) of the anode unit-structure of FIG. 19*a*.
Figure 19C:
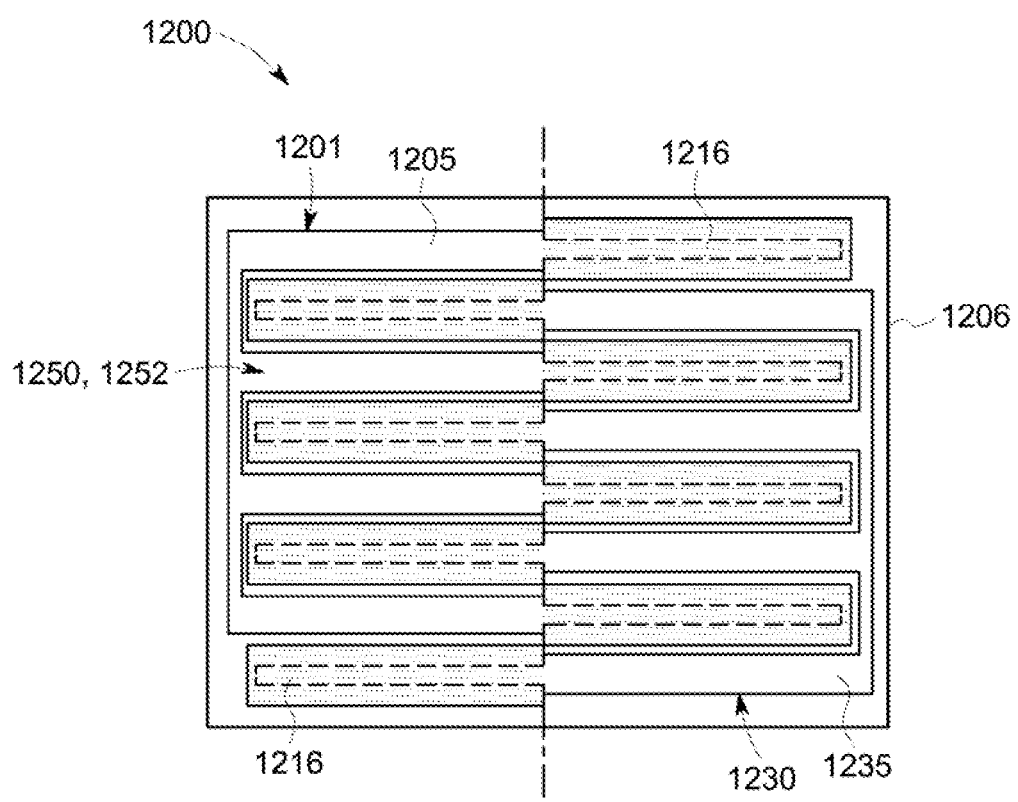
FIG. 19*c* provides a schematic top view of the anode unit-structure of FIG. 19*a*.
Figure 19D:
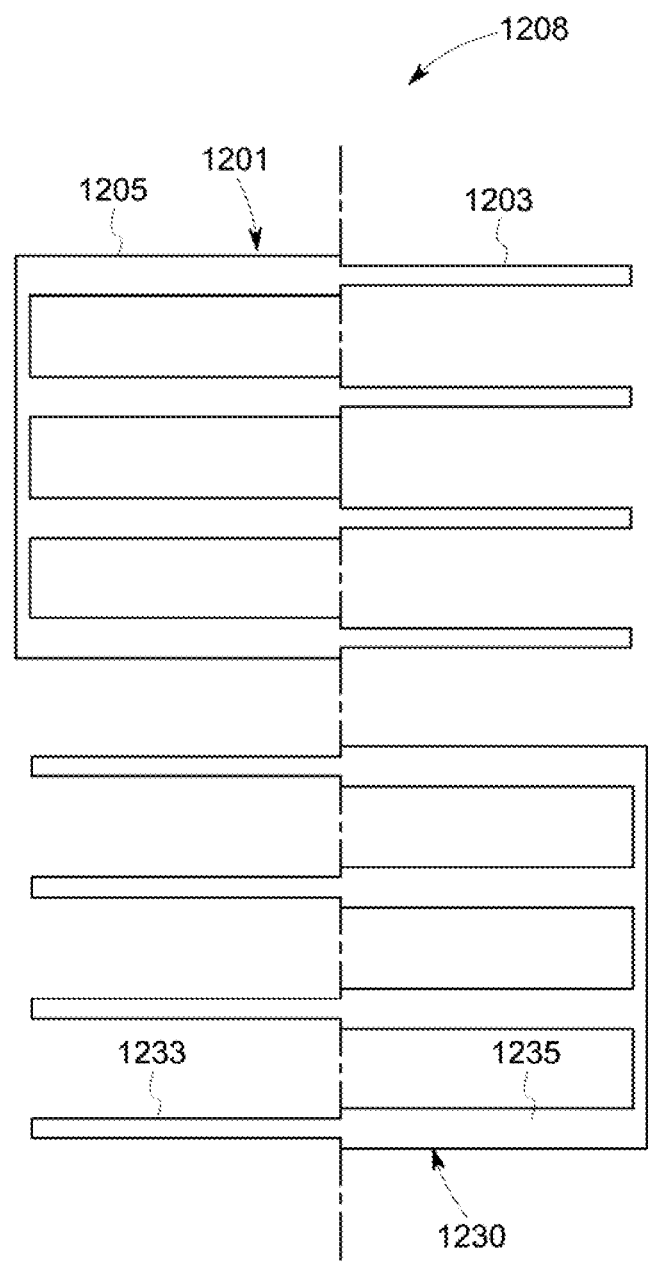
FIG. 19*d* provides an exploded view of the grids of FIG. 19*b*.

Insulating layers (e.g., including insulating strips), as discussed herein, may be used in connection with the anode unit-structure 1200. For example, as seen in FIGS. 19A and 19B, lower insulating strips 1214 may be deposited directly on a semiconductor plate. As seen in FIG. 19B, the non-collecting strips 1203, 1233 may be deposited on top of the lower insulating strips 1214. Then, as seen in FIG. 19C, additional insulating strips 1216 may be deposited on top of the non-collecting strips to form buried non-collecting strips. It may be noted that, for ease and clarity of illustration, relatively large gaps are shown between adjacent strips in FIGS. 19A-19D. However, the collecting strips may be made wider (and the insulating strips narrower) to reduce the gap size and provide for more area for the collecting strips.

A number of anode unit-structures 1200 may be joined to form plural pixelated anodes disposed on a surface of a semiconductor, as discussed herein. (See, e.g., FIGS. 6-10 and related discussion.) For example, a pixelated anode may be understood as having a first portion 1250 that is configured as a collecting portion 1252, and a second portion 1260 that is configured as a non-collecting portion 1262. The first portion 1250 and second portion 1260 may be disposed in different openings of an associated collimator (e.g., with the second portion 1260 disposed within an opening of the collimator above a corresponding collecting portion of a pixelated anode that is adjacent to the pixelated anode that includes the first portion 1250). For example, the collecting strips 1205 of the grid 1201 located in a first pixel, and the collecting strips 1235 of the grid 1230 located in an adjacent pixel along with the non-collecting strips 1203 of the grid 1201. As seen in the illustrated example, the collecting portion 1252 defines a collecting area 1254. For example, the collecting portion 1252 includes the collecting strips 1205 and the collecting area 1254 includes the sum of the areas of the individual collecting strips 1205. Also, the non-collecting portion 1262 defines a non-collecting area 1264. For example, the non-collecting portion 1260 includes the non-collecting strips 1203, and the non-collecting area 1264 includes the sum of the areas of the individual non-collecting strips 1203. (It may be noted that any given pixelated anode may include more than one grid of collecting and non-collecting strips, for example as depicted and discussed in connection with FIGS. 6-10.) As seen in the illustrated example, the collecting area 1254 and the non-collecting area 1264 are different sizes. Because the collecting strips are wider than the non-collecting strips (while both are generally the same length and there are the same numbers of each), the collecting area 1254 is larger than the non-collecting area 1264.

Accordingly, FIGS. 19A-19D depict an anode unit-structure 1200 in which the charge collection efficiency is improved and the enhancement of non-collected induced signals is relatively reduced by varying the areas of the collecting and non-collecting portions (e.g., varying the width of the collecting strips and non-collecting strips to be relatively wider and narrower, respectively). Accordingly, a balance or tradeoff between charge collection on the one hand, and enhancement of non-collected signals on the other hand, may be achieved by varying the respective areas of the collecting and non-collecting portions.

In other embodiments, charge collection may be relatively reduced to provide improved enhancement of non-collected signals. For example, FIGS. 20A-20D schematically illustrate an anode unit-structure 1300 in accordance with various embodiments, in which primary charge collection is relatively reduced to provide improved enhancement of non-collected signals. It may be noted that the anode unit-structure 1300 may be generally similar to or incorporate various aspects of anode unit-structure 300 discussed in connection with FIGS. 5A-5D, or other examples discussed herein. For example, the anode unit-structure 1300 may be used in connection with anode unit-cell 400 discussed in connection with FIG. 6, and/or with systems discussed in connection with FIGS. 12, 16, and 17. As seen in FIGS. 20A-20D, the anode unit-structure 1300 includes a grid 1301 and a grid 1330 that have interleaving strips or segments.

The anode unit-structure 1300, however, differs from the anode unit-structure 300 of FIGS. 5A-5D in various respects. For example, the grid 1301 includes collecting strips 1305 that are relatively narrower, and non-collecting strips 1303 that are relatively wider. Also, the grid 1330 includes collecting strips 1335 that are relatively narrower and non-collecting strips 1333 that are relatively wider.

Accordingly, the collecting strips 1305 and 1335 of the collecting electrodes of grids 1301 and 1330, respectively, are narrower and have a relatively smaller area, providing lower charge collection efficiency for the primary signal. On the other hand, the non-collecting segments 1303 and 1333 of the non-collecting electrodes of grids 1301 and 1330, respectively, are wider and have a relatively larger area, resulting in increased enhancement of non-collected induced signals.

Figure 20A:
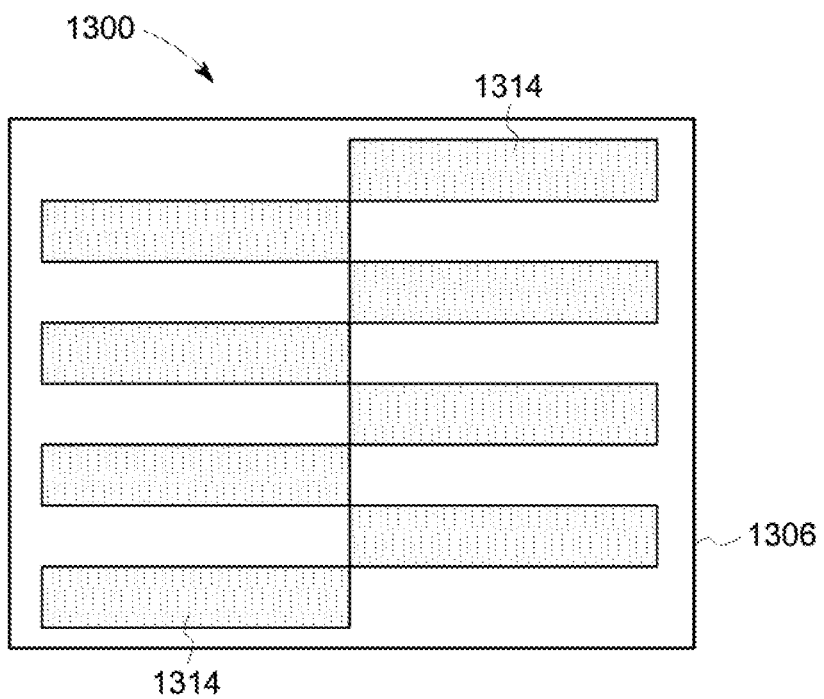
FIG. 20*a* provides a schematic plan view of insulating layers of an anode unit-structure in accordance with various embodiments.
Figure 20B:
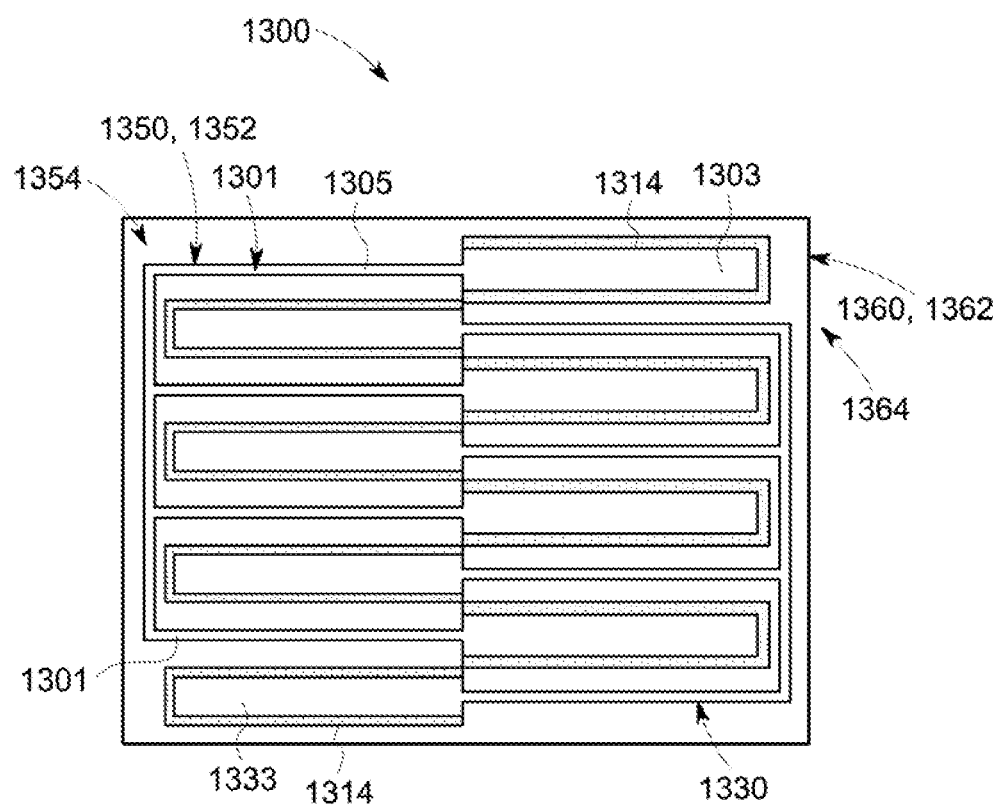
FIG. 20*b* schematically illustrates grids (or fork-like structures in the illustrated example) of the anode unit-structure of FIG. 20*a*.
Figure 20C:
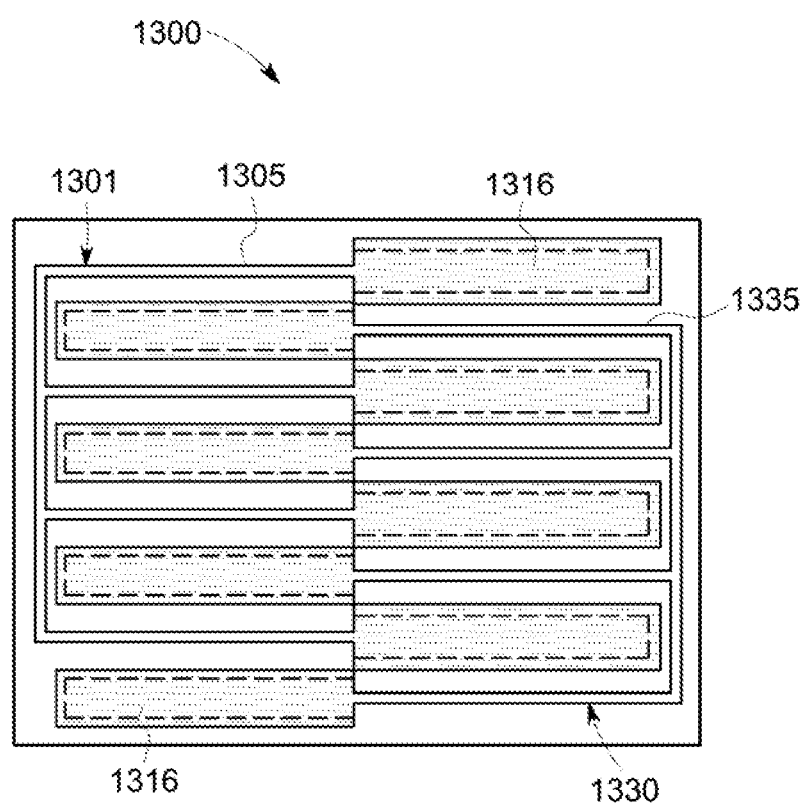
FIG. 20*c* provides a schematic top view of the anode unit-structure of FIG. 20*a*.
Figure 20D:
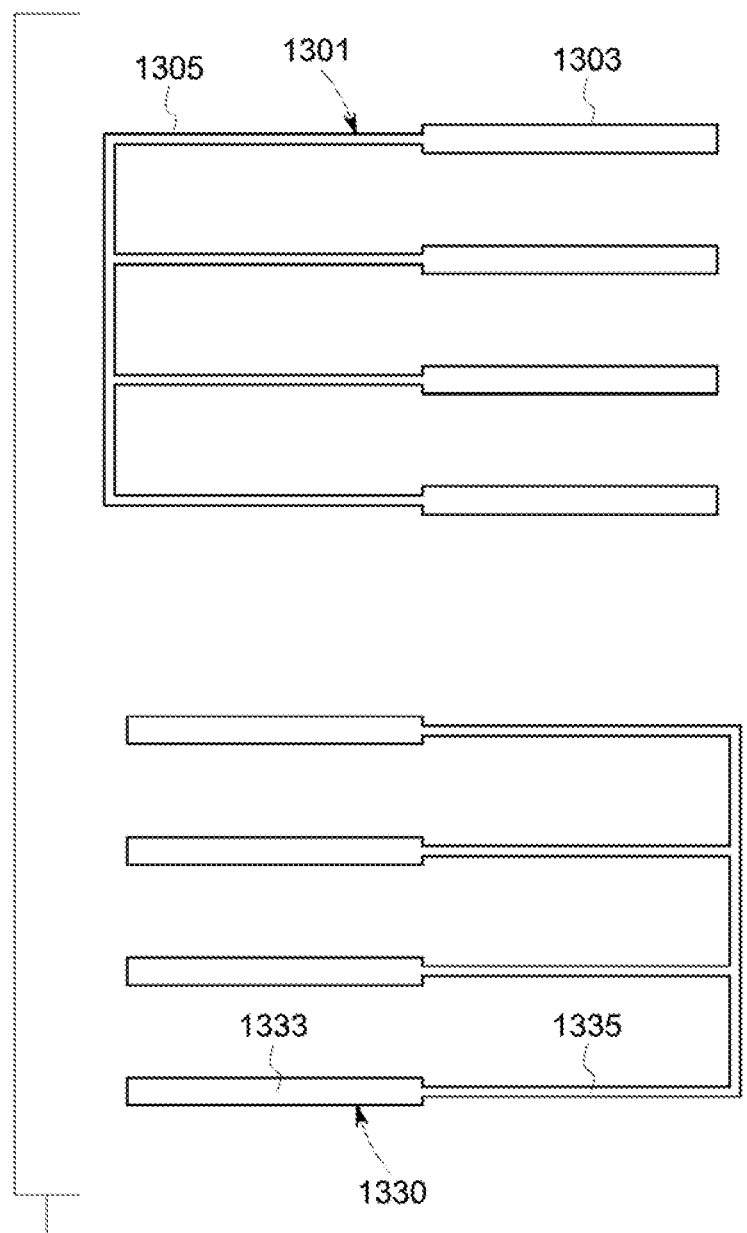
FIG. 20*d* provides an exploded view of the grids of FIG. 20*b*.

Insulating layers (e.g., including insulating strips), as discussed herein, may be used in connection with the anode unit-structure 1300. For example, as seen in FIGS. 20A and 20B, lower insulating strips 1314 may be deposited directly on a semiconductor plate. As seen in FIG. 20B, the non-collecting strips 1303, 1333 may be deposited on top of the lower insulating strips 1314. Then, as seen in FIG. 19C, additional insulating strips 1316 may be deposited on top of the non-collecting strips to form buried non-collecting strips. It may be noted that, for ease and clarity of illustration, relatively large gaps are shown between adjacent strips in FIGS. 19A-19D. However, the non-collecting strips (and associated insulating strips) may be made wider to reduce the gap size and provide for more area for the non-collecting strips.

It may further be noted that a number of anode unit-structures 1300 may be joined to form plural pixelated anodes disposed on a surface of a semiconductor, as discussed herein. (See, e.g., FIGS. 6-10 and related discussion.) For example, a pixelated anode may be understood as having a first portion 1350 that is configured as a collecting portion 1352, and a second portion 1360 that is configured as a non-collecting portion 1362. The first portion 1350 and second portion 1360 may be disposed in different openings of an associated collimator (e.g., with the second portion 1360 disposed within an opening of the collimator above a corresponding collecting portion of a pixelated anode that is adjacent to the pixelated anode that includes the first portion 1350).

As seen in the example depicted in FIGS. 20A-20D, the collecting portion 1352 defines a collecting area 1354. For example, the collecting portion 1352 includes the collecting strips 1305 and the collecting area 1354 includes the sum of the areas of the individual collecting strips 1305. Also, the non-collecting portion 1362 defines a non-collecting area 1364. For example, the non-collecting portion 1360 includes the non-collecting strips 1303, and the non-collecting area 1364 includes the sum of the areas of the individual non-collecting strips 1303. (It may be noted that any given pixelated anode may include more than one grid of collecting and non-collecting strips, for example as depicted and discussed in connection with FIGS. 6-10.) As seen in the illustrated example, the collecting area 1354 and the non-collecting area 1364 are different sizes. Because the collecting strips are narrower than the non-collecting strips (while both are generally the same length and there are the same numbers of each), the collecting area 1354 is smaller than the non-collecting area 1364.

Accordingly, FIGS. 20A-20D depict an anode unit-structure 1300 in which the charge collection efficiency is relatively reduced and the enhancement of non-collected induced signals is relatively improved by varying the areas of the collecting and non-collecting portions (e.g., varying the width of the collecting strips and non-collecting strips to be relatively narrower and wider, respectively). Accordingly, a balance or tradeoff between charge collection on the one hand, and enhancement of non-collected signals on the other hand, may be achieved by varying the respective areas of the collecting and non-collecting portions.

Figure 21A:
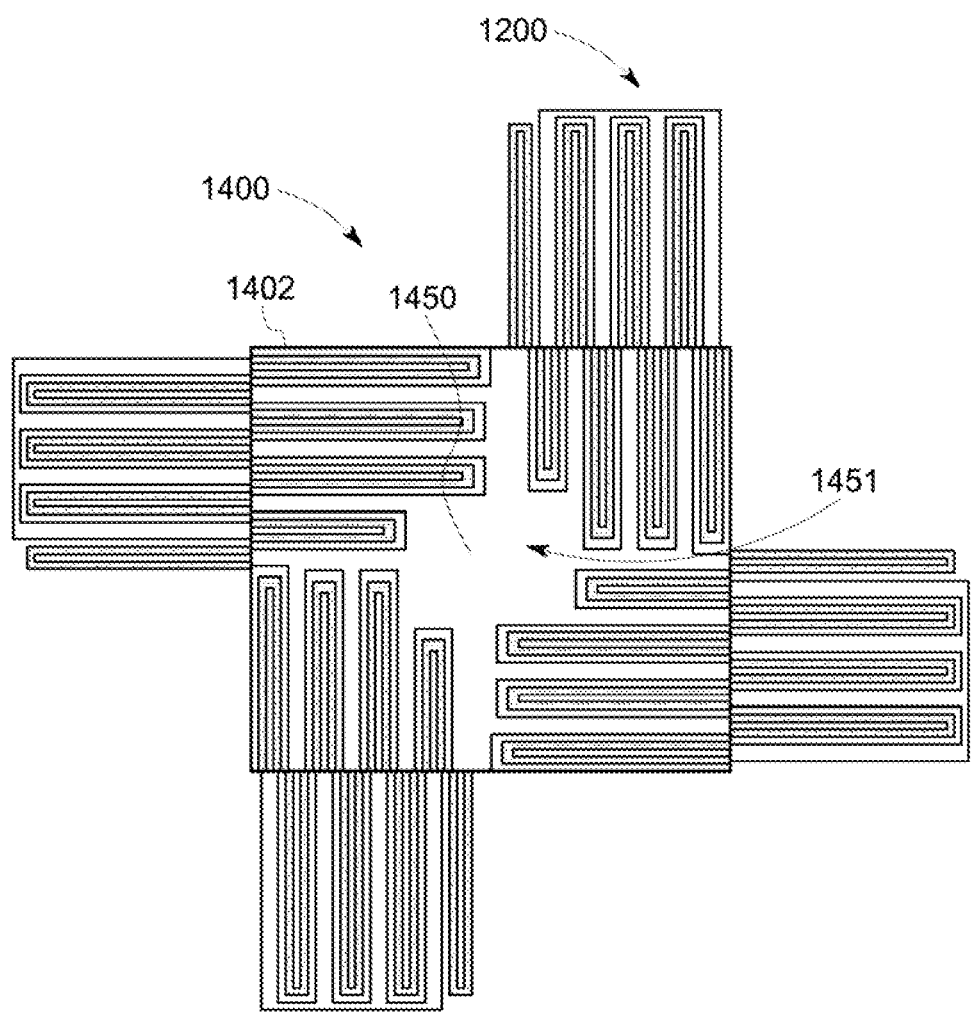
FIG. 21*a* is a schematic top view of an anode unit-cell including a central collecting area in accordance with various embodiments.
Figure 21B:
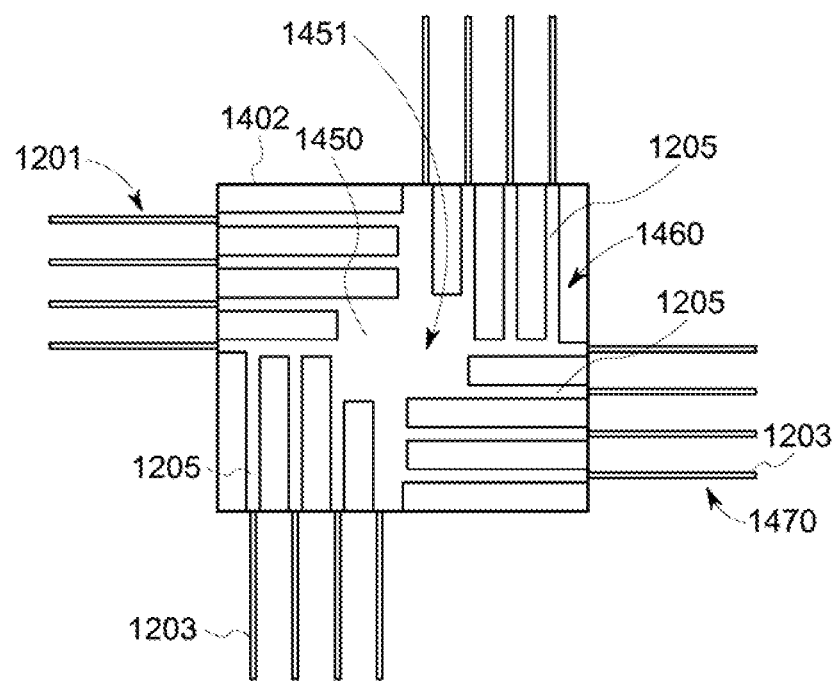
FIG. 21*b* is a schematic top view of a collecting portion of a pixel defined by the anode unit-cell of FIG. 21*a*.
Figure 21C:
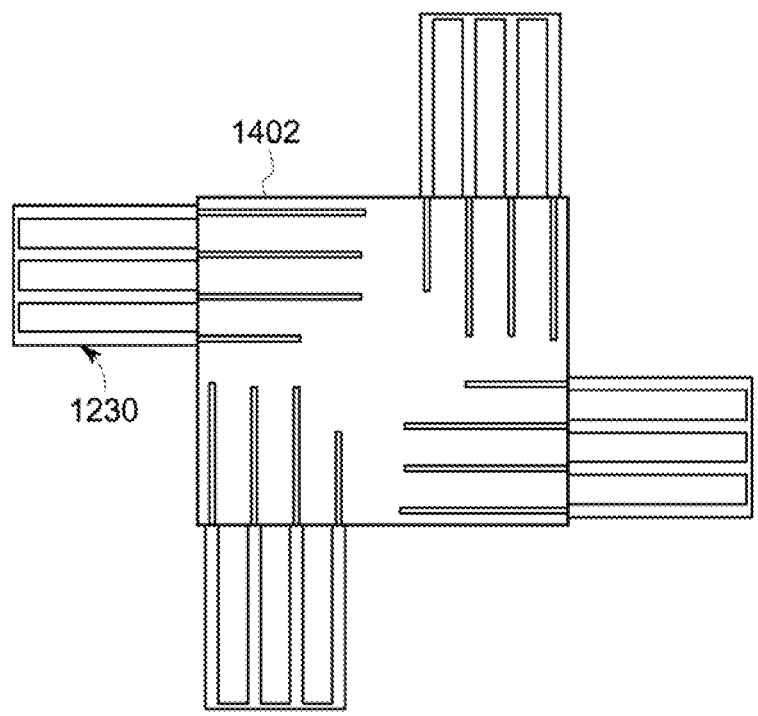
FIG. 21*c* is a schematic top view of a non-collecting portion of a pixel defined by the anode unit-cell of FIG. 21*a*.

As discussed in connection with FIG. 6, for example, various embodiments include anode unit-cells that include anode unit-structures. FIGS. 21A-21C provide schematic illustrations of an anode unit-cell 1400. It may be noted that the anode unit-cell 1400 may be generally similar to or incorporate various aspects of anode unit-cell 400 discussed in connection with FIG. 6, and/or be used in connection with systems discussed in connection with FIGS. 12, 16, and 17. The depicted unit-cell 1400 includes collecting portion 1470 and non-collecting portion 1460. FIG. 21A is a schematic top view of the anode unit-cell 1400, FIG. 21B is a schematic top view of the collecting portion 1460, and FIG. 21C is a schematic top view of the non-collecting portion 1470. The collecting portion 1460 is disposed within a collimator opening defining pixel 1402, while the non-collecting portion 1470 is disposed within one or more adjacent collimator openings defining adjacent pixels. For example, the collecting portion 1460 of grid 1201 may include collecting strips 1205 and pad 1450, while the non-collecting portion 1470 may include non-collecting strips 1203 as seen in FIG. 20B.

The depicted unit-cell 1400 includes anode-units 1200 having grids 1201 and 1230 that include collecting strips 1205 and 1235, respectively, and non-collecting strips 1203 and 1233, respectively. As with the example discussed in connection with FIGS. 19A-19D, the collecting strips 1205, 1235 are wider than the non-collecting strips 1203, 1233. The grid 1201 depicted in FIGS. 21A and B, however, also includes a pad 1450 defining a central collecting area 1451. (It may be noted that lengths of one or more of collecting or non-collecting strips of the grids 1201, 1230 may be adjusted to accommodate the central collecting area 1451, and/or the shape or total number of strips and/or orientations of strips of the grids may be adjusted to accommodate the central collecting area 1451.) The central collecting area 1451 is sized to accommodate solder or glue for connecting the unit-cell 1400 to a circuit board, and providing a sufficient distances from the electrical connection to insulate the non-collecting strips 1203, 1233 from an electrical connection between the pad 1450 and the circuit board. The pad 1450 and central collecting area 1451 also help provide for accurate alignment when mounting unit-cells to a circuit board.

It may be noted that, in connection with FIGS. 21A-21C, collecting strips are shown as wider than non-collecting strips; however, in other embodiments the non-collecting strips may be wider (e.g., the anode unit-cell 1400 may include anode unit-structures 1300, or otherwise generally similar aspects to those discussed in connection with FIGS. 20A-20D), or the collecting strips and non-collecting strips may be similarly sized.

Figure 22:
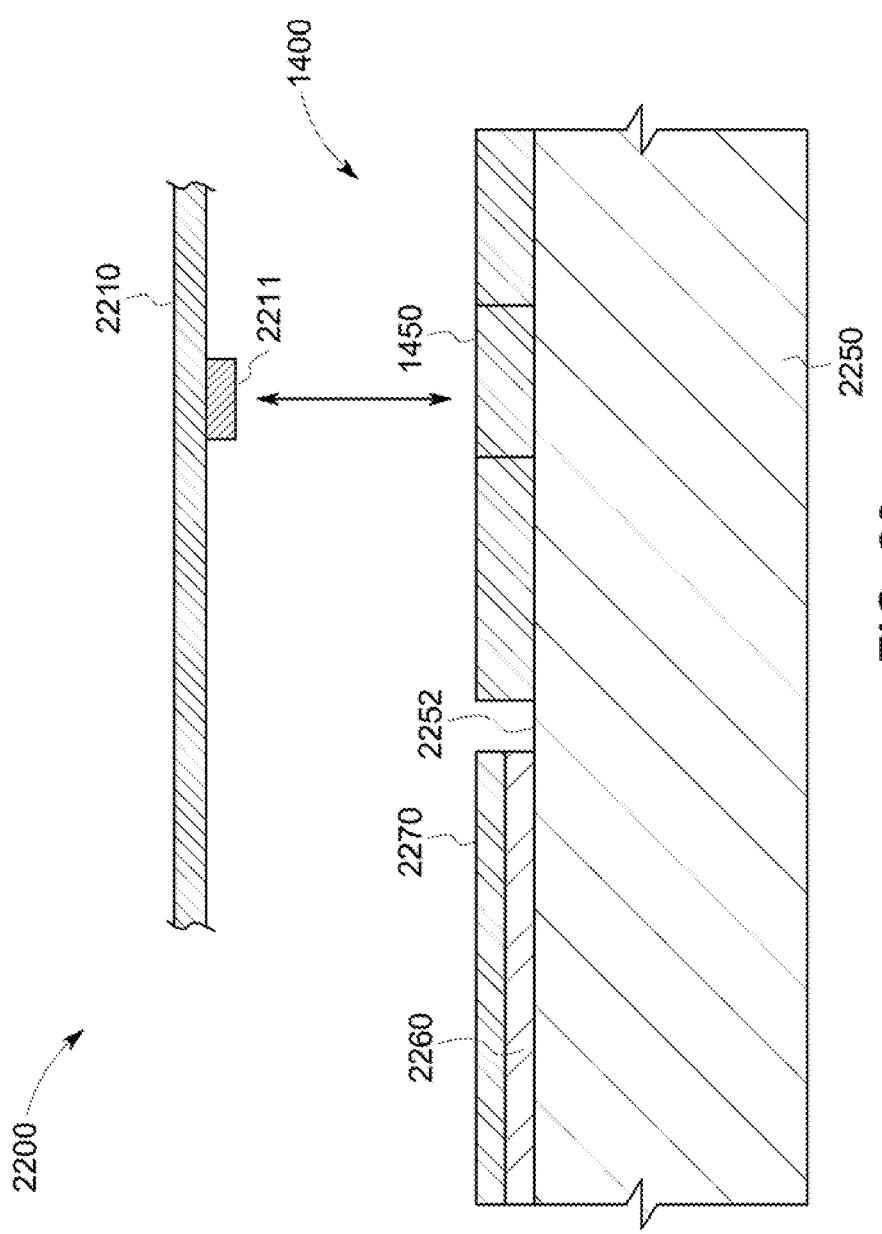
FIG. 22 provides a sectional view of a system including a unit-cell and a circuit board in accordance with various embodiments.

As discussed above, the pad 1450 may be used to electrically couple the corresponding unit-cell 1400 with a circuit board (e.g., for receiving primary signals corresponding to the pixel 1402 in which the pad 1450 is disposed and/or induced signals from adjacent pixels. FIG. 22 depicts a sectional view of a system 2200 including a circuit board 2210 and a unit-cell 1400. The unit-cell 1400 is disposed on a surface 2252 of a semiconductor detector 2250, with the pad 1450 electrically coupled to a connection point 2211 of the circuit board 2210 (e.g., via soldering). An insulating layer 2260 is provided underneath a non-collecting portion 2270 (e.g., a non-collecting strip from an adjacent unit-cell). However, because all electrical connections between the unit-cell 1400 and the circuit board 2210 are achieved between connection point 2211 and pad 1450, and the connection is a sufficient distance from the non-collecting portions to avoid shorts, an insulating layer between the non-collecting portion 2270 and the circuit board 2210 is not required, and the illustrated example is devoid of an insulating layer between the non-collecting portion 2270 and the circuit board 2210.

Figure 23:
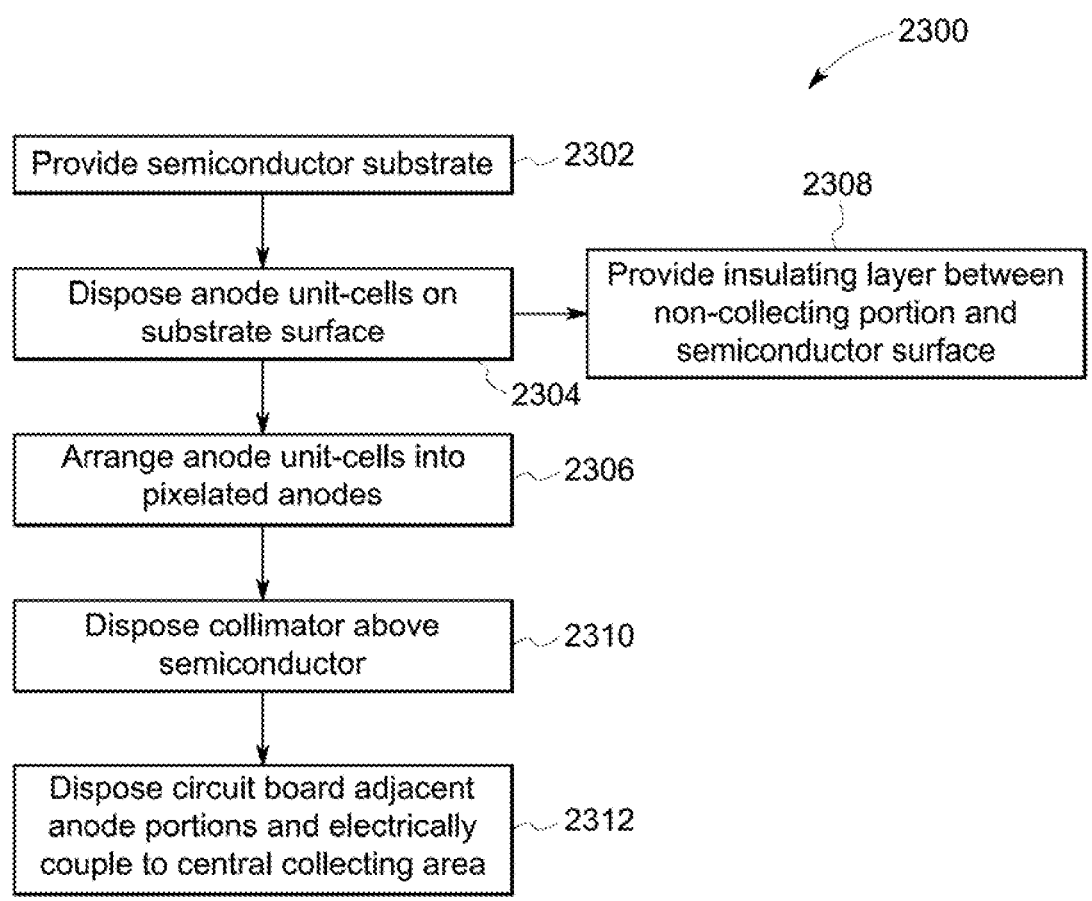
FIG. 23 provides a flowchart of a method in accordance with various embodiments.

FIG. 23 provides a flowchart of a method 2300 in accordance with various embodiments. The method 2300, for example, may employ or be performed by structures or aspects of various embodiments (e.g., systems and/or methods and/or process flows) discussed herein. For example, the method 2300 may incorporate one or more aspects of the method 1500, and/or one or more aspects of the method 2300 may be used in connection with the method 1500. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 2300 may be able to be used as one or more algorithms to direct hardware (e.g., one or more aspects of the processing unit 1220) to perform one or more operations described herein.

At 2302, a semiconductor substrate (e.g., semiconductor plate 306) is provided. At 2304, anode unit-cells (e.g., unit-cells 400) are disposed on a surface of the semiconductor substrate. It may be noted that one or more unit-structures (e.g., unit-structures 1200 or 1300) may be used to form unit-cells. Each anode unit-cell includes anode portions that include at least one collecting portion and one non-collecting portion.

At 2306 the anode unit cells are arranged into pixelated anodes (e.g., by arranging the unit cells on the surface of the semiconductor as they are disposed on the surface). The collecting portion of each anode unit cell includes a central collecting area (e.g., central collecting area 1451). For each anode unit cell, at least one of the collecting portions and at least one of the non-collecting portions for portions of different pixels (e.g., the collecting portion forms a portion of a given pixel, and the non-collecting portion forms a portion of one or more adjacent pixels). It may be noted that in various embodiments the collecting portion may define a collecting area, and the non-collecting portion may define a non-collecting area, with the collecting area and non-collecting area having different sizes from each other, as discussed herein.

One or more insulating layers may also be provided on the semiconductor surface. For example, at 2308 of the depicted embodiment, an insulating layer is provided that is interposed between the non-collecting portion and the surface of the semiconductor on which the anodes are disposed. In some embodiments, no insulating layer may be provided on top of the non-collecting portion or interposed between the non-collecting portion and a circuit board.

At 2310, a collimator is disposed above the surface on which the anode portions are provided (e.g., above a cathode surface that is disposed opposite and above the anode portions). Each pixel of the semiconductor detector is defined by an opening of the collimator disposed above the unit cells.

At 2312, a circuit board (e.g., circuit board 2210 or printed circuit board) is disposed opposite the surface above which the collimator is disposed, or adjacent to the surface on which the anode portions are disposed), and a central collecting area of each anode unit cell is electrically coupled to the circuit board.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A radiation detector assembly comprising:
   a semiconductor detector having a surface;
   a collimator disposed above the surface, the collimator having openings defining pixels;
   plural pixelated anodes disposed on the surface, each pixelated anode configured to generate a primary signal responsive to reception of a photon by the pixelated anode and to generate at least one secondary signal responsive to an induced charge caused by reception of a photon by at least one surrounding anode, wherein each pixelated anode includes a first portion and a second portion located in different openings of the collimator, wherein each of the pixelated anodes comprises a collecting portion configured to collect a primary charge responsive to reception of a photon by the pixelated anode, and a non-collecting portion configured to collect a secondary charge responsive to reception of a photon by an adjacent pixelated anode, wherein the first portion is configured as the collecting portion, and the second portion is configured as the non-collecting portion and is disposed within an opening of the collimator above a collecting portion of an adjacent pixelated anode, wherein the collecting portion defines a collecting area and the non-collecting portion defines a non-collecting area, and wherein the collecting area and the non-collecting area have different sizes from each other; and at least one processor operably coupled to the pixelated anodes, the at least one processor configured to:
acquire a primary signal from one of the pixelated anodes responsive to reception of a photon by the one of the anodes;
acquire at least one secondary signal from at least one neighboring pixelated anode of the one of the pixelated anodes responsive to an induced charge caused by the reception of the photon by the one of the anodes; and
determine a location for the reception of the photon using the primary signal and the at least one secondary signal.

2. The radiation detector assembly of claim 1, wherein the collecting area is larger than the non-collecting area.

3. The radiation detector assembly of claim 2, wherein the collecting area includes collecting strips and the non-collecting area includes non-collecting strips, the non-collecting strips having at least one insulating layer associated therewith, wherein the collecting strips are wider than the non-collecting strips.

4. The radiation detector assembly of claim 2, wherein the collecting area includes a central collecting area.

5. The radiation detector assembly of claim 4, further comprising a printed circuit board disposed opposite the surface of the semiconductor detector above which the collimator is disposed, wherein the collecting area is electrically coupled to the printed circuit board.

6. The radiation detector assembly of claim 1, wherein the non-collecting area is larger than the collecting area.

7. The radiation detector assembly of claim 6, wherein the collecting area includes collecting strips and the non-collecting area includes non-collecting strips, the non-collecting strips having at least one insulating layer associated therewith, wherein the non-collecting strips are wider than the collecting strips.

8. A radiation detector assembly comprising:
a semiconductor detector having a surface;
a collimator disposed above the surface, the collimator having openings defining pixels;
plural pixelated anodes disposed on the surface, each pixelated anode configured to generate a primary signal responsive to reception of a photon by the pixelated anode and to generate at least one secondary signal responsive to an induced charge caused by reception of a photon by at least one surrounding anode, wherein each pixelated anode includes a first portion and a second portion located in different openings of the collimator, wherein each of the pixelated anodes comprises a collecting portion configured to collect a primary charge responsive to reception of a photon by the pixelated anode, and a non-collecting portion configured to collect a secondary charge responsive to reception of a photon by an adjacent pixelated anode, wherein the first portion is configured as the collecting portion, and the second portion is configured as the non-collecting portion and is disposed within an opening of the collimator above a collecting portion of an adjacent pixelated anode, wherein the collecting area includes a central collecting area; and
at least one processor operably coupled to the pixelated anodes, the at least one processor configured to:
acquire a primary signal from one of the pixelated anodes responsive to reception of a photon by the one of the anodes;
acquire at least one secondary signal from at least one neighboring pixelated anode of the one of the pixelated anodes responsive to an induced charge caused by the reception of the photon by the one of the anodes; and
determine a location for the reception of the photon using the primary signal and the at least one secondary signal.

9. The radiation detector assembly of claim 8, further comprising a printed circuit board disposed opposite the surface of the semiconductor detector above which the collimator is disposed, wherein the central collecting area is electrically coupled to the printed circuit board.

10. The radiation detector assembly of claim 9, further comprising an insulating layer disposed on the surface of the semiconductor detector on which the anodes are disposed, the insulating layer beneath the non-collecting portion.

11. The radiation detector assembly of claim 10, wherein the radiation detector assembly is devoid of an insulating layer between the non-collecting portion and the printed circuit board.

12. The radiation detector assembly of claim 8, wherein the collecting portion defines a collecting area and the non-collecting portion defines a non-collecting area, and wherein the collecting area and the non-collecting area have different sizes from each other.

13. The radiation detector assembly of claim 12, wherein the collecting area is larger than the non-collecting area.

14. The radiation detector assembly of claim 13, wherein the collecting area includes collecting strips and the non-collecting area includes non-collecting strips, the non-collecting strips having at least one insulating layer associated therewith, wherein the collecting strips are wider than the non-collecting strips.

15. The radiation detector assembly of claim 12, wherein the non-collecting area is larger than the collecting area.

16. The radiation detector assembly of claim 15, wherein the collecting area includes collecting strips and the non-collecting area includes non-collecting strips, the non-collecting strips having at least one insulating layer associated therewith, wherein the non-collecting strips are wider than the collecting strips.

17. A method comprising:
providing a semiconductor substrate having a surface;
providing anode unit cells on the surface of the semiconductor substrate, each anode unit cell comprising anode portions, the anode portions configured to receive electrical charge responsive to absorption of a photon, the anode portions of each anode unit cell including at least one collecting portion and at least one non-collecting portion;
arranging the anode unit cells into pixelated anodes, wherein the anode portions of each anode unit cell include collecting portions and non-collecting portions, wherein the collecting portion of each anode unit cell includes a central collecting area, wherein at least one of the collecting portions and at least one of the non-collecting portions of each anode unit cell form portions of different pixels; and
disposing a collimator above the surface on which the anode portions are provided, wherein each pixel is defined by an opening of a collimator placed above the unit-cells.

18. The method of claim 17, further comprising disposing a printed circuit board disposed opposite the surface of the semiconductor detector above which the collimator is disposed, and electrically coupling the central collecting area of each anode unit cell to the printed circuit board.

19. The method of claim 18, further comprising providing an insulating layer interposed between the non-collecting portion and the surface of the semiconductor detector on which the anodes are disposed, but not providing an insulating layer between the non-collecting portion and the printed circuit board.

20. The method of claim 17, wherein the collecting portion defines a collecting area and the non-collecting portion defines a non-collecting area, and wherein the collecting area and the non-collecting area have different sizes from each other.

* * * * *